US008548240B2

(12) United States Patent
Kanatsu et al.

(10) Patent No.: US 8,548,240 B2
(45) Date of Patent: Oct. 1, 2013

(54) IMAGE PROCESSING APPARATUS, IMAGE PROCESSING METHOD, AND COMPUTER READABLE MEDIUM

(75) Inventors: Tomotoshi Kanatsu, Tokyo (JP); Hidetomo Sohma, Yokohama (JP); Reiji Misawa, Tokyo (JP); Ryo Kosaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 13/162,266

(22) Filed: Jun. 16, 2011

(65) Prior Publication Data

US 2012/0008864 A1 Jan. 12, 2012

(30) Foreign Application Priority Data

Jul. 6, 2010 (JP) ................................. 2010-154361

(51) Int. Cl.
*G06K 9/34* (2006.01)
(52) U.S. Cl.
USPC ......................................................... 382/173
(58) Field of Classification Search
USPC ......... 382/173–180, 190, 187; 715/230–234, 715/203; 358/448, 464, 462, 2.1; 707/713; 709/224
See application file for complete search history.

(56) References Cited

U.S. PATENT DOCUMENTS

| 6,178,434 | B1 * | 1/2001 | Saitoh ............................ 715/234 |
| 6,628,832 | B2 | 9/2003 | Kanatsu |
| 6,687,876 | B1 * | 2/2004 | Schilit et al. .................. 715/231 |
| 6,766,494 | B1 * | 7/2004 | Price et al. .................... 715/203 |
| 6,970,601 | B1 | 11/2005 | Kaneda et al. |
| 7,146,415 | B1 * | 12/2006 | Doi ............................... 709/224 |
| 7,343,552 | B2 * | 3/2008 | Denoue et al. ................ 715/230 |
| 7,519,226 | B2 | 4/2009 | Kaneda et al. |
| 7,574,048 | B2 * | 8/2009 | Shilman et al. ............... 382/187 |
| 7,715,625 | B2 * | 5/2010 | Tagawa et al. ................ 382/173 |
| 8,073,838 | B2 * | 12/2011 | Shi et al. ....................... 707/713 |
| 8,250,463 | B2 * | 8/2012 | Bargeron et al. ............. 715/232 |
| 8,411,960 | B2 * | 4/2013 | Misawa et al. ............... 382/190 |
| 2005/0105148 | A1 | 5/2005 | Misawa |
| 2009/0154810 | A1 | 6/2009 | Enomoto et al. |

(Continued)

FOREIGN PATENT DOCUMENTS

JP 11-066196 A 3/1999

OTHER PUBLICATIONS

U.S. Appl. No. 13/172,125, filed Jun. 29, 2011, Applicants: Hidetomo Sohma, et al.

*Primary Examiner* — Ishrat I Sherali
(74) *Attorney, Agent, or Firm* — Fitzpatrick, Cella, Harper & Scinto

(57) ABSTRACT

An apparatus comprises: unit configured to divide input document data into a body region, a caption region, and an object region; unit configured to acquire text information included in each of the body region and the caption region; unit configured to search the text information in the body region for an anchor term, to extract an anchor term from the text information in the caption region, and to generate a bi-directional link between a portion corresponding to the anchor term in the body region and a portion of the object region to which the caption region is appended; and unit configured to convert the input document data into digital document data in which the portion corresponding to the anchor term in the body region and the portion corresponding to the object region to which the caption region is appended are bi-directionally linked based on the link.

15 Claims, 35 Drawing Sheets

(56) References Cited

U.S. PATENT DOCUMENTS

| | | |
|---|---|---|
| 2010/0171999 A1 | 7/2010 | Namikata et al. |
| 2010/0232690 A1 | 9/2010 | Kanatsu et al. |
| 2010/0296736 A1 | 11/2010 | Shiiyama et al. |
| 2010/0299355 A1 | 11/2010 | Shiiyama et al. |
| 2012/0008174 A1* | 1/2012 | Sohma et al. ............ 358/448 |
| 2012/0011429 A1* | 1/2012 | Kosaka et al. ........... 715/230 |

* cited by examiner

FIG. 5A

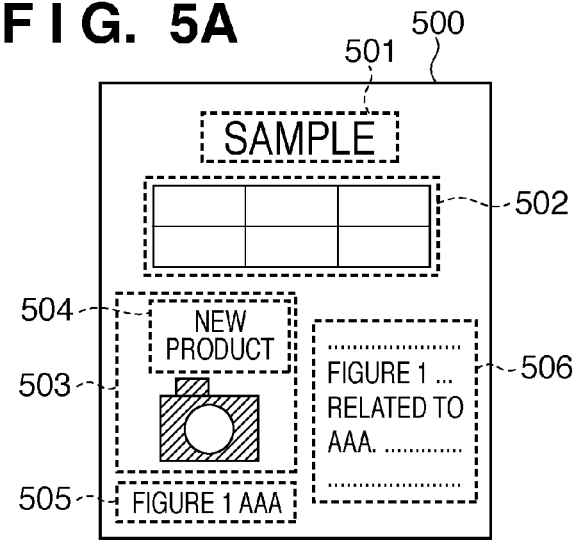

FIG. 5B

| | ATTRIBUTE | REGION APPENDED WITH CAPTION | CO-ORDI-NATE X | CO-ORDI-NATE Y | WIDTH W | HEIGHT H | PAGE | TEXT INFORMATION | NAME |
|---|---|---|---|---|---|---|---|---|---|
| 501 | HEADING | – | X1 | Y1 | W1 | H1 | 1 | SAMPLE | HEADING REGION |
| 502 | TABLE | – | X2 | Y2 | W2 | H2 | 1 | | TABLE REGION |
| 503 | PHOTO | – | X3 | Y3 | W3 | H3 | 1 | | CAPTION APPENDED REGION |
| 504 | TEXT (IN PHOTO 503) | – | X4 | Y4 | W4 | H4 | 1 | NEW PRODUCT | TEXT IN PHOTO REGION |
| 505 | CAPTION | 503 | X5 | Y5 | W5 | H5 | 1 | FIGURE 1 AAA | CAPTION REGION |
| 506 | BODY | – | X6 | Y6 | W6 | H6 | 1 | ...FIGURE 1... RELATED TO AAA. | BODY REGION |

FIG. 5C

| ATTRIBUTE | TEXT | PHOTO | LINE IMAGE | TABLE |
|---|---|---|---|---|
| CONVERSION PROCESSING | VECTOR CONVERSION | IMAGE CLIPPING | VECTOR CONVERSION | VECTOR CONVERSION (TABLE FRAME PORTION) |
| ERASE PROCESSING | ON | ON | ON | ON |

F I G. 6

```
<?xml version="1.0"?>
<svg xmlns="http://www.w3.org/2000/svg" width="2480" height="3520"
    xmns:x="http://@@@.jp">

<text x="X1" y="Y1" color="#000000">SAMPLE</text>

<g>
  <path stroke="#000000" d="M X4, Y4 L…"/>
  ……
</g>

<g x:link_id ="image_01">                           ──610
    <rect x="X3" y="Y3" width="W3" height="H3"        ──611
      onclick ={                                      ──612
        var field = this.getField("text_01");
        field.strokeColor = color.red;
        field.setFocus();
      }
                                                      ──608
    />
  </g>

<g x:link_id ="text_01">                            ──613
    <rect x="X7" y="Y7" width="W7" height="H7"        ──614
      onclick ={                                      ──615
        var field = this.getField("image_01");
        field.strokeColor = color.red;
        field.setFocus();
      }
                                                      ──609
    />
  </g>

<image x="X3" y="Y3" width="W3" height="H3"
    xlink:href="data:image/png;base64,Dez3632 fsod6 Xhd0dsc4d……"/>
......

<text x="X4" y="Y4" color="#000000">NEW PRODUCT</text>

<text x="X5" y="Y5" color="#000000">FIGURE 1 AAA</text>

<text x="X6" y="Y6" color="#000000">….FIGURE 1… RELATED TO AAA.… </text>

</svg>
```

600 — header block
601 — SAMPLE text
602 — g/path block
607 — contains 610–615, 608, 609
603 — image block
604 — NEW PRODUCT
605 — FIGURE 1 AAA
606 — FIGURE 1... RELATED TO AAA

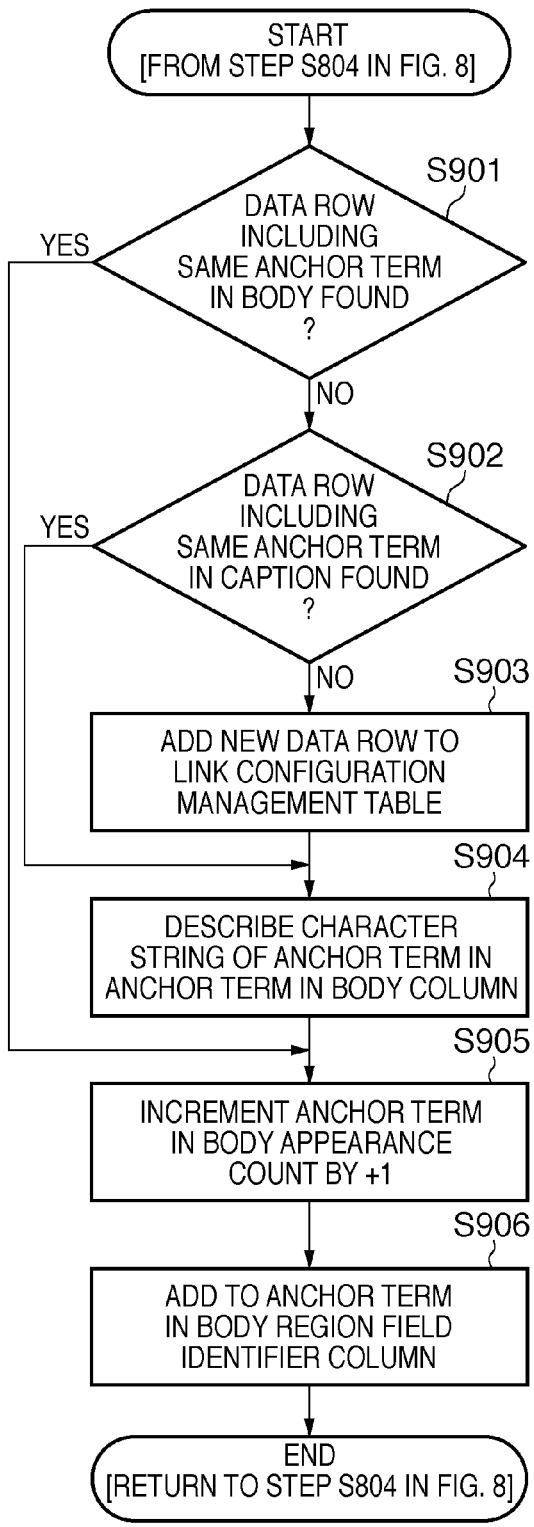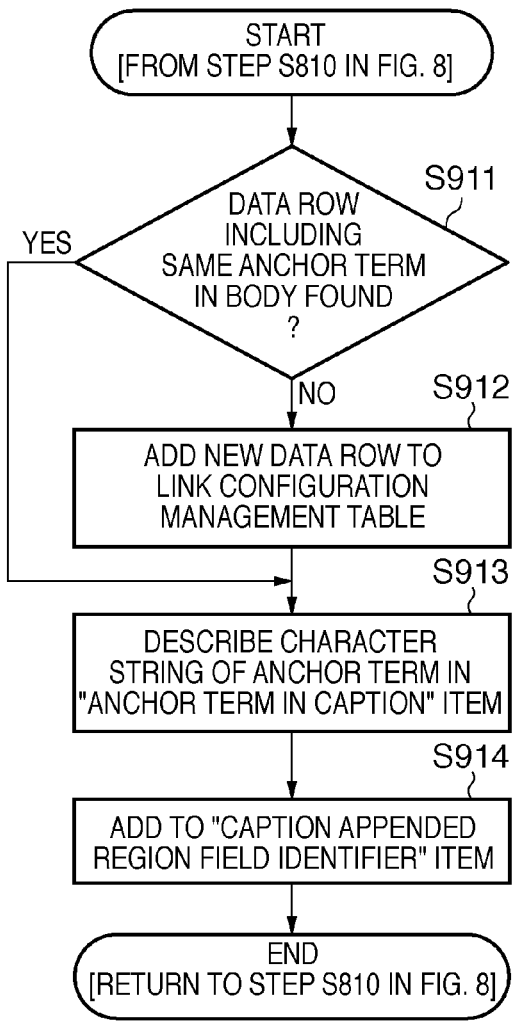
FIG. 9A
FIG. 9B

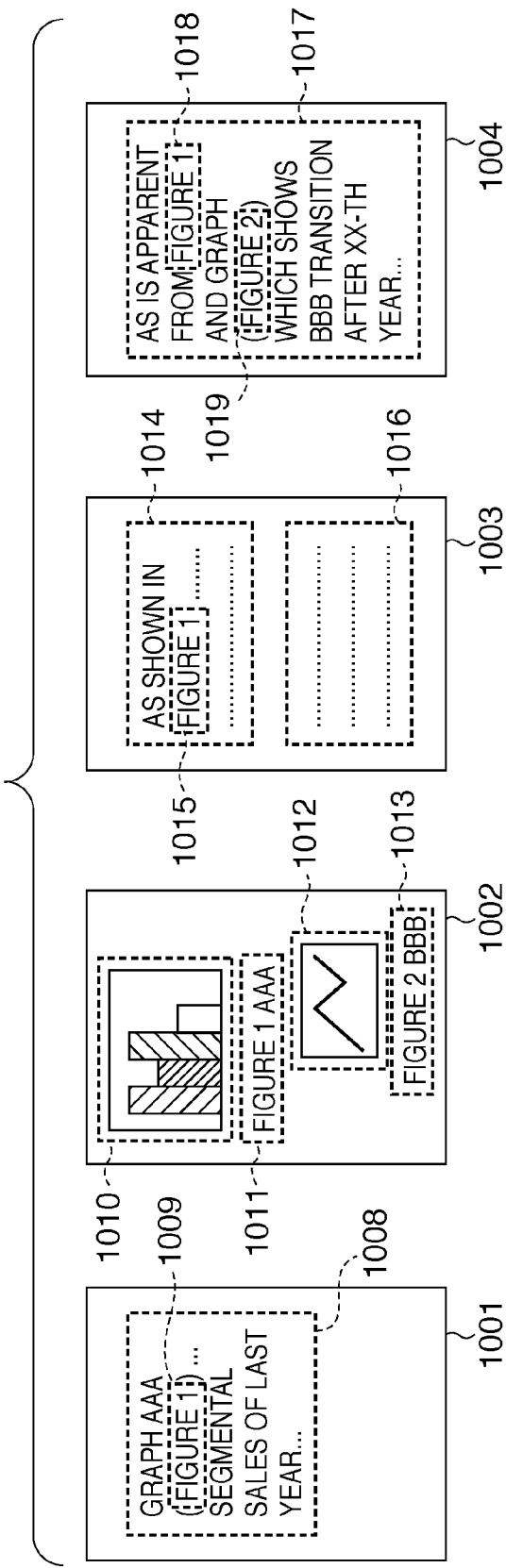

FIG. 10B

| | ATTRIBUTE | REGION APPENDED WITH CAPTION | COOR- DINATE X | COOR- DINATE Y | WIDTH W | HEIGHT H | PAGE | TEXT INFORMATION | ANCHOR TERM | FIELD IDENTIFIER (OBJECT REGION) |
|---|---|---|---|---|---|---|---|---|---|---|
| 1008 | BODY | - | X08 | Y08 | W08 | H08 | 1 | ...GRAPH AAA (FIGURE 1)... | FIGURE 1 | text_FIGURE 1-1(1009) |
| 1010 | LINE IMAGE | - | X10 | Y10 | W10 | H10 | 2 | - | - | image_FIGURE 1-1(1010) |
| 1011 | CAPTION | 1010 | X11 | Y11 | W11 | H11 | 2 | FIGURE 1 AAA | FIGURE 1 | - |
| 1012 | LINE IMAGE | - | X12 | Y12 | W12 | H12 | 2 | - | - | image_FIGURE 2-1(1012) |
| 1013 | CAPTION | 1012 | X13 | Y13 | W13 | H13 | 2 | | FIGURE 2 | - |
| 1014 | BODY | - | X14 | Y14 | W14 | H14 | 3 | AS SHOWN IN FIGURE 1 ... | FIGURE 1 | text_FIGURE 1-2(1015) |
| 1016 | BODY | - | X16 | Y16 | W16 | H16 | 3 | ............ | - | - |
| 1017 | BODY | - | X17 | Y17 | W17 | H17 | 4 | AS IS APPARENT FROM FIGURE 1... | FIGURE 1<br>FIGURE 2 | text_FIGURE 1-3(1018)<br>text_FIGURE 2-1(1019) |

FIG. 11

| | 1101 | 1102 | 1103 |
|---|---|---|---|
| | FIELD IDENTIFIER | OUTER APPEARANCE DEFINITION GRAPHIC DATA | ACTION DEFINITION (UPON CLICKING) |
| 1120 | text_FIGURE 1-1 | RECTANGLE (X20, Y20, W20, H20) | HIGHLIGHT AND SET FOCUS ON LINK DESTINATION FIELD image_FIGURE 1-1, AND DISABLE BUTTONS APPENDED TO text_FIGURE 1-1 |
| 1121 | text_FIGURE 1-1-Prev | BITMAP ◀ (X21, Y21, W21, H21) | HIGHLIGHT AND SET FOCUS ON LINK DESTINATION FIELD text_FIGURE 1-3, ENABLE BUTTONS APPENDED TO text_FIGURE 1-3, AND DISABLE BUTTONS APPENDED TO text_FIGURE 1-1 |
| 1122 | text_FIGURE 1-1-Next | BITMAP ▶ (X22, Y22, W22, H22) | HIGHLIGHT AND SET FOCUS ON LINK DESTINATION FIELD text_FIGURE 1-2, ENABLE BUTTONS APPENDED TO text_FIGURE 1-2, AND DISABLE BUTTONS APPENDED TO text_FIGURE 1-1 |
| 1123 | text_FIGURE 1-1-Back | BITMAP ▲ (X23, Y23, W23, H23) | HIGHLIGHT AND SET FOCUS ON LINK DESTINATION FIELD image_FIGURE 1-1, AND DISABLE BUTTONS APPENDED TO text_FIGURE 1-1 |
| 1124 | image_FIGURE 1-1 | RECTANGLE (X24, Y24, W24, H24) | HIGHLIGHT AND SET FOCUS ON LINK DESTINATION FIELD text_FIGURE 1-1, AND ENABLE BUTTONS APPENDED TO LINK DESTINATION FIELD |
| 1125 | image_FIGURE 2-1 | RECTANGLE (X25, Y25, W25, H25) | HIGHLIGHT AND SET FOCUS ON LINK DESTINATION FIELD text_FIGURE 2-1 |
| 1126 | text_FIGURE 1-2 | RECTANGLE (X26, Y26, W26, H26) | HIGHLIGHT AND SET FOCUS ON LINK DESTINATION FIELD image_FIGURE 1-1, AND DISABLE BUTTONS APPENDED TO text_FIGURE 1-2 |
| 1127 | text_FIGURE 1-2-Prev | BITMAP ◀ (X27, Y27, W27, H27) | HIGHLIGHT AND SET FOCUS ON LINK DESTINATION FIELD text_FIGURE 1-1, ENABLE BUTTONS APPENDED TO text_FIGURE 1-1, AND DISABLE BUTTONS APPENDED TO text_FIGURE 1-2 |
| 1128 | text_FIGURE 1-2-Next | BITMAP ▶ (X28, Y28, W28, H28) | HIGHLIGHT AND SET FOCUS ON LINK DESTINATION FIELD text_FIGURE 1-3, ENABLE BUTTONS APPENDED TO text_FIGURE 1-3, AND DISABLE BUTTONS APPENDED TO text_FIGURE 1-2 |
| 1129 | text_FIGURE 1-2-Back | BITMAP ▲ (X29, Y29, W29, H29) | HIGHLIGHT AND SET FOCUS ON LINK DESTINATION FIELD image_FIGURE 1-1, AND DISABLE BUTTONS APPENDED TO text_FIGURE 1-2 |
| 1130 | text_FIGURE 1-3 | RECTANGLE (X30, Y30, W30, H30) | HIGHLIGHT AND SET FOCUS ON LINK DESTINATION FIELD image_FIGURE 1-1, AND DISABLE BUTTONS APPENDED TO text_FIGURE 1-3 |
| 1131 | text_FIGURE 1-3-Prev | BITMAP ◀ (X31, Y31, W31, H31) | HIGHLIGHT AND SET FOCUS ON LINK DESTINATION FIELD text_FIGURE 1-2, ENABLE BUTTONS APPENDED TO text_FIGURE 1-2, AND DISABLE BUTTONS APPENDED TO text_FIGURE 1-3 |
| 1132 | text_FIGURE 1-3-Next | BITMAP ▶ (X32, Y32, W32, H32) | HIGHLIGHT AND SET FOCUS ON LINK DESTINATION FIELD text_FIGURE 1-1, ENABLE BUTTONS APPENDED TO text_FIGURE 1-1, AND DISABLE BUTTONS APPENDED TO text_FIGURE 1-3 |
| 1133 | text_FIGURE 1-3-Back | BITMAP ▲ (X33, Y33, W33, H33) | HIGHLIGHT AND SET FOCUS ON LINK DESTINATION FIELD image_FIGURE 1-1, AND DISABLE BUTTONS APPENDED TO text_FIGURE 1-3 |
| 1134 | text_FIGURE 2-1 | RECTANGLE (X34, Y34, W34, H34) | HIGHLIGHT AND SET FOCUS ON LINK DESTINATION FIELD image_FIGURE 2-1 |
| 1135 | text_FIGURE 2-1-Prev | BITMAP ◀ (X35, Y35, W35, H35) | NO ACTION |
| 1136 | text_FIGURE 2-1-Next | BITMAP ▶ (X36, Y36, W36, H36) | NO ACTION |
| 1137 | text_FIGURE 2-1-Back | BITMAP ▲ (X37, Y37, W37, H37) | NO ACTION |

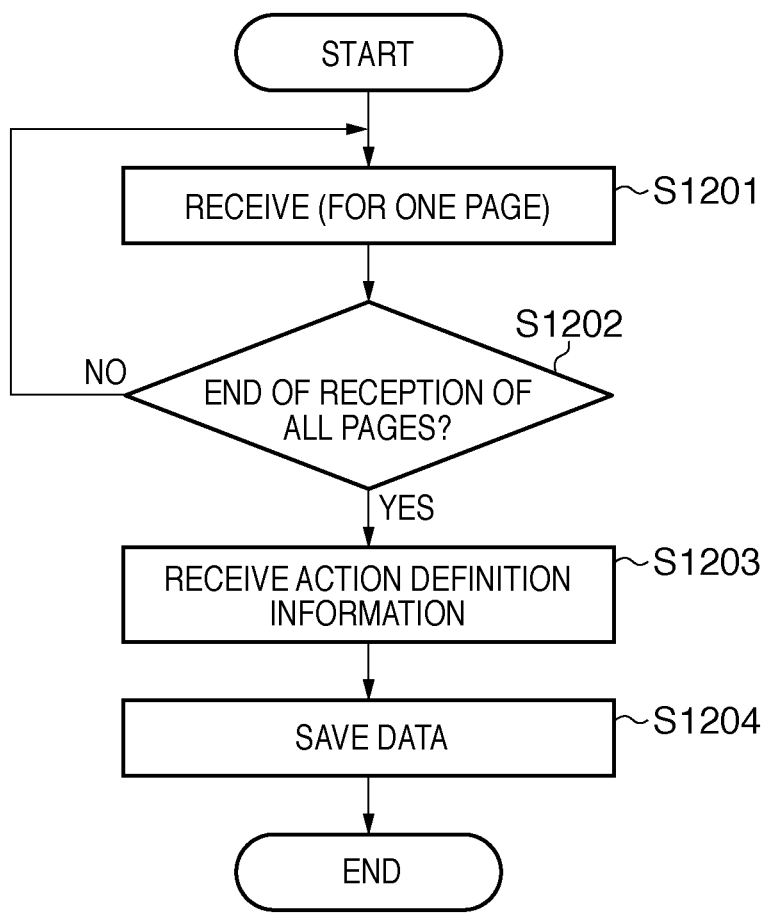

FIG. 14A  FIG. 14B  FIG. 14C
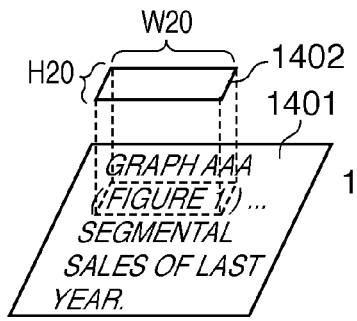
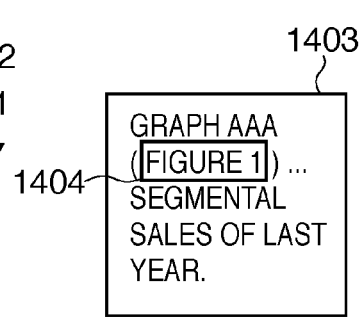
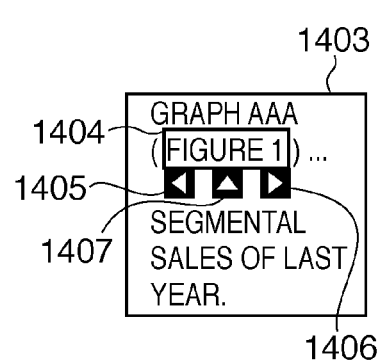
FIG. 14D  FIG. 14E
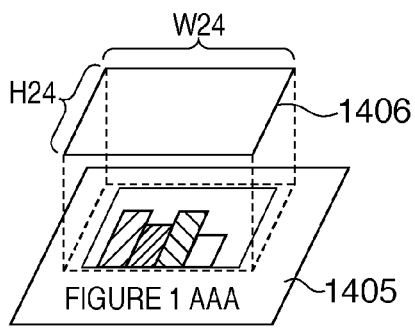
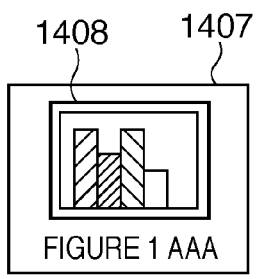

FIG. 15A

| ANCHOR TERM IN CAPTION | CAPTION APPENDED REGION FIELD IDENTIFIER | ANCHOR TERM IN BODY | ANCHOR TERM IN BODY APPEARANCE COUNT | ANCHOR TERM IN BODY REGION FIELD IDENTIFIER |
|---|---|---|---|---|
| 1501 { – | – | FIGURE 1 | 1 | text_FIGURE 1-1 |

FIG. 15B

| ANCHOR TERM IN CAPTION | CAPTION APPENDED REGION FIELD IDENTIFIER | ANCHOR TERM IN BODY | ANCHOR TERM IN BODY APPEARANCE COUNT | ANCHOR TERM IN BODY REGION FIELD IDENTIFIER |
|---|---|---|---|---|
| 1501 { FIGURE 1 | image_FIGURE 1-1 | FIGURE 1 | 1 | text_FIGURE 1-1 |

FIG. 15C

| ANCHOR TERM IN CAPTION | CAPTION APPENDED REGION FIELD IDENTIFIER | ANCHOR TERM IN BODY | ANCHOR TERM IN BODY APPEARANCE COUNT | ANCHOR TERM IN BODY REGION FIELD IDENTIFIER |
|---|---|---|---|---|
| 1501 { FIGURE 1 | image_FIGURE 1-1 | FIGURE 1 | 1 | text_FIGURE 1-1 |
| 1502 { FIGURE 2 | image_FIGURE 2-1 | – | – | – |

FIG. 15D

| | ANCHOR TERM IN CAPTION | CAPTION APPENDED REGION FIELD IDENTIFIER | ANCHOR TERM IN BODY | ANCHOR TERM IN BODY APPEARANCE COUNT | ANCHOR TERM IN BODY REGION FIELD IDENTIFIER |
|---|---|---|---|---|---|
| 1501 | FIGURE 1 | image_FIGURE 1-1 | FIGURE 1 | 2 | text_FIGURE 1-1<br>text_FIGURE 1-2 |
| 1502 | FIGURE 2 | image_FIGURE 2-1 | - | - | - |

FIG. 15E

| | ANCHOR TERM IN CAPTION | CAPTION APPENDED REGION FIELD IDENTIFIER | ANCHOR TERM IN BODY | ANCHOR TERM IN BODY APPEARANCE COUNT | ANCHOR TERM IN BODY REGION FIELD IDENTIFIER |
|---|---|---|---|---|---|
| 1501 | FIGURE 1 | image_FIGURE 1-1 | FIGURE 1 | 3 | text_FIGURE 1-1<br>text_FIGURE 1-2<br>text_FIGURE 1-3 |
| 1502 | FIGURE 2 | image_FIGURE 2-1 | - | - | - |

FIG. 15F

| | ANCHOR TERM IN CAPTION | CAPTION APPENDED REGION FIELD IDENTIFIER | ANCHOR TERM IN BODY | ANCHOR TERM IN BODY APPEARANCE COUNT | ANCHOR TERM IN BODY REGION FIELD IDENTIFIER |
|---|---|---|---|---|---|
| 1501 | FIGURE 1 | image_FIGURE 1-1 | FIGURE 1 | 3 | text_FIGURE 1-1<br>text_FIGURE 1-2<br>text_FIGURE 1-3 |
| 1502 | FIGURE 2 | image_FIGURE 2-1 | FIGURE 2 | 1 | text_FIGURE 2-1 |

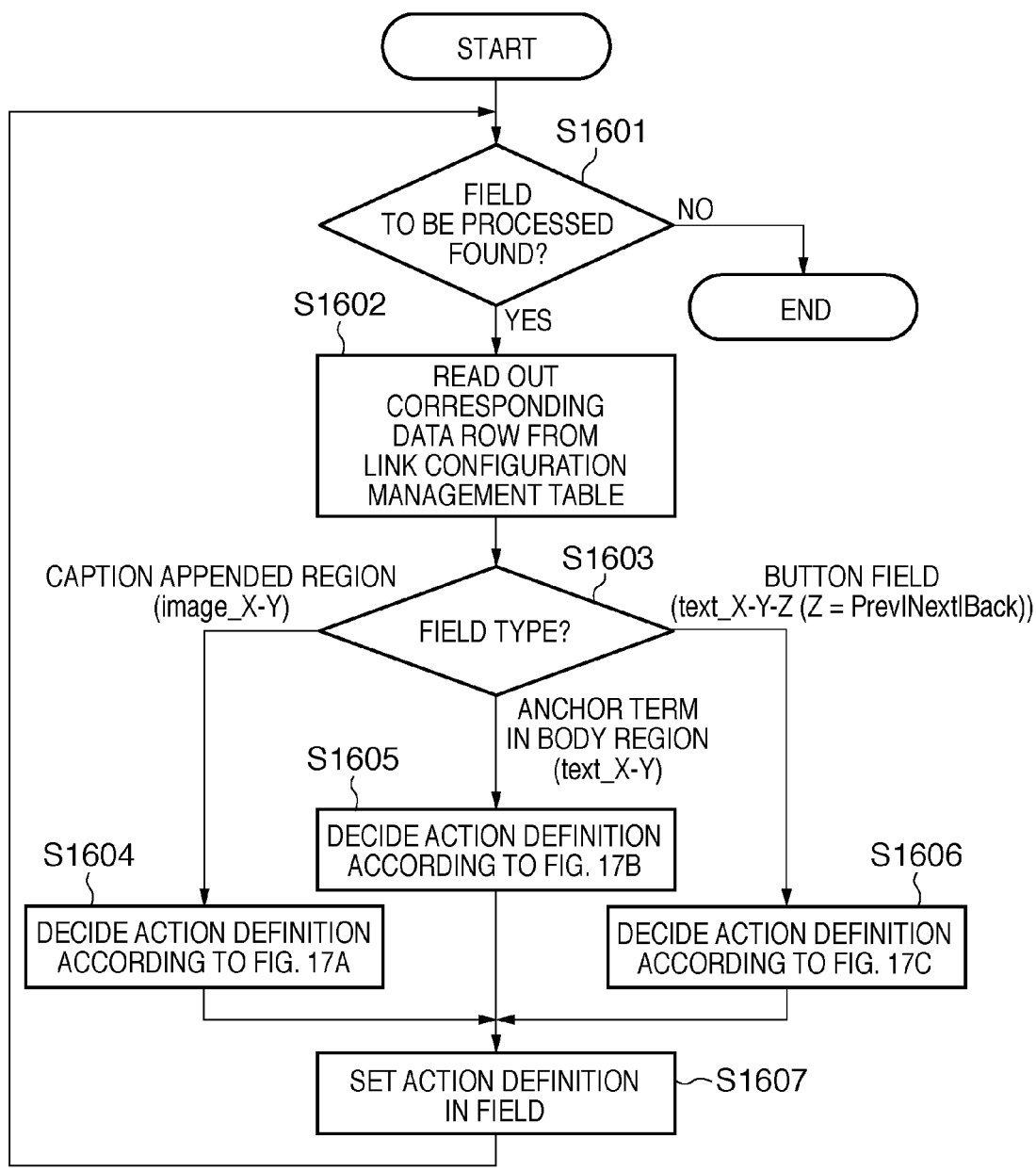

F I G. 17A

| ANCHOR TERM CANDIDATE APPEARANCE COUNT | ACTION (UPON CLICKING) |
|---|---|
| 1 | HIGHLIGHT AND SET FOCUS ON LINK DESTINATION (FIELD OF ANCHOR TERM IN BODY CANDIDATE) ~1701 |
| 2 OR MORE | HIGHLIGHT AND SET FOCUS ON LINK DESTINATION (FIRST FIELD OF ANCHOR TERM IN BODY CANDIDATES), AND ENABLE BUTTONS APPENDED TO LINK DESTINATION FIELD ~1702 |
| 0 | ERROR MESSAGE "NO LINK DESTINATION IS FOUND" ~1703 |

F I G. 17B

| CAPTION APPENDED REGION | ANCHOR TERM CANDIDATE APPEARANCE COUNT | ACTION (UPON CLICKING) |
|---|---|---|
| PRESENT | 1 | HIGHLIGHT AND SET FOCUS ON LINK DESTINATION (FIELD OF CAPTION APPENDED REGION) ~1704 |
| | 2 OR MORE | HIGHLIGHT AND SET FOCUS ON LINK DESTINATION (FIELD OF CAPTION APPENDED REGION) AND DISABLE BUTTONS APPENDED TO SELF FIELD ~1705 |
| ABSENT | 0 | ERROR MESSAGE "NO LINK DESTINATION IS FOUND" ~1706 |

FIG. 17C

| CAPTION APPENDED REGION | ANCHOR TERM CANDIDATE APPEARANCE COUNT | BUTTON TYPE | ACTION (UPON CLICKING) |
|---|---|---|---|
| PRESENT | 2 OR MORE | Prev | HIGHLIGHT AND SET FOCUS ON LINK DESTINATION (PREVIOUS FIELD OF ANCHOR TERM IN BODY CANDIDATES HAVING SAME ANCHOR TERM), ENABLE BUTTONS APPENDED TO LINK DESTINATION FIELD, AND DISABLE BUTTONS TO WHICH SELF FIELD IS APPENDED ~1707 |
| | | Next | HIGHLIGHT AND SET FOCUS ON LINK DESTINATION (NEXT FIELD OF ANCHOR TERM IN BODY CANDIDATES HAVING SAME ANCHOR TERM), ENABLE BUTTONS APPENDED TO LINK DESTINATION FIELD, AND DISABLE BUTTONS TO WHICH SELF FIELD IS APPENDED ~1708 |
| | | Back | HIGHLIGHT AND SET FOCUS ON LINK DESTINATION (FIELD OF CAPTION APPENDED REGION) AND DISABLE BUTTONS APPENDED TO FIELD TO WHICH SELF FIELD IS APPENDED ~1709 |
| OTHER | | — | NO ACTION (NO BUTTONS ARE ENABLED) ~1710 |

<image x="0" y="0" width="2480" height="3520"
    xlink :href="dataimage/png;base64, Dez3632 fsod6Xhd0dsc4d······."/>
  <g>
    <path stroke="#000000" d="M X4, Y4 L···"/>
    ......
  </g>
  <g x:field_id ="text_FIGURE 1-1">
    <rect x="X20" y="Y20" width="W20" height="H20" />
    x :onclick ="#text_FIGURE 1-1.onclick"/>
  </g>
  <g x:field_id ="text_FIGURE 1-1-Prev">
    <image x="X21" y="Y21" width="W21" height="H21" src="prev.png"
    x :onclick ="#text_FIGURE 1-1-Prev.onclick"/>
  </g>
  <g x:field_id ="text_FIGURE 1-1-Next">
    <image x="X22" y="Y22" width="W22" height="H22" src="next.png"
    x :onclick ="#text_FIGURE 1-1-Next.onclick"/>
  </g>
  <g x:field_id ="text_FIGURE 1-1-Back">
    <image x="X23" y="Y23" width="W23" height="H23" src="back.png"
    x :onclick x="#text_FIGURE 1-1-Back.onclick"/>
  </g>

<image x="0" y="0" width="2480" height="3520"
    xlink :href="dataimage/png;base64, rudjhclywiewrwnf······."/>
  <g>
    <path stroke="#000000" d="M X20, Y80 L···"/>
    ......
  </g>
  <g x:field_id ="image_FIGURE 1-1">
    <rect x="X24" y="Y24" width="W24" height="H24" />
    x :onclick ="#image_FIGURE 1-1.onclick"/>
  </g>
  <g x:field_id ="image_FIGURE 2-1">
    <rect x="X25" y="Y25" width="W25" height="H25" />
    x :onclick ="#image_FIGURE 2-1.onclick"/>
  </g>

<image x="0" y="0" width="2480" height="3520"
    xlink :href="dataimage/png;base64, daslieruoielasdrd······."/>
  <g>
    <path stroke="#000000" d="M X4, Y4 L···"/>···
  </g>

<g x:field_id ="text_FIGURE 1-2"···/>
  <g x:field_id ="text_FIGURE 1-2-Prev"···/>
  <g x:field_id ="text_FIGURE 1-2-Next"···/>
  <g x:field_id ="text_FIGURE 1-2-Back"···/>

<image x="0" y="0" width="2480" height="3520"
    xlink :href="dataimage/png;base64, dasd3q4rceasdrd······."/>
  <g>
    <path stroke="#000000" d="M X4, Y4 L···"/>···
  </g>

<g x:field_id ="text_FIGURE 1-3"···/>
  <g x:field_id ="text_FIGURE 1-3-Prev"···/>
  <g x:field_id ="text_FIGURE 1-3-Next"···/>
  <g x:field_id ="text_FIGURE 1-3-Back"···/>
  <g x:field_id ="text_FIGURE 2-1"···/>
  <g x:field_id ="text_FIGURE 2-1-Prev"···/>
  <g x:field_id ="text_FIGURE 2-1-Next"···/>
  <g x:field_id ="text_FIGURE 2-1-Back"···/>

```
<x:actions>
    <x:action id="text_FIGURE 1-1.onclick">                    ~1852
        ver field = this.getField ("image_figure 1-1");         ~1853
        field.strokeColor=color.red;
        field.setFocus ();
        this.getField ("text_FIGURE 1-1-Prev").disable();
        this.getField ("text_FIGURE 1-1-Next").disable();
        this.getField ("text_FIGURE 1-1-Back").disable();
    </x:action>                                                 ~1851

<x:action id="text_FIGURE 1-1.Prev.onclick">                ~1855
        ver field = this.getField ("image_FIGURE 1-2");         ~1856
        field.strokeColor=color.red;
        field.setFocus ();
        this.getField ("text_FIGURE 1-2-Prev").disable();
        this.getField ("text_FIGURE 1-2-Next").disable();
        this.getField ("text_FIGURE 1-2-Back").disable();
        this.getField ("text_FIGURE 1-1-Prev").disable();
        this.getField ("text_FIGUREe 1-1-Next").disable();
        this.getField ("text_FIGURE 1-1-Back").disable();       ~1854
    </x:action>
            :

<x:action id="image_FIGURE 1-1.onclick">                    ~1858
        ver field = this.getField ("text_FIGURE 1-1");          ~1859
        field.strokeColor=color.red;
        field.setFocus ();
        this.getField ("text_FIGURE 1-1-Prev").enable();
        this.getField ("text_FIGURE 1-1-Next").enable();
        this.getField ("text_FIGURE 1-1-Back").enable();
    </x:action>                                                 ~1857

<x:action id="image_FIGURE 2-1.onclick">                    ~1861
        ver field = this.getField ("text_FIGURE 2-1");          ~1862
        field.strokeColor=color.red;
        field.setFocus ();
    </x:action>                                                 ~1860
            :

<x:action id="initialize">                                  ~1864
        this.getField ("text_FIGURE 1-1-Prev").disable();       ~1865
        this.getField ("text_FIGURE 1-1-Next").disable();
        this.getField ("text_FIGURE 1-1-Back").disable();

</x:action>                                                 ~1863
</x:actions>
```

FIG. 20

| | FIELD IDENTIFIER | OUTER APPEARANCE DEFINITION GRAPHIC DATA | ACTION DEFINITION (UPON CLICKING) |
|---|---|---|---|
| 1101 | | 1102 | 1103 |
| 1120 | text_FIGURE 1-1 | RECTANGLE (X20, Y20, W20, H20) | ON_CLICK ("text_FIGURE 1-1", 3, "image_FIGURE 1-1", 1) |
| 1121 | text_FIGURE 1-1-Prev | BITMAP ◀ (X21, Y21, W21, H21) | ON_CLICK ("text_FIGURE 1-1", 3, "text_FIGUREe 1-3", 3) |
| 1122 | text_FIGURE 1-1-Next | BITMAP ▶ (X22, Y22, W22, H22) | ON_CLICK ("text_FIGURE 1-1", 3, "text_FIGURE 1-2", 3) |
| 1123 | text_FIGURE 1-1-Back | BITMAP ▲ (X23, Y23, W23, H23) | ON_CLICK ("text_FIGURE 1-1", 3, "image_FIGURE 1-1", 1) |
| 1124 | image_FIGURE 1-1 | RECTANGLE (X24, Y24, W24, H24) | ON_CLICK ("image_FIGURE 1-1", 0, "text_FIGURE 1-1", 3) |
| 1125 | image_FIGURE 2-1 | RECTANGLE (X25, Y25, W25, H25) | ON_CLICK ("image_FIGURE 2-1", 0, "text_FIGURE 2-1", 1) |
| 1126 | text_FIGURE 1-2 | RECTANGLE (X26, Y26, W26, H26) | ON_CLICK ("text_FIGURE1-2", 3, "image_FIGURE 1-1", 1) |
| 1127 | text_FIGURE 1-2-Prev | BITMAP ◀ (X27, Y27, W27, H27) | ON_CLICK ("text_FIGURE 1-2", 3, "text_FIGURE 1-1", 3) |
| 1128 | text_FIGURE 1-2-Next | BITMAP ▶ (X28, Y28, W28, H28) | ON_CLICK ("text_FIGURE 1-2", 3, "text_FIGURE 1-3", 3) |
| 1129 | text_FIGURE 1-2-Back | BITMAP ▲ (X29, Y29, W29, H29) | ON_CLICK ("text_FIGURE 1-2", 3, "image_FIGURE 1-1", 1) |
| 1130 | text_FIGURE 1-3 | RECTANGLE (X30, Y30, W30, H30) | ON_CLICK ("text_FIGURE 1-3", 3, "image_FIGURE 1-1", 1) |
| 1131 | ttext_FIGURE 1-3-Prev | BITMAP ◀ (X31, Y31, W31, H31) | ON_CLICK ("text_FIGURE 1-3", 3, "text_FIGURE 1-2", 3) |
| 1132 | ext_FIGURE 1-3-Next | BITMAP ▶ (X32, Y32, W32, H32) | ON_CLICK ("text_FIGURE 1-3", 3, "text_FIGURE 1-1", 3) |
| 1133 | text_FIGURE 1-3-Back | BITMAP ▲ (X33, Y33, W33, H33) | ON_CLICK ("text_FIGURE 1-3", 3, "image_FIGURE 1-1", 1) |
| 1134 | text_FIGURE 2-1 | RECTANGLE (X34, Y34, W34, H34) | ON_CLICK ("text_FIGURE 2-1", 0, "image_FIGURE 2-1", 1) |
| 1135 | text_FIGURE 2-1-Prev | BITMAP ◀ (X35, Y35, W35, H35) | ON_CLICK ("text_FIGURE 2-1", 0, "text_FIGURE 2-1", 1) |
| 1136 | text_FIGURE 2-1-Next | BITMAP ▶ (X36, Y36, W36, H36) | ON_CLICK ("text_FIGURE 2-1", 0, "text_FIGURE 2-1", 1) |
| 1137 | text_FIGURE 2-1-Back | BITMAP ▲ (X37, Y37, W37, H37) | ON_CLICK ("text_FIGURE 2-1", 0, "image_FIGURE 2-1", 1) |

FIG. 21

```
<x:functions>
  <x:function name ="ON_CLICK">
  function ON_CLICK(srcId, srcBtns, dstId, dstNum)
  {
      if (dstNUm ==0) {
         message("NO LINK DESTINATION IS FOUND");
      }
      else {
         this.getField(dstId).color =red;
         this.getField(dstId).setFocus();
         if (dstNum > 1) {
            this.getField(dstId+"-Prev").enable();
            this.getField(dstId+"-Next").enable();
            this.getField(dstId+"-Back").enable();
         }
         if (srcBtns > 0){
            this.getField(srcId+"-Prev").disable();
            this.getField(srcId+"-Next").disable();
            this.getField(srcId+"-Back").disable();
         }
      }
   }
   </x.function>
</x:actions>
```
— 2101

```
<x:actions>
  <x:action id ="text_FIGURE 1-1.onclick">
    ON_CLICK("text_FIGURE 1-1", 3, "image_FIGURE 1-1", 1)
  </x:action>
```
— 2102
— 2103

```
  <x:action id ="text_FIGURE 1-1-Prev.onclick">
    ON_CLICK("text_FIGURE 1-1", 3, "text_FIGURE 1-3", 3)
  </x:action>
       :
```
— 2104

```
  <x:action id ="image_FIGURE 1-1.onclick">
    ON_CLICK("image_FIGURE 1-1", 0, "text_FIGURE 1-1", 3)
  </x:action>
```
— 2105

```
  <x:action id ="image_FIGURE 2-1.onclick">
    ON_CLICK("image_FIGURE 2-1", 0, "text_FIGURE 2-1", 1)
  </x:acation>
```
— 2106

```
  <x:action id ="initialize">
    this.getField("text_FIGURE 1-1-Prev").disable();
    this.getField("text_FIGURE 1-1-Next").disable();
    this.getField("text_FIGURE 1-1-Back").disable();
     :
  </x:acation>
</x:actions>
```

FIG. 23

| SELF FIELD TYPE | srcId | srcBtns | dstId | | dstNum |
|---|---|---|---|---|---|
| CAPTION APPENDED REGION | IDENTIFIER OF SELF FIELD | 0 | FIRST IDENTIFIER IN ANCHOR TERM IN BODY REGION IDENTIFIER COLUMN | | ANCHOR TERM IN BODY APPEARANCE COUNT |
| ANCHOR TERM IN BODY REGION | IDENTIFIER OF FIELD TO WHICH SELF FIELD IS APPENDED | | CAPTION APPENDED REGION FIELD IDENTIFIER | | 1 |
| BUTTON | | 3 WHEN ANCHOR TERM APPEARANCE COUNT IS 2 OR MORE; OTHERWISE, 0 | BUTTON TYPE | Prev | IDENTIFIER IMMEDIATELY BEFORE srcId (LAST IDENTIFIER IN CASE OF FIRST IDENTIFIER) IN ANCHOR TERM IN BODY REGION IDENTIFIER COLUMN | ANCHOR TERM IN BODY APPEARANCE COUNT |
| | | | | Next | IDENTIFIER IMMEDIATELY AFTER srcId (FIRST IDENTIFIER IN CASE OF LAST IDENTIFIER) IN ANCHOR TERM IN BODY REGION IDENTIFIER COLUMN | ANCHOR TERM IN BODY CANDIDATE APPEARANCE COUNT |
| | | | | Back | IDENTIFIER OF CAPTION APPENDED REGION | 1 |

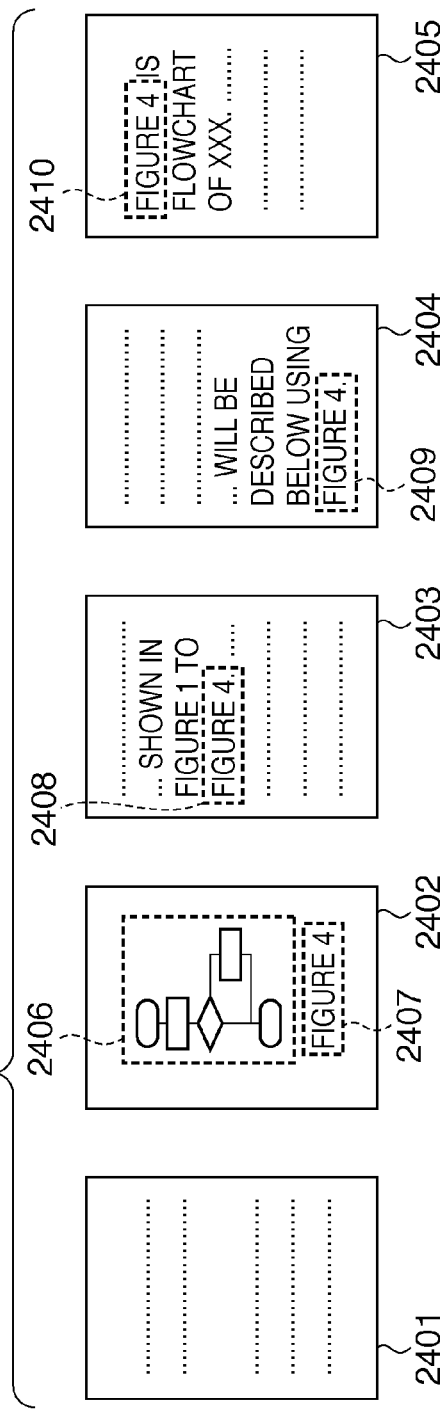

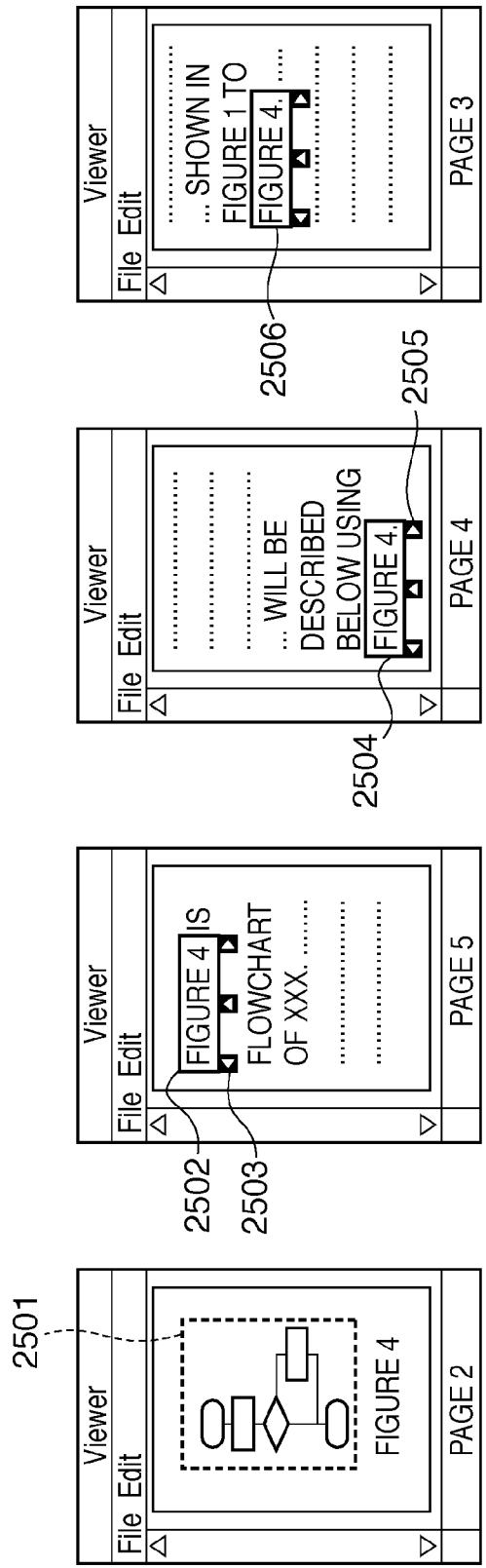

F I G. 27A

```
<x:functions>
  <x:function name ="init">
var link;
var list;
var list_idx;
var prevId;
function init () {
  link = new Array(4);
  link ["text_FIGURE 1"] = "image_FIGURE 1-1";
  link ["image_FIGURE 1"] = new Array("text_FIGURE 1-1", "text_FIGURE 1-2", "text_FIGURE 1-3");
  link ["text_FIGURE 2"] = "image_FIGURE 2-1";
  link ["image_FIGURE 2"] = new Array("text_FIGURE 2-1");
}
  </x:function>
  <x.function name ="jump_to">
function jump_to(fldId, btn)
{
    if (fldID =="") {
        message("NO LINK DESTINATION IS FOUND");
        return;
    }
    getField (fldId).color = red;
    getField (fldId).color = setFocus;
    if (btn == true) {
        getField (fldId + "-Prev" ).enable ();
        getField (fldId + "-Next" ).enable ();
        getField (fldId + "-Back" ).enable ();
    }
}
  </x:function>
  <x:function name ="make_list">
function make_list (orgList, expId)
{
    var i, j;
    var mlist = new Array(orgListlength);
    for (i = 0, j = 0, i < orgList.length; i++) {
        if (expID == undefined || orgList [i] ! =expId) {
            mlist [ j++] = orgList[i];
        }
    }
    if ( j < orgList.length) {
        mlist [ j] = expId;
    }
    return mlist;
}
  </x:function>
  <x:function name ="on_click2">
function on_click2(srcId)
{
    var srcTypes = srcId.split('-');
    var dstId;
    if (srcTypes [0].match("image_")) {
        list = make_list(link[srcTypes [0]].prevId);
        dstId = list[0];
        listIdx = 0;
        if (list.length > 1 ) {
```

```
        jump_to(dstId, true);
      }
      else {
        jump_to(dstId. false);
      }
    }
    elst {
      if (srcTypes. length < 3) {
        dstId = link[srcTypes[0]];
        jump_to(dstId, false);
      }
      else {
        if (srcType[2] =="Prev") {
          listIdx =(listIdx > 0) ? listIdx--- : list.length--1;
          dstId = list[listIdx];
          jump_to(dstId, true);
        }
        else if (srcType[2] =="Next") {
          listIdx =(listIdx < list.length-1) ? listIdx++ : 0;
          dstId = list[listIdx];
          jump_to(dstId, true);
        }
        else if (srcType[2] =="Back") {
          dstId = link[srcTypes[0]];
          jump_to(dstId, false);
        }
      }
    }
    prevId = srcId;
  }
  </x:function>
  <x:function name ="focus_out">
function focuc_out(fldId)
{
   setField(fldId +"-Prev").disable();
   setField(fldId +"-Next").disable();
   setField(fldId +"-Back").disable();
}
  </x:function>
</x:functions>
<x:actions>
  <x:action id ="text_FIGURE 1-1.onclick">on_click2("text_FIGURE 1-1")</x:action>
  <x:action id ="text_FIGURE 1-1.focusout">focus_out("text_FIGURE 1-1")</x:action>
  <x:action id ="text_FIGURE 1-1-Prev.onclick">on_click2("text_FIGURE 1-1-Prev")</x:action>
  <x:action id ="text_FIGURE 1-1-Next.onclick">on_click2("text_FIGURE 1-1-Next")</x:action>
  <x:action id ="text_FIGURE 1-1-Back.onclick">on_click2("text_FIGURE 1-1-Back")</x:action>
  <x:action id ="image_FIGURE 1-1.onclick">on_click2("image_FIGURE 1-1")</x:action>
  <x:action id ="image_FIGURE 2-1.onclick">on_click2("image_FIGURE 2-1")</x:action>

<x:action id ="initialize">
    init ();
    focus_out("text_FIGURE 1-1");
    focus_out("text_FIGURE 1-2");

</x:aciton>
</x:actions>
```

IMAGE PROCESSING APPARATUS, IMAGE PROCESSING METHOD, AND COMPUTER READABLE MEDIUM

BACKGROUND OF THE INVENTION

1. Field of the Invention

The present invention relates to an image processing apparatus, image processing method, and computer readable medium, which generate digital document data with a link to information from a paper document or digital document data.

2. Description of the Related Art

Conventionally, paper documents or digital documents which include "objects" and "sentences which refer to objects" have been popularly used. "Objects", in this case can be, "figure", "drawing", "photo", and "illustration" regions included in documents. "Sentence which refers to an object" indicates a sentence in a body, which is used to explain or exposit "object" or quotes it for the purpose of comparison. The "sentence which refers to an object" will be expressed as an "object reference sentence" hereinafter. In a document in which correspondences between "objects" and "object reference sentences" are not easily recognized, one requires much time to read that document, and also requires extra time to understand the contents of the document.

The following example illustrate a document in which correspondences between "objects" and "object reference sentences" are not easily recognized. In a document including a plurality of pages, (1) the "object" and the "object reference sentence" are located in different pages; (2) the "object" is and the "object reference sentence" are located in the same page, but the "object" and "object reference sentence" are located separately; and (3) Either the "object" or "object reference sentence" is too small to be viewed.

As described above, in a paper document or digital document in which correspondences between "objects" and "object reference sentences" are not easily recognized, the reader suffers a problem where he or she requires much time to read the document, and also requires extra time to understand the contents of the document. In order to solve such problem, Japanese Patent Laid-Open No. 11-066196 discloses a technique which creates hypertext data by generating links between figure number descriptions and figure descriptions in a body upon optically scanning a paper document to convert that document into a digital document. Upon browsing the digital document created by this technique, for example, when the user clicks a "figure number" in the body using, for example, a mouse, a figure corresponding to the "figure number" can be displayed on a screen.

However, according to Japanese Patent Laid-Open No. 11-066196, link information from the figure number (that is, an anchor term in the body) in an "object reference sentence" to an "object" is generated, but link information from the "object" to the "object reference sentence" as that in an opposite direction is not generated. For this reason, the user requires much time to search for the "object reference sentence" corresponding to the "object".

Next, a problem posed upon creating link information in the opposite direction (a link from an object to an object reference sentence) will be examined. When the body includes many "object reference sentences" corresponding to one "object", an object reference sentence from which the object is to be linked cannot be determined. For example, if the object is linked with an object reference sentence which appears first in the body, when the user browses the first "object reference sentence" corresponding to the "object", that object reference sentence is unlikely to be a desired explanation part. Therefore, the objective of the present invention is to allow the user to easily browse a plurality of object reference sentences when a plurality of object reference sentences corresponding to one object are included. Also, the present invention has as its objective to allow the user to easily select whether he or she returns to a page of an "object" or subsequently browses another "object reference sentence" after browsing of one object reference sentence.

SUMMARY OF THE INVENTION

According to one aspect of the present invention, there is provided an image processing apparatus comprising: region division unit configured to divide input document data into a body region, a caption region, and an object region to which the caption region is appended; text information acquisition unit configured to acquire text information included in each of the body region and the caption region divided by the region division unit; link processing unit configured to search the text information in the body region for an anchor term configured by a predetermined character string, to extract an anchor term configured by a predetermined character string from the text information in the caption region, and to generate a bi-directional link between a portion corresponding to the anchor term in the body region and a portion of the object region to which the caption region is appended; and conversion unit configured to convert the input document data into digital document data in which the portion corresponding to the anchor term in the body region and the portion corresponding to the object region to which the caption region is appended are bi-directionally linked based on the link generated by the link processing unit, wherein, if a plurality of identical anchor terms are found in the body region by the link processing unit, the link processing unit generates the link including control information which controls to, when the portion corresponding to the object region is operated by a user, highlight one of portions corresponding to the plurality of identical anchor terms in the body region, and to display a button used to display a portion corresponding to another anchor term of the plurality of identical anchor terms in the body region.

According to another aspect of the present invention, there is provided an image processing method to perform: a region division step of dividing input document data into a body region, a caption region, and an object region to which the caption region is appended; a text information acquisition step of acquiring text information included in each of the body region and the caption region divided in the region division step; a link processing step of searching the text information in the body region for an anchor term configured by a predetermined character string, extracting an anchor term configured by a predetermined character string from the text information in the caption region, and generating a bi-directional link between a portion corresponding to the anchor term in the body region and a portion of the object region to which the caption region is appended; and a conversion step of converting the input document data into digital document data in which the portion corresponding to the anchor term in the body region and the portion corresponding to the object region to which the caption region is appended are bi-directionally linked based on the link generated in the link processing step, wherein, if a plurality of identical anchor terms are found in the body region in the link processing step, the link generated in the link processing step includes control information which controls to, when the portion corresponding to the object region is operated by a user, highlight one of portions corresponding to the plurality of identical anchor terms in the body region, and to display a button used to display a portion corresponding to another anchor term of the plurality of identical anchor terms in the body region.

According to another aspect of the present invention, there is provided a computer-readable medium storing a program for controlling a computer to execute: a region division step of dividing input document data into a body region, a caption region, and an object region to which the caption region is appended; a text information acquisition step of acquiring text information included in each of the body region and the caption region divided in the region division step; a link processing step of searching the text information in the body region for an anchor term configured by a predetermined character string, extracting an anchor term configured by a predetermined character string from the text information in the caption region, and generating a bi-directional link between a portion corresponding to the anchor term in the body region and a portion of the object region to which the caption region is appended; and a conversion step of converting the input document data into digital document data in which the portion corresponding to the anchor term in the body region and the portion corresponding to the object region to which the caption region is appended are bi-directionally linked based on the link generated in the link processing step, wherein, if a plurality of identical anchor terms are found in the body region in the link processing step, the link generated in the link processing step includes control information which controls to, when the portion corresponding to the object region is operated by a user, highlight one of portions corresponding to the plurality of identical anchor terms in the body region, and to display a button used to display a portion corresponding to another anchor term of the plurality of identical anchor terms in the body region.

The present invention aims to improve user's convenience for confirmation of a reference part in generated digital document data. Also, the present invention allows the user to read a document more efficiently.

Further features of the present invention will become apparent from the following description of exemplary embodiments (with reference to the attached drawings).

BRIEF DESCRIPTION OF THE DRAWINGS

FIGS. 5A, 5B, and 5C are explanatory views of region division results of input image data 300;

FIG. 6 is a view of an example of digital document data, which corresponds to input image data 500, and is to be output in this embodiment;

FIGS. 9A and 9B are flowcharts of link configuration management table creation processing according to the first embodiment;

FIGS. 10A and 10B are explanatory views of an example of a plurality of page images and a processing result according to the first embodiment;

FIG. 11 is a table showing an example of field definitions according to the first embodiment;

FIG. 12 is a flowchart on the receiving side according to the first embodiment;

FIGS. 14A, 14B, 14C, 14D, and 14E are views showing an example of graphic data which define outer appearances of fields according to the first embodiment;

FIGS. 15A, 15B, 15C, 15D, 15E, and 15F show examples of a link configuration management table according to the first embodiment;

FIG. 16 is a flowchart of action definition generation processing according to the first embodiment;

FIGS. 17A, 17B, and 17C are tables showing an example of action definition settings according to the first embodiment;

FIGS. 18A, 18B, 18C, 18D, and 18E are explanatory views of the digital document data configuration according to the first embodiment;

FIG. 20 shows an example of an action definition table according to the second embodiment;

FIG. 21 is an explanatory view of the digital document data configuration according to the second embodiment;

FIG. 23 is a table showing an example of argument settings of an action function according to the second embodiment;

FIGS. 24A, 24B, and 24C are explanatory views of an example of a plurality of page images and a processing result according to the third embodiment;

FIGS. 25A, 25B, 25C, and 25D are explanatory views of an application according to the third embodiment;

FIGS. 27A and 27B are explanatory views of the digital document data configuration according to the fourth embodiment.

DESCRIPTION OF THE EMBODIMENTS

First Embodiment

[System Configuration]

Figure 1:
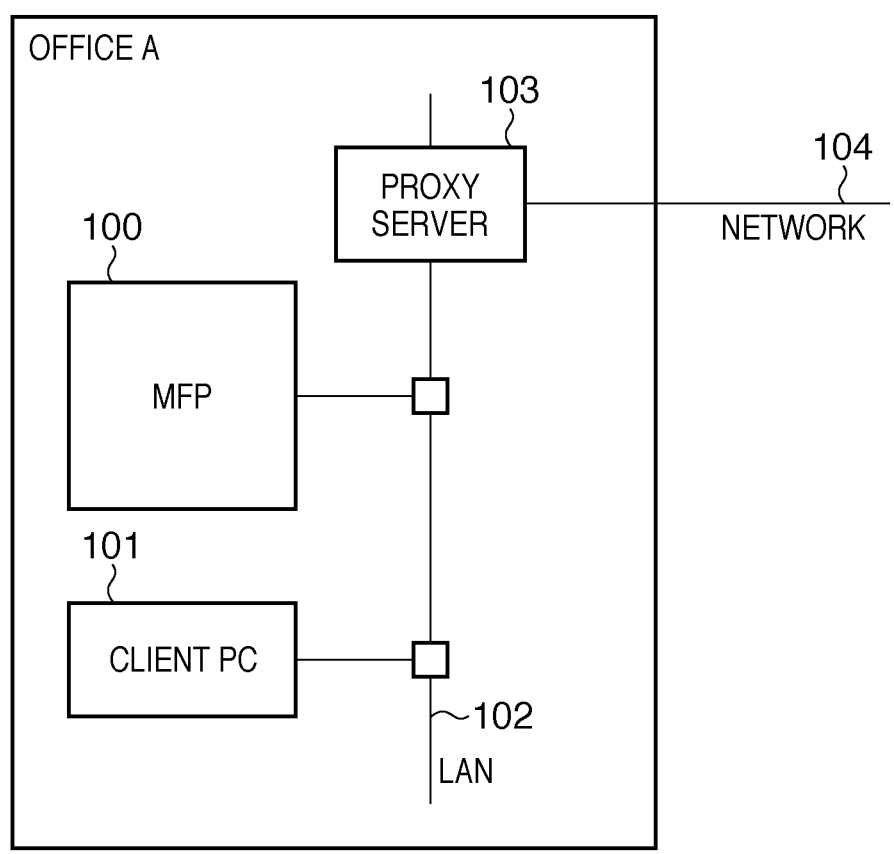
FIG. 1 is a block diagram showing an image processing system.

An embodiment for carrying out the present invention will be described hereinafter with reference to the drawings. FIG. 1 is a block diagram showing the arrangement of an image processing system according to this embodiment. Referring to FIG. 1, an MFP (Multi Function Peripheral) 100 as that which implements a plurality of types of functions (copy function, print function, send function, etc.) is connected to a LAN 102 established in office A. The LAN 102 is also connected to a network 104 via a proxy server 103. A client PC 101 as an information processing apparatus receives data sent from the MFP 100 and uses the functions included in the MFP 100 via the LAN 102.

For example, the client PC 101 sends print data to the MFP 100 to print a printed matter based on the print data using the MFP 100. Note that the arrangement shown in FIG. 1 is an example, and a plurality of offices having the same arrangement as in office A may be connected to the network 104. The network 104 is a communication network, which is typically implemented by the Internet, a LAN, WAN, telephone line, dedicated digital line, ATM or frame relay line, communication satellite line, cable television line, or data broadcasting wireless line. The network 104 can adopt arbitrary lines as long as they can exchange data. Also, each terminal of the client PC 101 and proxy server 103 has standard components equipped in a general-purpose computer. For example, each terminal includes a CPU, RAM, ROM, hard disk, external storage device, network interface, display, keyboard, and mouse.

[Detailed Arrangement of MFP]

Figure 2:
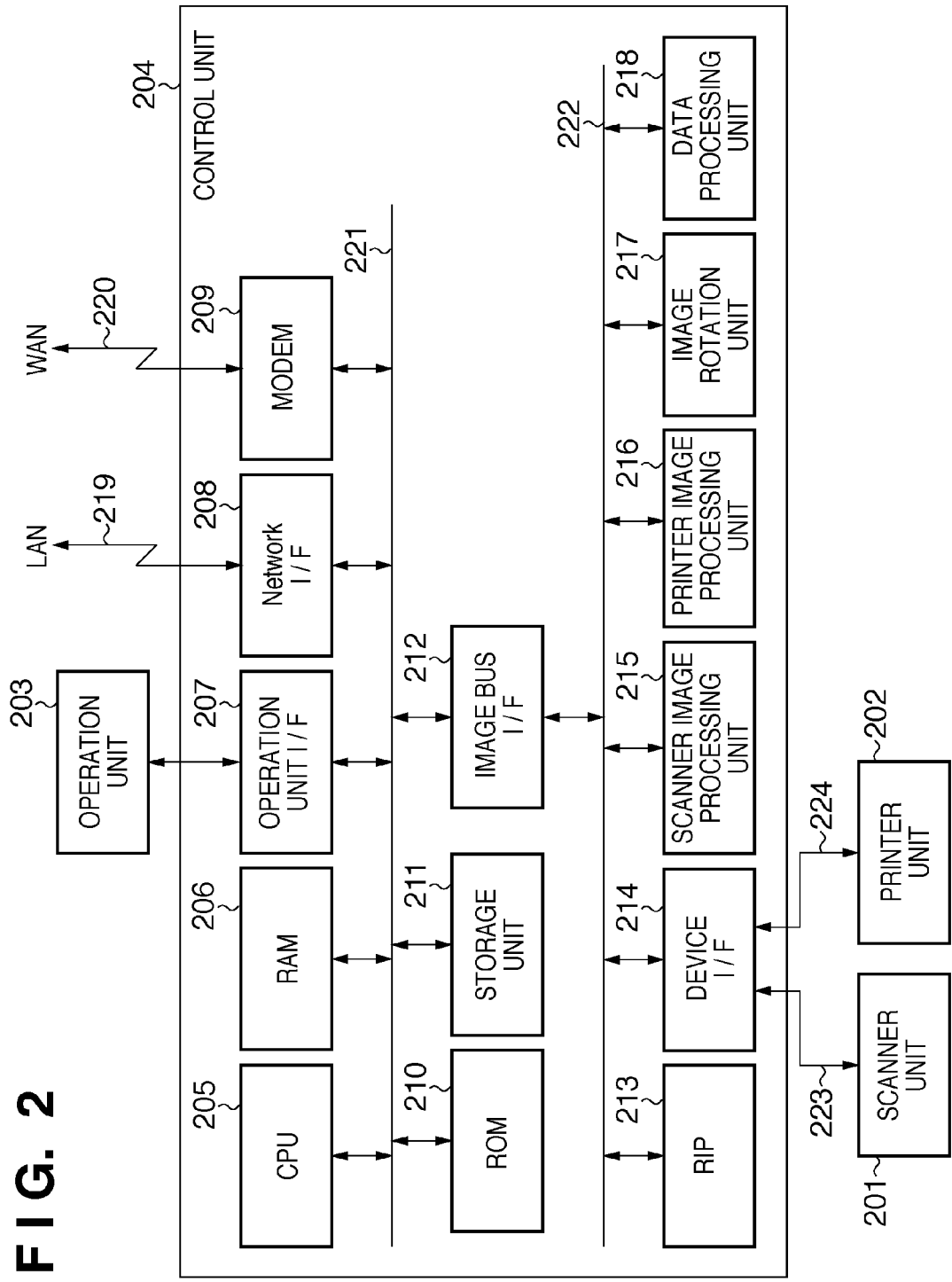
FIG. 2 is a block diagram showing an MFP 100 shown in FIG. 1.

FIG. 2 is a block diagram showing the detailed arrangement of the MFP 100 as an image processing apparatus of this embodiment. Referring to FIG. 2, the MFP 100 has a scanner unit 201 as an image input device, a printer unit 202 as an image output device, a control unit 204 which includes a CPU 205, and an operation unit 203 as a user interface. The control unit 204 is a controller which is connected to the scanner unit 201, printer unit 202, and operation unit 203, as well as to a LAN 219 and a public network (WAN) 220 as a general telephone network, thereby inputting/outputting image information and device information.

The CPU 205 controls respective units included in the control unit 204. A RAM 206 is a system work memory required for the CPU 205 to operate, and is also an image memory used to temporarily store image data. A ROM 210 is a boot ROM, and stores programs such as a boot program of the system. A storage unit 211 is a hard disk drive, and stores system control software and image data. An operation unit I/F 207 is an interface unit with the operation unit (UI) 203, and outputs image data to be displayed on the operation unit 203 to the operation unit 203. Also, the operation unit I/F 207 assumes a role of transferring information input by the user of this image processing apparatus at the operation unit 203 to the CPU 205. A network I/F 208 connects this image processing apparatus to the LAN 219, and inputs/outputs information in the form of packets. A modem 209 connects this image processing apparatus to the WAN 220, and inputs/outputs information by modulating/demodulating data. The aforementioned devices are allocated on a system bus 221.

An image bus I/F 212 is a bus bridge, which connects the system bus 221 and an image bus 222 that transfers image data at high speed, and converts data structures. The image bus 222 is configured by, for example, a PCI bus or IEEE1394. The following devices are allocated on the image bus 222. A raster image processor (RIP) 213 implements so-called rendering processing for analyzing PDL (Page Description Language) code data, and expanding the PDL code data into bitmap image data having a designated resolution. Upon expanding the PDL code data, pieces of attribute information are added for respective pixels or for respective regions. This processing will be referred to as image region determination processing hereinafter. With the image region determination processing, pieces of attribute information indicating types of objects such as text, line, graphics, and image are added for respective pixels or for respective regions.

For example, the RIP 213 outputs an image region signal according to a type of an object in a PDL description in PDL code data, and attribute information according to an attribute indicated by that signal value is saved in association with pixels or a region corresponding to the object. Therefore, pieces of associated attribute information are added to image data. A device I/F 214 connects, to the control unit 204, the scanner unit 201 as the image input device via a signal line 223 and the printer unit 202 as the image output device via a signal line 224, and converts synchronous/asynchronous systems of image data. A scanner image processing unit 215 corrects, modifies, and edits input image data. A printer image processing unit 216 applies, for example, correction and resolution conversion according to the printer unit 202 to print output image data to be output to the printer unit 202. An image rotation unit 217 rotates input image data to erect that image, and outputs the rotated image data. A data processing unit 218 will be described below.

[Detailed Arrangement of Data Processing Unit]

Figure 3:
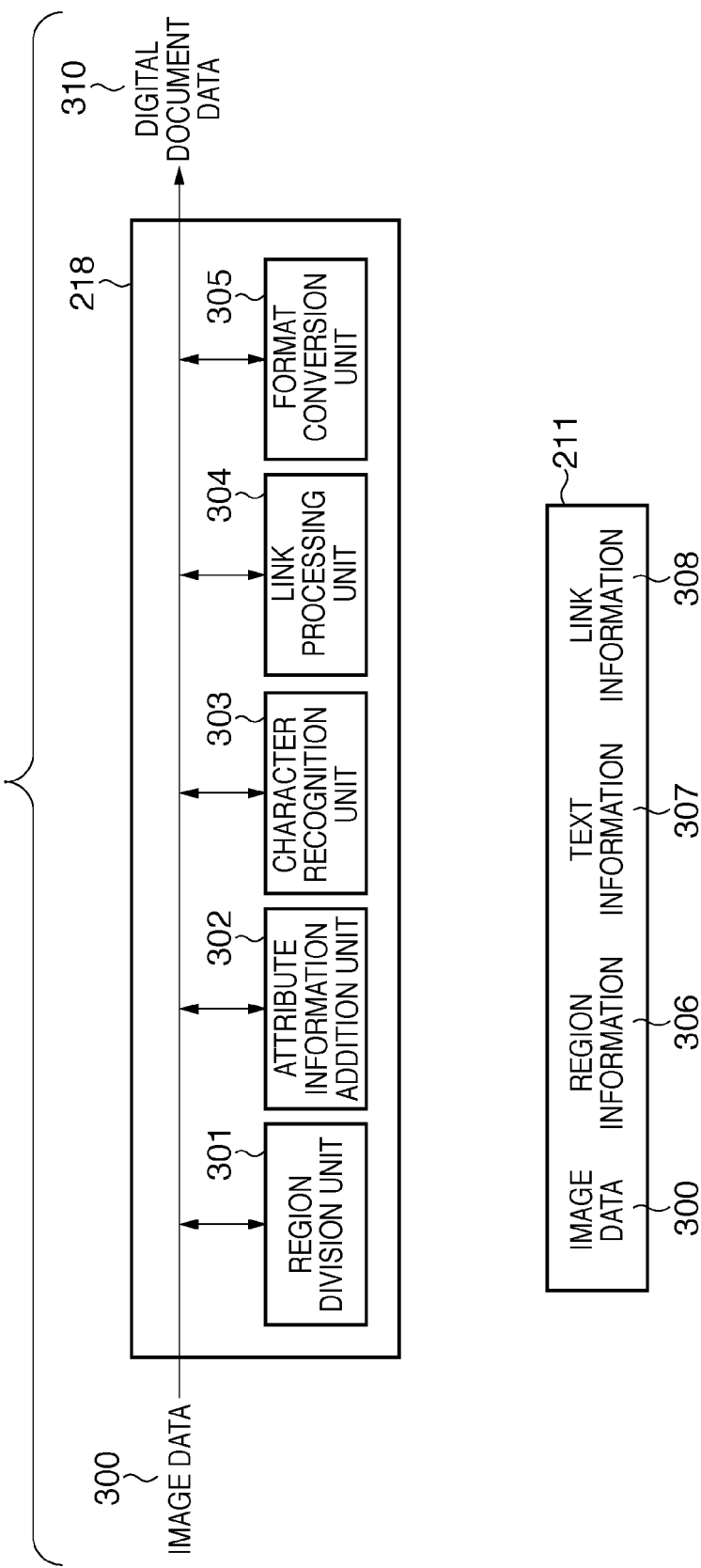
FIG. 3 is a block diagram showing an example of the arrangement of a data processing unit 218 shown in FIG. 2.

The data processing unit 218 shown in FIG. 2 will be described in detail below with reference to FIG. 3. The data processing unit 218 includes a region division unit 301, attribute information addition unit 302, character recognition unit 303, link processing unit 304, and format conversion unit 305. When image data 300 scanned by the scanner unit 201 is input, the data processing unit 218 processes the image data 300 using the processing units 301 to 305 to generate and output digital document data 310. FIG. 3 shows the configuration of data which are used for storage and management by the respective units of the data processing unit 218 in the storage unit 211 shown in FIG. 2. In this case, the storage unit 211 stores image data 300, region information 306, text information 307, and link information 308. The region division unit 301 receives image data scanned by the scanner unit 201 in FIG. 2 or image data (document image data) saved in the storage unit 211. The region division unit 301 extracts, for example, text, photo, figure, table, and illustration regions allocated within each page.

In this case, a known method can be used as the region extraction method (region division method). An example of such method will be described below. An input image is binarized to generate a binary image, and a resolution of the binary image is reduced to generate a decimated image (reduced-scale image). For example, upon generation of a decimated image of 1/(M×N), the binary image is divided for respective M×N pixels. If M×N pixels include a black pixel, a corresponding pixel after reduction is set as a black pixel; if they do not include any black pixel, the corresponding pixel is set as a white pixel, thereby generating a decimated image. Next, each part in which black pixels are coupled (coupled black pixels) in the decimated image is extracted, and a rectangle which circumscribes the coupled black pixels of that part is generated. When rectangles (a rectangle of one character) each of which is close to a character image size line up, or when a rectangle has a length or width close to a character image size (a rectangle of coupled black pixels formed by connecting several characters), and similar rectangles line up in the vicinity of their short sides, they are more likely to be character images which configure one character row. In this case, rectangles are coupled to obtain a rectangle which expresses one character row.

Then, a set of rectangles, each of which expresses one character row, and which have nearly the same lengths of short sides, and line up at nearly an equal interval in a column direction, are more likely to be a body part. Hence, these rectangles of character rows are coupled to extract a body region. Each of a photo region, figure region, and table region is extracted based on coupled black pixels having a size larger than a character image. As a result, for example, regions 501 to 506 are extracted from image data 500 shown in FIG. 5A. Note that attributes of respective regions are judged based on, for example, their sizes, aspect ratios, black pixel densities, and contour tracing results of white pixels included in coupled black pixels.

The attribute information addition unit 302 adds attributes to respective regions divided by the region division unit 301. A processing operation will be described below taking FIG. 5A as an example of the input image data 300. Since a region 506 includes a plurality of characters and rows in that page, and has a format of characters, rows, and paragraphs, an attribute {body} is added as a result of comprehensive determination. As for each of the remaining regions, whether or not a region of interest includes rectangles each close to a character image size is checked. Especially, in a region including character images, since rectangles of character images periodically appear in that region, whether or not that region include characters can be checked. As a result, an attribute {text region} is added to regions 501, 504, and 505 as regions including characters. However, since these regions do not have a format of characters, rows, and paragraphs, the attribute {body} is not added.

On the other hand, as for other regions, if a region size is very small, that region is determined as {noise}. When white pixel contour tracking is performed for coupled black pixels having a low pixel density, if circumscribed rectangles of white pixel contours orderly line up, that region is judged as {table}; otherwise, it is judged as {line image}. A region which has a high pixel density and is other than the aforementioned regions is judged as a picture or photo, and an attribute {photo} is added. Furthermore, as for each text region (a region having the attribute {text region}), which is judged that it is not a body (to which the attribute {body} is not added), when that region exists in the vicinity of (above or below) a region added with {table}, {line image}, or {photo}, it is judged as a text region as appended information required to explain the corresponding {table}, {line image}, or {photo} region, and an attribute {caption} is added. That is, a region having the attribute {caption} is determined based on a positional relationship, which is defined in advance, between a region {text region} and a region {table}, {line image}, or {photo}. Note that a region to which the attribute {caption} is added is saved in association with a region to which {caption} is appended so as to specify a region ({table}, {line image}, or {photo}) to which that {caption} is appended.

Of regions determined as {text region}, when a region includes a character image larger than that in the region with the attribute {body} and is located at a position different from a column setting of the region with the attribute {body}, an attribute {heading} is added. When a region includes a character image larger than that in the region with the attribute {body} and exists above the column setting of the region with the attribute {body}, an attribute "subheading" is added. Furthermore, when a region includes a character image equal to or smaller than a character image size in the region with the attribute {body}, and exists at an upper or lower end portion of a document, an attribute {page} (or {page header} or {page footer}) is added. When a region judged as {text region} is inapplicable to {body}, {heading}, {subheading}, {caption}, and {page}, an attribute {text} is appended. Determination for adding further detailed attributes to regions having the attribute {text region} is not limited to that described above. For example, in a region having the attribute {text region}, a region having an anchor term may be determined as {caption}. Also, the determination order may be changed, and a priority order upon addition of attributes may be defined.

As a result of the aforementioned attribute information addition processing, in the example of FIG. 5A, the region 501 is added with the attribute {heading}, the region 502 is added with the attribute {table}, the region 503 is added with the attribute {photo}, the region 504 is added with the attribute {text}, the region 505 is added with the attribute {caption}, and the region 506 is added with the attribute {body}. Note that since the region 505 is added with {caption}, the region 503 is associated as a region to which {caption} is appended.

The character recognition unit 303 executes known character recognition processing for regions including character images (those having attributes {text}, {body}, {heading}, {subheading}, and {caption}). Then, the character recognition unit 303 stores character code strings as a result of that processing as corresponding pieces of text information, and associates them with object regions.

In this way, information of the positions, sizes, and region attributes of the regions, information of a page, and text information (character code information) of character recognition results, which are extracted by the region division unit 301, attribute information addition unit 302, and character recognition unit 303, are saved in the storage unit 211. FIG. 5B shows an example of information saved in the storage unit 211 when image data 500 shown in FIG. 5A is processed as an example. Note that although a detailed description in FIGS. 5A and 5B is not given, it is desired to apply the character recognition processing to a character image region in a table while adding an attribute {text in table} to that region, and to save information like in an item "text information" in FIG. 5B. Since the region 504 is a character image region included in a photo or figure, an attribute {in photo of region 503} is added, as indicated by an item "attribute" for the region 504 in FIG. 5B.

The link processing unit 304 generates information required to configure a link between a region (to be referred to as a caption appended region hereinafter) appended with that with the attribute {caption} detected by the attribute information addition unit 302 and an anchor term included in the region with the attribute {body}. Then, the link processing unit 304 saves that information as the link information 308 in the storage unit 211. The anchor term is a character string (for example, "FIG. 1", "FIG. 1", etc.) which is included in a caption appended to an "object" region such as {photo}, {line image}, or {table}, and can specify that "object". When the region with attribute {body} includes this anchor term, this indicates that a neighboring sentence is an "object reference sentence" which explains/exposits or quotes the target "object". Therefore, the link information which associates them can be used to efficiently browse the document.

Note that the number of anchor terms which appear in the region with the attribute {body} with respect to one object is not limited to one. That is, a plurality of "text regions" (anchor terms) for one "object" are often extracted from the body, and link information having single-to-plural correspondences is generated in this case. In this case, regions on the plural side are "text regions", and a region on the single side is an "object". Practical correspondences will be described later in FIGS. 15A to 15F.

The link information generated by the link processing unit 304 is configured by an arbitrary number of field definitions. In this case, "field" is a link object region serving as a link source/destination which can be allocated in an arbitrary region in a page of an output digital document. Definitions of a field are configured by a field identifier used to uniquely identify the field, outer appearance definitions including a shape and position coordinates, and action information definitions including a field display method and a control instruction for an interactive operation. When an application uses digital document data including this link information, it can highlight a designated position according to the field outer appearance definitions, and can control page movement upon clicking a corresponding position using a mouse according to the action information definitions. An action in this case is to execute defined processing based on a user's operation (for example, clicking of an object region). Detailed processing contents of the link processing unit 304 will be described later.

The format conversion unit 305 converts the input image data 300 into digital document 310 using information obtained from the input image data 300, region division unit 301, attribute information addition unit 302, character recognition unit 303, and link processing unit 304. Examples of the digital document data 310 include SVG (Scalable Vector Graphics), XPS (XML Paper Specification), PDF (Portable Document Format), and Office Open XML. The converted digital document data 310 is saved in the storage unit 211 or is sent to the client PC 101 via the LAN 102. The document user browses the digital document data 310 using an application (for example, Internet Explorer, Adobe Reader, MS Office, etc.) installed in the client PC 101. Details upon browsing the digital document data 310 by the application will be described later.

The digital document data 310 includes page display information (a display image, etc.) based on, for example, graphics data, and content information (link information, etc.) based on a semantic description such as text. Therefore, roughly two processes of the format conversion unit 305 are available. In one process, filter processes such as planarization or smoothing, edge emphasis, color quantization, and binarization are applied to image regions (regions having, for example, attributes {table}, {line image}, and {photo}). Then, image data (for example, an image of a portion corresponding to a region added with the attribute {line image}) is converted into data which can be stored in the digital document data 310 as page display information. In practice, image data is converted into graphics data of a vector path description (vector data) or that of a bitmap description (for example, JPEG data). A technique for converting image data into vector data can use a known vectorization technique. The other process is generation of content information. More specifically, region information (positions, sizes, and attributes), character information in regions, and link information saved in the storage unit 211 shown in FIG. 2 are converted into the digital document data 310 in association with the aforementioned page display information.

Furthermore, in this format conversion unit 305, different conversion processing methods have to be often applied to respective regions depending on attributes of the regions. For example, vector conversion processing is suited to a graphic configured by black and white or several colors like characters and line images, but is not desired to be applied to an image region having tonality such as a photo. In order to execute appropriate conversion according to an attribute of each region, a correspondence table shown in FIG. 5C can be set in advance. For example, according to settings in FIG. 5C, vector conversion processing is applied to regions having the attributes {text}, {line image}, and {table}, and image clipping processing is applied to a region having the attribute {photo}.

Furthermore, the correspondence table in FIG. 5C also describes ON/OFF of processing for erasing pixel information of a corresponding region from the image data 300. For example, when a region having the attribute {text} is converted into vector path description data according to the settings in FIG. 5C, erase processing=ON is instructed. Hence, on the image data 300, processing for filling pixels corresponding to a portion covered by the converted vector path by its surrounding color is executed. Likewise, when a region having the attribute {photo} is clipped as a rectangular image part, processing for filling the interior of a region range corresponding to the clipped region on the image data 300 by its surrounding color is executed.

By executing such erase processing, the image data 300 which have undergone the processes for respective regions (after completion of filling processing) can be used as {background} image part data. In this background image data (background image), portions other than the regions extracted by the region division processing (for example, pixels corresponding to a background in the image data 300) remain. The description of the digital document data 310 includes a description to display graphics data (foreground images) obtained by the vector conversion processing and image clipping processing executed by the format conversion unit 305 to be overlaid on the background image part data (background image). Thus, graphics data which are free from any omission of information of background pixels (background color), and has no redundancy can be configured.

Hence, binary image clipping processing and pixel erase processing from the image data 300 may be applied to a {text} region part, but vectorization processing and image clipping processing may be skipped for regions of other attributes. That is, pixels which are not to be processed (pixel information in the regions having the attributes {photo}, {line image}, and {table}) remain in the background image part data, and a description is made to overlay {text} image parts on this background image.

Furthermore, a plurality of correspondence tables shown in FIG. 5C may be prepared, and may be selected in accordance with the used application (use purpose) and contents of the digital document data 310 to be output. For example, outputs based on the correspondence table shown in FIG. 5C are suited for re-use application such as a graphic editor since most of objects are converted into vector path descriptions and are excellent in image quality at the time of enlargement/reduction. As another creation example of the correspondence table, individual binary images for respective character colors of character images are generated and undergo lossless compression, thus allowing character image parts to be reproduced to have high quality. The remaining portion undergoes JPEG compression as a background image to assure a high compression ratio and a reduced data size. Such settings are suited for cases where data in which character images are easy to read is to be created while setting a high compression ratio. By selectively using the correspondence tables, appropriate digital document data can be generated.

[Configuration Example of Digital Document Data to be Generated]

FIG. 6 shows an example of the digital document data 310 to be generated in this case. In the example shown in FIG. 6, when the example of the image data 500 in FIG. 5A is processed, a description is made in an SVG format based on the data shown in FIG. 5B, which is saved in the storage unit 211. Note that the SVG format will be explained as an example of the description format, but the present invention is not limited to SVG as other description formats, for example, PDF, XPS, Office Open XML, and other PDL-based data formats are available.

In a description 600 of the digital document data corresponding to the image data 500 shown in FIG. 5A, descriptions 601 to 606 are respectively graphics descriptions for the regions 501 to 506 in FIG. 5A. In this case, the descriptions 601 and 604 to 606 are examples of character rendering descriptions using character codes, the description 602 is a vector path description of a vector-converted table frame, and the description 603 is an example of a description that pastes a clipped photo image. Note that in the examples of FIGS. 5B and 6, parts described using symbols such as coordinate values X1 and Y1 are to be actually described using numerical values indicating corresponding values. Also, a description 607 is a description example of link information. In the description 607, a description 608 includes field definitions for a caption appended region, and is configured by a field identifier 610 added with "image_01", field outer appearance definitions 611, and action definitions 612. Likewise, a description 609 includes field definitions for an anchor term region in the body, and is configured by a field identifier 613 added with "text_01", outer appearance definitions 614, and action definitions 615.

An operation example of an application when the user browses the digital document data 310 exemplified in FIG. 6 will be described below. When the user clicks on a caption appended region, that is, a rectangular region of the outer appearance definitions 611, the application performs an operation according to contents defined by the action definitions 612. That is, the application acquires a field 609 having the field identifier "text_01", and sets a focus while highlighting a rectangle defined by X7, Y7, W7, and H7 as an outer appearance of this field 609 by red. After the focus is set, the application, for example, executes control for moving to a page having the corresponding field, and locating the corresponding portion at the center of a display screen. Therefore, the user can directly transit to a sentence portion including an anchor term region of a link destination by a single-click operation, and can easily find that portion since the portion is highlighted. Likewise, when the user clicks an anchor term region in the body, the application sets a focus while highlighting a rectangle of a caption appended region according to the action definitions 615. In this manner, the user can browse the document while easily moving between the caption-appended region and anchor-term region which are linked in the browsing application. Note that as the outer appearance (display) of the field, a circle, an arbitrary path, a bitmap image of a button, and so forth can be designated in addition to the rectangle.

Note that in this description, the region division unit 301, attribute information addition unit 302, and character recognition unit 303 extract the region information 306 and text information 307 from the input image data. Even when digital document data is input, once each page is converted into image data, the same processing can be applied. On the other hand, the input digital document format may be interpreted intact to extract the aforementioned regions and attributes. The digital document format in this case includes print data such as PDL data, application data such as SVG data, XPS data, PDF data, and Office Open XML data, and Web display data such as HTML (HyperText Markup Language) data. At the same time, the format conversion unit 305 extracts graphic information from the input digital document format, and converts and outputs the extracted graphic information in correspondence with the format of the digital document data 310 to be output. However, since the contents of region information/text information extraction processing and graphic information extraction/format conversion processing from these individual digital document formats are not related to the gist of the present invention, a description thereof will not be given.

[Link Processing Unit]

Figure 4:
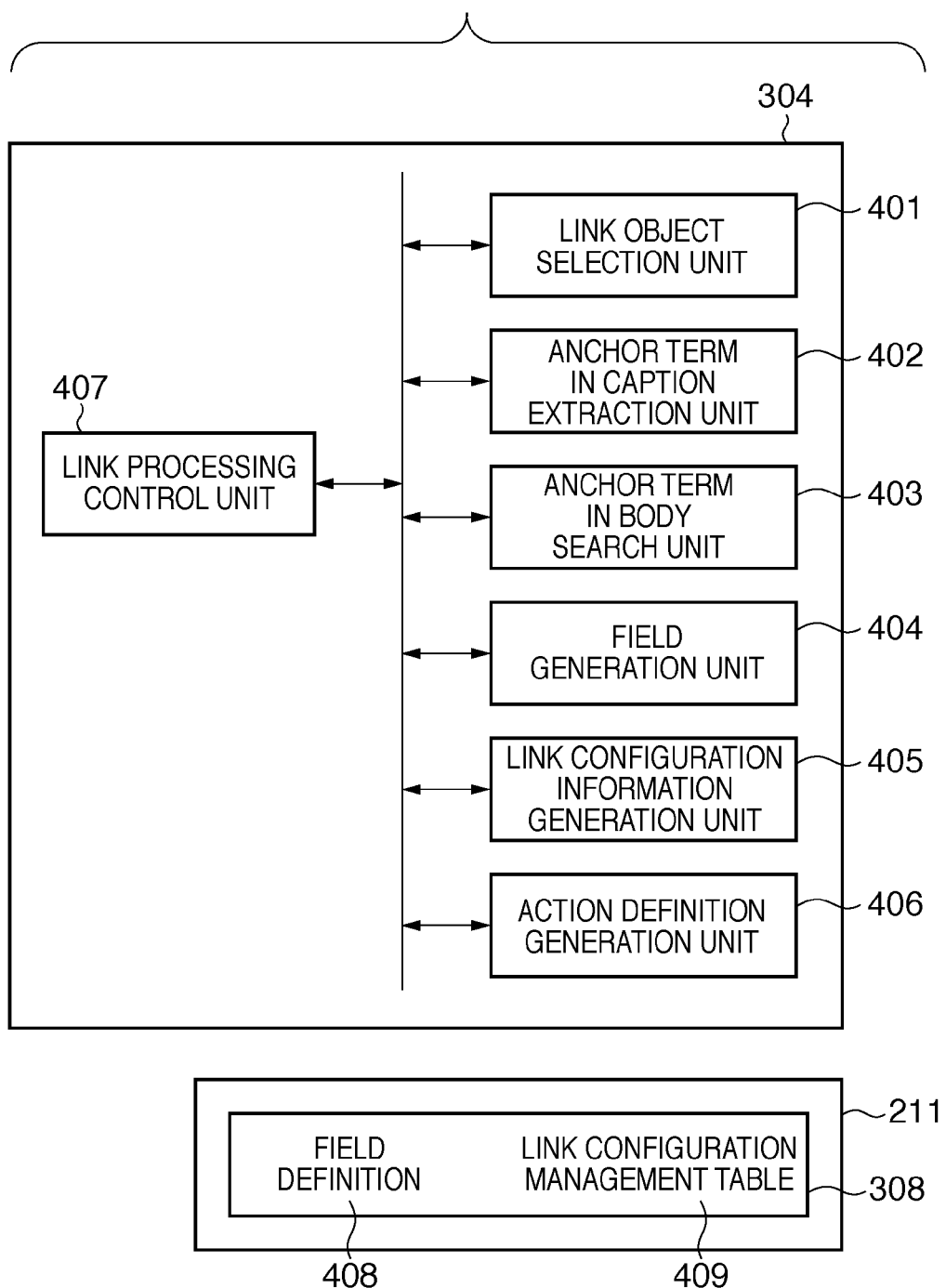
FIG. 4 is a block diagram showing an example of the arrangement of a link processing unit 304 shown in FIG. 3.

FIG. 4 is a block diagram showing an example of the arrangement of the link processing unit 304. The processing contents of respective units included in the link processing unit 304 will be described below. A link object selection unit 401 selects link object regions from the input image data. More specifically, the link object regions include, for example, {photo}, {line image}, and {table} object regions appended with captions (that is, caption appended regions) and a {body} text region including anchor term character strings.

An anchor term in caption extraction unit 402 extracts anchor terms related to the caption appended regions selected by the link object selection unit 401. More specifically, the anchor term in caption extraction unit 402 interprets text information of each appended caption region to search for an anchor term (for example, "FIG. 1", "FIG. 1", etc.). When an anchor term is found, the anchor term in caption extraction unit 402 extracts that portion as an anchor term in caption, and the remaining portion as a caption term. Since the anchor term in caption extraction unit 402 also includes characteristics of character codes, and a dictionary, it has the function of excluding an insignificant character string (for example, a meaningless symbol string). This is to cope with character recognition errors which interpret, as characters, an ornament, division line, and image, which appear at boundaries in a text part of the document.

Also, in order to extract anchor terms, the anchor term in caption extraction unit 402 includes multilingual character string patterns of, for example, figure numbers and corresponding character recognition error patterns, thus improving anchor term extraction precision, and attaining character correction of anchor terms. The same applies to caption terms. That is, the anchor term in caption extraction unit 402 can execute, for example, interpretation and character recognition error correction in natural language processing, and can also have a function of correcting and excluding symbols and character ornaments, which appear at boundaries or at the beginning or end of anchor terms.

An anchor term in body search unit 403 searches a text region such as a {body} region for all specific character strings ("figure", "Fig.", etc.) as anchor terms used in the anchor term extraction processing of the anchor term in caption extraction unit 402. Then, the anchor term in body search unit 403 detects these character strings as anchor term candidates corresponding to objects. Also, the anchor term in body search unit 403 detects reference term candidates in the {body} region, which include anchor terms, and explain/exposit or quote the caption appended regions. In this case, the anchor term in body search unit 403 can also create search indices (an index creation technique and quick search technique using indices can use a known index creation/search technique) required to attain a quick search. Also, the anchor term in body search unit 403 can attain high-speed processing by conducting a collective search using specific character strings of a plurality of anchor terms.

Also, since the anchor term in body search unit 403 includes multilingual character string patterns of, for example, figure numbers and corresponding character recognition error patterns even for reference terms in the {body} region, it can improve the search precision, and can provide a correction function. Note that the anchor term in the body search unit 403 extracts anchor term candidates. Each anchor term in body candidate is settled as an actual anchor term when it is associated with an anchor term extracted by the anchor term in caption extraction unit 402 by processing to be described later. However, an anchor term in body candidate will also be described as an anchor term in body for the sake of simplicity.

A field generation unit 404 generates descriptions of field definitions of link object regions. The link object regions include the caption appended regions selected by the link object selection unit 401, and regions including character strings of anchor terms in body, which are searched and extracted by the anchor term in body search unit 403. Note that field definitions at the generation timing are incomplete ones, in which only field identifiers and outer appearances are defined, but action definitions that define links between fields are not settled. Then, by defining pieces of action information of respective fields in association with each other based on link configuration information (to be described later) after all pages are processed, bi-directional links between "caption appended regions (objects)" and "object reference terms (anchor terms) in body" are completed.

Furthermore, the field generation unit 404 can generate a plurality of fields in the vicinity of a link object region, and can define different link destinations for these fields. Such fields can be configured to change their positions so as to be distinguished from other fields, and to have button-like outer appearances which have icons and label character strings that allow the user to recognize their functions. A practical example of such button fields will be described later. Field definitions 408 generated by the field generation unit 404 are stored and managed as one of the pieces of information which configure the link information 308 shown in FIG. 3.

A link configuration information generation unit 405 generates and updates a link configuration management table 409 required to summarize link configuration information such as field identifiers, accumulated appearance counts, and link destination information of respective fields when the aforementioned field generation unit 404 generates link object fields. The link configuration management table 409 is also stored and managed as one of the pieces of information that configure the link information 308. Detailed contents of the link configuration management table 409 will be described later. An action definition generation unit 406 generates action definitions corresponding to respective fields using the link configuration management table 409 generated by the link configuration information generation unit 405, and adds these definitions to respective fields in the field definitions 408.

A link processing control unit 407 controls the overall link processing unit 304. The link processing control unit 407 mainly distributes respective regions in the image data 300 to the appropriate processing units 401 to 406 based on the region information 306 (positions, sizes, and attributes) and text information 307 in the regions, which are saved in the storage unit 211 shown in FIG. 2. Also, the link processing control unit 407 executes control for passing information output from the respective processing units 401 to 406 to the appropriate processing units.

The operations of the respective units (the processing units 401 to 407 shown in FIG. 4) of the link processing unit 304 will be covered again and described in detail in an actual processing example to be described later.

[Processing Sequence (Overview)]

Figure 7:
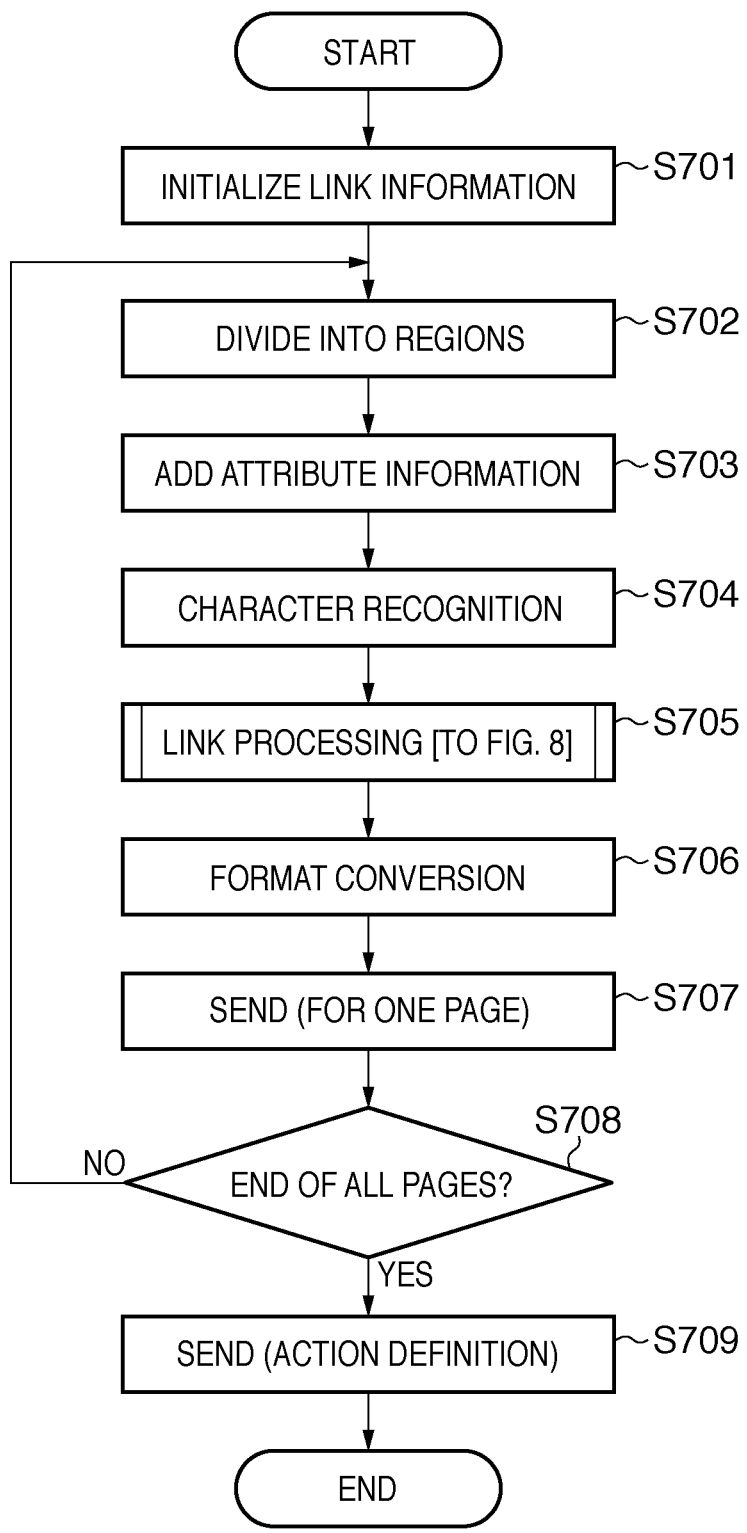
FIG. 7 is a flowchart of overall processing according to the first embodiment.

An overview of overall processing to be executed by the image processing system of this embodiment will be described below with reference to the flowchart of FIG. 7. Assume that the flowchart shown in FIG. 7 is executed by the data processing unit 218 shown in FIG. 2 (the processing units 301 to 305 shown in FIG. 3). Note that in this embodiment, the CPU 205 serves as the data processing unit 218 (the processing units 301 to 305 in FIG. 3) when it reads out and executes computer programs stored in the storage unit 211. However, the present invention is not limited to this. For example, the data processing unit 218 may be implemented by hardware such as an electronic circuit.

FIG. 7 is a flowchart for processing multi-page image data input by the scanner unit 201 (FIG. 2) for each page, and converting the image data into multi-page digital document data. Assume that page images shown in FIG. 10A are input as the multi-page image data. The flowchart of FIG. 7 will be described below.

In step S701, the data processing unit 218 initializes the link information 308, that is, the field definitions 408 related to link object regions and the link configuration management table 409 which manages link relationships among fields. The contents of the link information 308 will be described in detail later.

In step S702, the region division unit 301 extracts regions from input image data for one page. For example, the region division unit 301 extracts a region 1008 from image data 1001 (first page) in FIG. 10A. In step S702, pieces of information "coordinate X", "coordinate Y", "width W", "height H", and "page" shown in FIG. 10B are saved in the storage unit 211.

In step S703, the attribute information addition unit 302 adds an attribute to each region divided in step S702. In the example of image data 1002 (second page) shown in FIG. 10A, the attribute information addition unit 302 adds an attribute {line image} to a region 1010, and an attribute {caption} to a region 1011. Note that the attribute information addition unit 302 also adds, to this region 1011, information indicating that a region to be appended is the region 1010. That is, the region 1010 is a caption appended region. In step S703, pieces of information "attribute" and "caption appended region" shown in FIG. 10B are saved in the storage unit 211.

In step S704, the character recognition unit 303 applies character recognition processing to regions to which an attribute {character region} ({body}, {caption}, {heading}, {subheading}, etc.) is added (to be referred to as text regions hereinafter) in step S703, and holds the results as text information in association with the object regions. In step S704, "text information" shown in FIG. 10B is stored in the storage unit 211.

In step S705, the link processing unit 304 executes link processing which will be described below using the flowchart of FIG. 8. Upon completion of this processing, the process advances to step S706. Details of processes in steps S705 and S706 executed when respective pages in FIG. 10A are input will be described below taking the input data shown in FIG. 10A as an input example.

[Link Processing (when First Page (Image Data 1001) is Input)]

Details of the processing in step S705 will be described first with reference to the flowchart of FIG. 8 taking as an example a case in which the image data 1001 shown in FIG. 10A is input. This processing sequence is implemented when the CPU 205 reads out and executes programs stored in, for example, the ROM 210 or storage unit 211. In step S801 in FIG. 8, the link object selection unit 401 in the link processing unit 304 selects one of regions, which have not undergone link information generation processing, of the text regions based on the region information 306 saved in the storage unit 211. If a text region to be processed remains, the link object selection unit 401 selects that text region as an object to be processed, and the process advances to step S802. If no text region to be processed remains, or if all the text regions have been processed, the process jumps to step S807. Since the image data 1001 includes the {body} region 1008 of text regions, the process advances to step S802.

In step S802, the anchor term in body search unit 403 searches the text information 307 of the text region selected by the link object selection unit 401 for all specific character strings ("figure", "Fig.", etc.) as anchor terms. This specific character string matches a character string used in a search by the anchor term in caption extraction unit 402 in step S808 to be described later. If anchor terms in body are detected, the process advances to step S803. If no anchor term in body is detected, it is determined that the region does not include any portion to which link information is added, and the process returns to step S801. Then, the next text region to be processed is selected. In case of the image data 1001, a region 1009 including a character string "FIG. 1" is detected from the region 1008 as a region including a character string of an anchor term (to be referred to as an anchor term in body region hereinafter).

In step S803, the field generation unit 404 generates a field to have the anchor term in body region detected in step S802 as a link object, and associates a field identifier and graphic data that defines a field outer appearance with the field. Information of the generated field is added to the field definitions 408 in the storage unit 211.

In this case, "field identifier" is identification information of a field, which is added to express a property of the field itself, so as to add a link relationship between fields in subsequent processing. In this embodiment, a character string "A_B-C[-D]" is used as a configuration system of the field identifier. In this case, "A" is a character string which indicates a field type, that is, "caption appended region" or "anchor term in body region". In this embodiment, assume that a caption appended region is expressed by "image", and an anchor term in body region is expressed by "text". "B" is a character string of an anchor term used in that field, for example, "FIG. 1", "FIG. 2", etc. "C" is an ordinal number assigned to a plurality of regions having the same anchor term in an order of appearance.

Note that the following description of this embodiment assumes a case in which a plurality of anchor term in body regions having the same anchor term appear, but does not assume a case in which a plurality of caption appended regions having the same anchor term appear. This follows a general fact that one document does not include a plurality of objects having, for example, the same figure number, but a principal reason is for the sake of simplicity. Hence, in order to cope with such exception, a caption appended region and anchor term in body may be equivalently handled. The part "[-D]" is an arbitrary character string required to identify a button field appended to a certain field, and is omitted in fields other than the button field. A practical example of the button field will be described later. According to the aforementioned rules, a character string "text_figure1-1" is associated with the anchor term in body region 1009 included in the region 1008 as a field identifier. In this case, the part "[-D]" is omitted.

Graphic data which defines a field outer appearance is rendering information displayed in correspondence with a field upon browsing the digital document data 310 generated by this embodiment using the application. FIG. 14A illustrates an example of graphic data which defines a field outer appearance. Graphic data 1401 indicates that of the first page of digital document data corresponding to (a part of) the image data 1001. This is rectangular information rendered to surround graphic data 1402 (that is, data which is overlaid on the graphic data 1401 and indicates the region 1009 including the anchor term "FIG. 1").

The graphic data 1402 is used to highlight the position of an anchor term in an explanation term in the {body} region. That is, when the user moves from a page having a caption appended region to a page having a {body} region including an anchor term, the graphic data 1402 is also used as rendering information that allows the user to easily recognize a position to be viewed (paragraph and row positions). FIG. 14B shows an example in which graphic data 1404 of the anchor term is highlighted. Note that the graphic data may be generated to surround, for example, a whole sentence as rendering information required to display the position of an explanation term in the {body} region to be easy to recognize in place of the position of the character string of the anchor term. This embodiment has explained the graphic data as a rectangle. However, the present invention is not limited to a rectangle, and the graphic data may have an arbitrary shape, line, or bitmap as long as it is rendering information required to highlight the anchor term so as to allow the user to easily recognize that position.

A field 1120 in FIG. 11 is an example of a field generated from the image data 1001 shown in FIG. 10A. The field 1120 corresponds to the anchor term region 1009 in the image data 1001, and "text_figure1-1" is associated as a field identifier 1101. Also, as outer appearance definition graphic data 1102, graphic data required to render a rectangle ("coordinate X", "coordinate Y", "width W", and "height H")=("X20", "Y20", "W20, and "H20") is associated. Note that an action definition 1103 of the field definitions is not determined yet, and its contents are blank in this stage.

In step S804, the link configuration information generation unit 405 updates the link configuration management table 409 held in the storage unit 211 so as to build a correspondence between fields. The link configuration management table 409 aims at defining action definitions for respective fields in the field definitions 408 based on information obtained from the entire input document data, thus realizing a link function on the application.

FIGS. 15A to 15F show examples of the link configuration management table. FIGS. 15A to 15F show examples in which the link configuration management table is updated as the processing progresses. The link configuration management table manages columns of caption appended region related information and those of anchor term in body region related information as a pair. The caption appended region related information includes a column of an anchor term in caption, and that of a field identifier generated for the caption appended region in step S809 to be described later. The anchor term in body region related information includes a column of an anchor term in body, that of an anchor term in body appearance count, and that of a field identifier generated for the anchor term in body. These pieces of information are saved in the link configuration management table 409 in the storage unit 211, which is updated as needed in steps S804 and S810.

[Update Processing of Link Configuration Information]

Details of the update processing of the link configuration information in step S804 will be described below along the flowchart in FIG. 9A while taking as an example a case in which the field 1120 of FIG. 11 is processed as a link object.

The link configuration information generation unit 405 determines in step S901 whether or not the link configuration management table includes a data row in which the contents of an item "anchor term in body" match an anchor term of the field of interest. If such data row is included, the link configuration information generation unit 405 selects that data row as an object to be processed, and the process jumps to step S905. If such data row is not included, the process advances to step S902. Since the link configuration management table is empty at the input timing of the image data 1001, the process advances to step S902.

The link configuration information generation unit 405 determines in step S902 whether or not the link configuration management table includes a data row in which the contents of an item "anchor term in caption" match an anchor term in the field of interest. More specifically, the link configuration information generation unit 405 extracts a character string of a part that indicates an anchor term from a character string of a field identifier of interest, and compares that character string with the contents of a data row. If such data row is included, the link configuration information generation unit 405 selects that data row as an object to be processed, and the process jumps to step S904. If such data row is not included, the process advances to step S903. Since the link configuration management table is empty with respect to the anchor term "FIG. 1" in the identifier "text_figure1-1" of the field 1120 at the input timing of the image data 1001, the process advances to step S903.

In step S903, the link configuration information generation unit 405 adds a new blank data row to the link configuration management table. Subsequent processes are executed for this new data row as an object. In step S904, the link configuration information generation unit 405 describes a character string of an anchor term in the field of interest in an item "anchor term in body" in the object data row. In this example, an anchor term "FIG. 1" in the field 1120 is described. In step S905, the link configuration information generation unit 405 increments the anchor term in body appearance count of the object data row by +1. In this example, since this anchor term appears for the first time in this stage, the appearance count is updated from 0 to 1.

In step S906, the link configuration information generation unit 405 adds a field identifier of the field of interest to an item "anchor term in body region field identifier" in the object data row. In this example, according to the aforementioned rules, "text_figure1-1" is added. After completion of step S906, the process returns to step S804 in FIG. 8. FIG. 15A shows an example of the contents of the link configuration management table after completion of step S804 for the field 1120.

Referring back to FIG. 8, in step S805 the field generation unit 404 additionally generates a field having an outer appearance of a button (to be referred to as a button field hereinafter) in the vicinity of the field of the region having the anchor term generated in step S803. The button field to be added in this case is used for the purpose of defining a plurality of actions for the anchor term in body region. In this example, assume that three button fields required to define the following three actions are generated:

(1) an action to highlight and set a focus on a previous anchor term in body region;

(2) an action to highlight and set a focus on a next anchor term in body region; and (3) an action to highlight and set a focus on a caption appended region.

Actions (1) and (2) are generated under the assumption that the document data includes a plurality of anchor term in body regions which refer to the same caption appended region (object). These actions aim at mutually moving display positions between a plurality of anchor term regions upon browsing the application. Action (3) aims at moving a display position to a corresponding caption appended region in the same manner as the field generated in step S803, and is used to explicitly distinguish the movement between anchor terms by actions (1) and (2).

In an example of the process in step S805 for the field 1120, button fields respectively having field identifiers "text_figure1-1-Prev", "text_figure1-1-Next", and "text_figure1-1-Back" are generated for the purpose of actions (1) to (3). FIG. 14C shows an example of outer appearance definitions of the respective fields. Actions (1), (2), and (3) above are allocated to line up along the lower end of the graphic data 1404 as buttons having bitmaps 1405, 1406, and 1407, respectively. These outer appearances are presented only for exemplary purposes, and arbitrary outer appearances may be used as long as the user can recognize them as indications for instructions. For example, buttons having text labels "previous", "next", and "back" may be used. Also, a character string of the body may be prevented from being hidden by changing, for example, the positions, sizes, and colors of the buttons. Fields 1121 to 1123 in FIG. 11 are examples of field definitions for these button fields. Note that the contents of their action definitions are empty at this time as in the field 1120.

If a plurality of anchor terms are detected from the text region in step S802, it is determined in step S806 whether or not anchor terms to be processed still remain. If anchor terms to be processed still remain, the process returns to step S803 to repeat the processes in step S803 and subsequent steps. If no anchor term to be processed remains, the process returns to step S801 to process the next text region to be processed.

In step S807, the link object selection unit 401 selects one of regions (objects), which have not undergone field generation processing, of caption appended regions in the region information 306 saved in the storage unit 211. That is, if a caption appended region to be processed remains, the link object selection unit 401 selects that caption appended region as an object to be processed, and the process advances to step S808. If all the caption appended regions have already been processed, the processing ends, and the process returns to step S705 in FIG. 7. Since the image data 1001 does not include any caption appended region, the processing ends, and the process returns to step S705 in FIG. 7.

[Format Conversion Processing]

Details of format conversion processing in step S706 in FIG. 7 executed when the image data 1001 is input will be described below. In step S706, the format conversion unit 305 converts the image data 300 into the digital document data 310 based on the image data 300 and various kinds of information saved in the storage unit 211 shown in FIG. 10B. Note that the format conversion unit 305 applies conversion processing to regions in the image data 300 according to a conversion correspondence table that describes a conversion processing method to be applied to the region 1008, as described above using FIG. 4. In this case, the format conversion unit 305 executes conversion using the conversion correspondence table shown in FIG. 5C. That is, data obtained by applying vector conversion to the {body} region having the text attribute, and background image data obtained by erasing pixels of a text part from the image data are described as a graphic description of the page.

Also, as link information, the fields 1120 to 1123 in FIG. 11 are described as well as their field descriptors and outer appearance definition graphic data. However, in the current stage, since action definitions are not defined yet, as described above, reference information to another part of the digital document data 310 as for action contents of the respective fields is described. Actual action contents are sent in step S709 to be described later, and are added to the digital document data 310.

FIG. 18A shows a data description example of the first page of the digital document data 310 generated by the format conversion unit 305 for the image data 1001. A description 1801 is a description example of graphic data of a background image, a description 1802 is that of a path description of a text part, and a description 1803 is that of fields as link information. A description 1804 in the description 1803 is a description example corresponding to the field 1120 in FIG. 11. In this description 1804, the field identifier is defined in a description 1805, outer appearance definitions are defined in a description 1806, and action definitions are defined in a description 1807. This description 1807 describes an action (onclick) at the time of clicking to refer to an element having an id "text_figure1-1.onclick". That element which actually describes action contents is added to the digital document data in action definition sending processing (S709) after completion of sending of all pages, as will be described later. Likewise, a description 1808 is a description example corresponding to the field 1121 in FIG. 11. In this description 1808, the field identifier is defined in a description 1809, outer appearance definitions are defined in a description 1810, and action definitions are defined in a description 1811.

[Link Processing (when Second Page (Image Data 1002) is Input)]

Details of the processing in step S705 in FIG. 7 executed when the image data 1002 of the second page is input will be described below with reference to the flowchart shown in FIG. 8.

The link object selection unit 401 determines in step S801 that no text region is included, and the process jumps to step S807. In step S807, the link object selection unit 401 selects a caption appended region to be processed, and the process advances to step S808. In this example, the link object selection unit 401 refers to an item "caption appended region", and selects the region 1010 first from the region 1010 and a region 1012 as caption appended regions to be processed. Then, the process advances to step S808.

In step S808, the anchor term in caption extraction unit 402 extracts an anchor term and caption term from text information of a caption region appended to the caption appended region selected by the link object selection unit 401. If an anchor term is extracted, the process advances to step S809; otherwise, the process returns to step S807. Since the caption appended region 1010 is extracted from the image data 1002, the process advances to step S809. The "anchor term" extracted from the caption region in step S808 is text information (character string) required to identify the caption appended region, as described above. On the other hand, the "caption term" is text information (character string) which is included in the caption region and is used to explain the caption appended region.

A caption appended to a caption appended region has one of the following four configurations: (1) that which describes only an anchor term; (2) that which describes only a caption term; (3) that which describes both terms; and (4) that which is other than the above configurations. For example, an anchor term is normally expressed as a combination of a specific character string (such as "figure" or "Fig."), a number, and a symbol (corresponding to (3) above). Hence, an anchor character string dictionary which registers these specific character strings is prepared in advance, and a caption term is compared with the dictionary to specify an anchor part (anchor character string+number/symbol). Of a character string of a caption region, a character string other than an anchor term can be judged as a caption term. In the image data 1002, text information of the caption region 1011 appended to the caption appended region 1010 is "FIG. 1 AAA". Therefore, an anchor term is "FIG. 1", and a caption term is "AAA".

In step S809, the field generation unit 404 generates a field to have the caption appended region from which the anchor term is extracted in step S808 as a link object, and associates a field identifier and graphic data that defines a field outer appearance with that field. For the caption appended region 1010 in FIG. 10A, a field 1124 shown in FIG. 11 is generated. With the field 1124, "image_figure1-1" is associated as the field identifier 1101. Also, as the outer appearance definition graphic data 1102, graphic data of a rectangle (coordinate X, coordinate Y, width W, and height H)=(X24, Y24, W24, and H24) is associated. FIG. 14D illustrates a region 1406 as the graphic data of this rectangle. This data is used to highlight the caption appended region part like a display 1408 when the application displays image data 1407 of the second page, as shown in FIG. 14E. Note that the coordinates of the graphic data of this rectangle may be the same as those of a circumscribed rectangle of the caption appended region, or they may assume values slightly larger than those of the circumscribed rectangle to allow the user to easily view that region. Also, the display method is not limited to a rectangle, but rendering information may have an arbitrary shape, line, or bitmap as long as it highlights the caption appended region so as to be easily recognized by the user. Information of the generated field is added to the field definitions 408 in the storage unit 211.

In step S810, the link configuration information generation unit 405 updates the link configuration management table 409 required to build correspondences between fields. Details of the processing in step S810 will be described below along the flowchart of FIG. 9B while taking as an example a case in which the field 1124 in FIG. 11 is processed as a link object. Note that FIG. 15A shows the link configuration management table immediately before processing.

The link configuration information generation unit 405 determines in step S911 whether or not the link configuration management table includes a data row in which the contents of an item "anchor term in body" match an anchor term of the field of interest. If such data row is included, the link configuration information generation unit 405 selects that data row as an object to be processed, and the process jumps to step S913. If such data row is not included, the process advances to step S912. In case of this example, since an anchor term in body "FIG. 1" in link information 1501 in FIG. 15A matches that in the field of interest, the process jumps to step S913. In step S913, the link configuration information generation unit 405 describes an anchor term character string of the field of interest in an item "anchor term in caption" in the object data row. In this example, the anchor term "FIG. 1" is described.

In step S914, the link configuration information generation unit 405 describes an identifier of a field corresponding to the field of interest in an item "caption appended region field identifier" of the object data row. In this example, the field identifier "image_figure1-1" of the field 1124 is added. After completion of step S914, the process returns to step S807 in FIG. 8. FIG. 15B shows an example of the contents of the link configuration management table after completion of step S810 for the field 1124 shown in FIG. 11.

From the input image data 1002 in this example, the caption appended region 1012 is subsequently detected in step S807, and the processes in steps S808 to S810 are similarly repeated. The processes in these steps will be briefly described below. In step S808, an anchor term "FIG. 2" is extracted from a caption appended to the caption appended region 1012. In step S809, a field 1125 shown in FIG. 11 is generated. In step S810, the field 1125 is processed according to the flowchart in FIG. 9B. Since no data row including the anchor term "FIG. 2" is included in step S911, the process advances to step S912 to generate a new data row. In this data row, a column of an anchor term in caption and that of a caption appended region field identifier are respectively described in steps S913 and S914. FIG. 15C shows an example of the contents of the link configuration management table after completion of step S810 for the field 1125.

Details of the format conversion processing in step S706 shown in FIG. 7 executed when the image data 1002 is input will be described below. In step S706, the format conversion unit 305 generates a digital document page corresponding to the image data 1002 as in the image data 1001 of the first page.

More specifically, the format conversion unit 305 generates graphic data obtained by converting the regions 1010 to 1013 in FIG. 10A according to the table shown in FIG. 5C, and generates link information corresponding to the fields 1124 and 1125 in FIG. 11.

FIG. 18B shows an example of a data description of the second page of the digital document data 310 generated by the format conversion unit 305 for the image data 1002. A description 1821 defines graphic data of a background image, a description 1822 defines a path description for two line image regions, and a description 1823 defines fields as link information.

A description 1824 included in the description 1823 is a description example corresponding to the field 1124 in FIG. 11. In the description 1824, a field identifier is defined in a description 1825, outer appearance definitions are defined in a description 1826, and action definitions are defined in the description 1827. A description 1828 is a description example corresponding to the field 1125 in FIG. 11. A field identifier is defined in a description 1829, outer appearance definitions are defined in a description 1830, and action definitions are defined in a description 1831. Note that these pieces of action information are described to refer to action definition elements which are added later to the digital document data 310 as in the image data of the first page.

[Link Processing (when Third Page (Image Data 1003) is Input)]

Details of the processing in step S705 executed when image data 1003 of the third page is input will be described below with reference to the flowchart of FIG. 8. In step S801 in FIG. 8, the link object selection unit 401 selects one of the text regions to be processed from the region information 306 saved in the storage unit 211, and the process advances to step S802. In case of the image data 1003, a {body} region 1014 is selected, and the process advances to step S802.

In step S802, the anchor term in body search unit 403 extracts a region 1015 including an anchor term "FIG. 1" from text information of the {body} region 1014. In step S803, the field generation unit 404 generates a field to have the region 1015 as a link object. A field identifier is added as "text_figure1-2" according to the aforementioned rules to mean a field which refers to the anchor term "FIG. 1" secondly. As in the image data of the first page, graphic data of a rectangle which surrounds the region 1015 is associated as outer appearance definitions. The generated field is added to the field definitions 408 in the storage unit 211. A field 1126 in FIG. 11 is an example of the field definitions for the region 1015.

In step S804, the link configuration information generation unit 405 updates the link configuration management table. Since this update processing has already been described, a description of its detailed contents will not be repeated. In this case, by executing the processing according to the flowchart of FIG. 9A to have the field 1126 as an object, the link configuration management table is updated from FIG. 15C to FIG. 15D. In step S805, fields of buttons to be appended to the anchor term in body region 1015 are generated. Since a description associated with this processing is the same as that of the processing of the image data of the first page, it will not be repeated. In this example, fields 1127 to 1129 in FIG. 11 are generated.

Since there is no anchor term to be processed in step S806, the process advances to step S807. Furthermore, since the image data 1003 does not include any caption appended region, the process returns to step S801. In step S801, a text region 1016 is selected in turn. However, since no anchor character string is detected in step S802, the processes in step S803 and subsequent steps are not executed, and it is determined that the processing is complete for all the regions, thus ending the processing in FIG. 8. The process then returns to step S705 in FIG. 7.

In step S706 in FIG. 7, the format conversion unit 305 generates a digital document page corresponding to the image data 1003. More specifically, the format conversion unit 305 generates graphic data obtained by converting the regions 1014 and 1016 in FIG. 10A according to the table shown in FIG. 5C, and link information corresponding to the fields 1126 to 1129 in FIG. 11. FIG. 18C shows a data description example of the third page of the digital document data 310. Since a description of the contents does not have a large difference from the data description example of the first page, it will not be given.

[Link Processing (when Fourth Page (Image Data 1004) is Input)]

Details of the processing in step S705 executed when image data 1004 of the fourth page is input will be described below with reference to the flowchart of FIG. 8.

Figure 8:
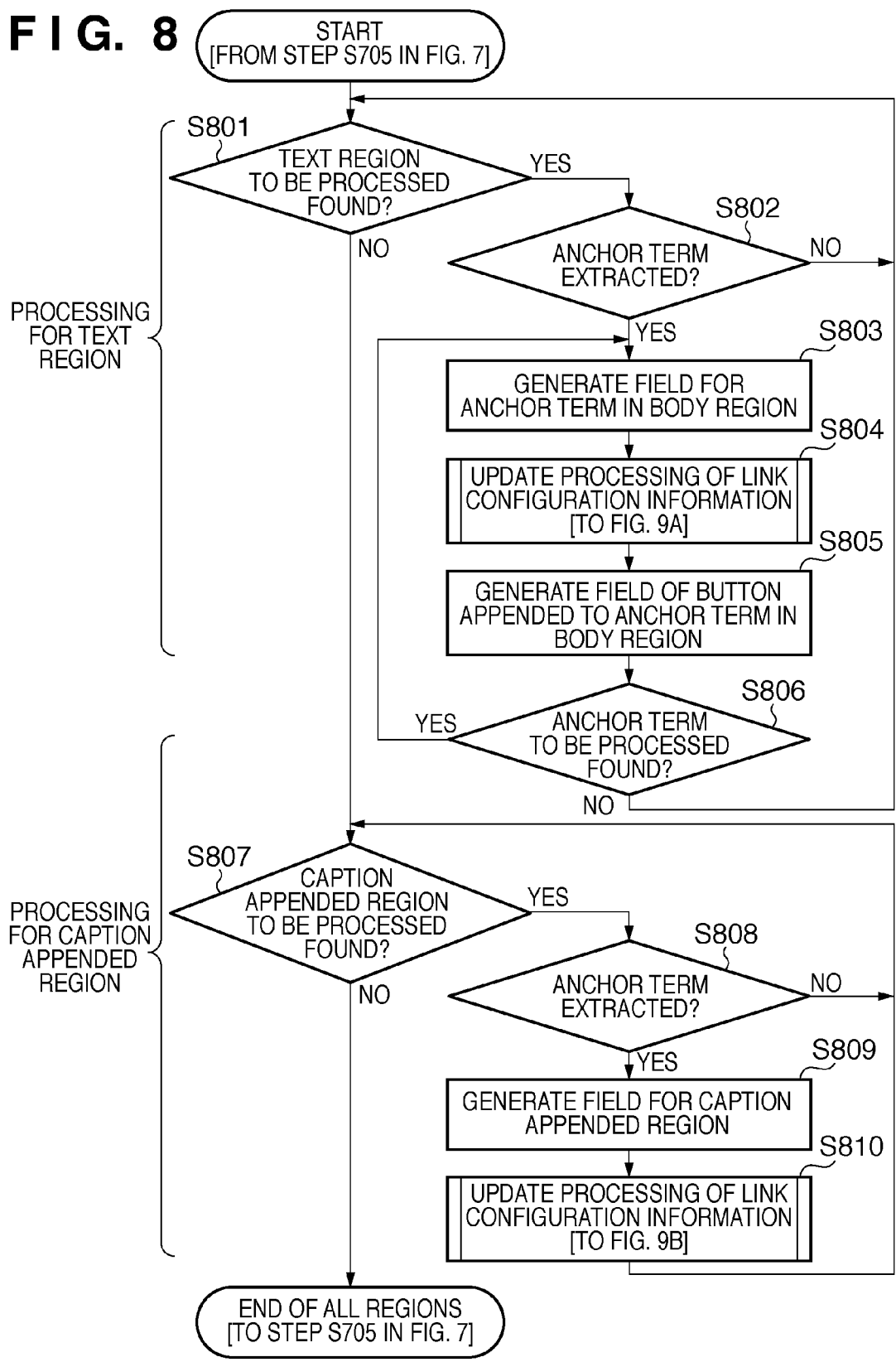
FIG. 8 is a flowchart of link processing for each page according to the first embodiment.

In step S801 in FIG. 8, the link object selection unit 401 selects one of text regions to be processed from the region information 306 saved in the storage unit 211, and the process advances to step S802. In case of the image data 1004, a body region 1017 is selected, and the process advances to step S802.

In step S802, the anchor term in body search unit 403 extracts a region 1018 including an anchor term "FIG. 1" and a region 1019 including an anchor term "FIG. 2" from text information of the body region 1017.

In step S803, the field generation unit 404 generates a field to have the region 1018 as a link object first. A field identifier is added as "text_figure1-3" according to the aforementioned rules to mean a field which refers to the anchor term "FIG. 1" thirdly. Also, graphic data of a rectangle which surrounds the region 1018 is associated as outer appearance definitions. The generated field is added to the field definitions 408 in the storage unit 211. A field 1130 in FIG. 11 is an example of the field definitions for the region 1018.

In step S804, the link configuration information generation unit 405 updates the link configuration management table. Since this update processing has already been described, a description of its detailed contents will not be repeated. In this case, by executing the processing according to the flowchart of FIG. 9A to have the field 1130 as an object, the link configuration management table is updated from FIG. 15D to FIG. 15E. In step S805, fields of buttons to be appended to the anchor term in body region 1018 are generated. Since a description associated with this processing is the same as that of the processing of the image data of the first page, it will not be repeated. In this example, fields 1131 to 1133 shown in FIG. 11 are generated.

Since the region 1019 including the anchor term "FIG. 2" to be processed still remains in step S806, the process returns to step S803. In the processes in steps S803 to S805, fields 1134 to 1137 in FIG. 11 are generated for the region 1019 in the same manner as in the above description, and the link configuration management table is updated to FIG. 15F. Since there is no anchor term to be processed in step S806 again, the process advances to step S807. Furthermore, since the image data 1004 includes neither a caption appended region nor text region to be processed, the processing shown in FIG. 8 ends, and the process advances to step S706 in FIG. 7.

In step S706 in FIG. 7, the format conversion unit 305 generates the digital document data 310 corresponding to the image data 1004. More specifically, the format conversion unit 305 generates graphic data obtained by converting the region 1017 in FIG. 10A according to the table shown in FIG. 5C, and link information corresponding to the fields 1130 to 1137 in FIG. 11. FIG. 18D shows a data description example of the fourth page of the digital document data 310. Since a description of the contents does not have a large difference from the data description examples of the first and third pages, it will not be given.

The individual processing examples of the processes in step S705 and S706 in FIG. 7 have been described according to the input image data example (four pages) in FIG. 10A. Steps S707 and S708 will be described below as processes common to respective pages.

In step S707, the data processing unit 218 sends the digital document data for each page which has undergone the format conversion in step S706 to the client PC 101. The data processing unit 218 determines in step S708 whether or not the processes in steps S702 to S707 are complete for all the pages. If the processes are complete for all the pages, the process advances to step S709. If pages to be processed still remain, the processing is repeated from step S702. In this way, the processes in steps S702 to S707 are applied to the image data 1001 to 1004 for four pages shown in FIG. 10A.

In step S709, the action definition generation unit 406 generates information of action definitions corresponding to the respective fields of the link information generated in step S706 using the link configuration management table 409 created in step S705. The format conversion unit 305 adds this information to the digital document data 310. However, since the digital document data 310 has already been sent in step S707, the information is sent while being added to the digital document data 310.

[Processing by Action Definition Generation Unit]

Processing steps of the action definition generation unit 406 will be described below with reference to the flowchart of FIG. 16 using the field definitions shown in FIG. 11 and the link configuration management table shown in FIG. 15F as a processing object example.

The action definition generation unit 406 determines in step S1601 whether or not the field definitions 408 in the storage unit 211 include fields, action definitions of which have not been processed yet. If a field to be processed is included, it is selected as an object to be processed, and the process advances to step S1602. If all the fields have already been processed, this action definition processing ends.

In step S1602, the action definition generation unit 406 reads out a data row related to the field to be processed from the link configuration management table 409 in the storage unit 211. More specifically, the action definition generation unit 406 reads out data which has the same character string as an anchor term part ("FIG. 1", "FIG. 2", etc.) in a character string of a field identifier of the field to be processed in an item "anchor term of caption appended region" or "anchor term in body" in the link configuration management table.

The action definition generation unit 406 discriminates in step S1603 with reference to the field identifier whether the type of the field to be processed is a caption appended region, anchor term in body region, or button field appended to an anchor term in body region. More specifically, if the field identifier includes a character string "image", the action definition generation unit 406 determines a field of the caption appended region, and the process advances to step S1604. If the field identifier includes a character string "text", and also includes one of character strings "-Prev", "-Next", and "-Back" at its end, the action definition generation unit 406 determines a button field, and the process advances to step S1605. In another case including a character string "text", the action definition generation unit 406 determines a field of the anchor term in body region, and the process advances to step S1606.

In step S1604, the action definition generation unit 406 decides an action for the field of the caption appended region using a table of FIG. 17A, which is defined in advance. More specifically, the action definition generation unit 406 reads out a value of an item "anchor term in body appearance count" from the link information of the link configuration management table read out in step S1602. If the value is 1, the action definition generation unit 406 decides an action 1701; if the value is 2 or more, it decides an action 1702; if the value is 0, it decides an action 1703.

In this example, the fields 1124 and 1125 in FIG. 11 are selected as objects to be processed in step S1604. For the field 1124, the anchor term in body appearance count read out from the link information 1501 in the link configuration management table shown in FIG. 15F is "3", and the action 1702 is decided. A link destination in the action is a field having the field identifier "text_figure1-1" which is located at the top position in the anchor term in body field identifier item in the link information 1501. Since there are a plurality of anchor terms in the body having the same anchor term, the action 1702 includes an action which enables button fields appended to the field to allow mutual movements between these terms. In this case, the action is described to enable "text_figure1-1-Prev", "text_figure1-1-Next", and "text_figure1-1-Back".

On the other hand, for the field 1125, since the corresponding anchor term in body appearance count in link information 1502 in the link configuration management table in FIG. 15F is "1", the action definition generation unit 406 decides the action 1701. A link destination in the action is a field having the field identifier "text_figure2-1" in the anchor term in the body region field identifier item in the link information 1502. Note that since there is only one anchor term in the body region having the same anchor term, there is no chance of moving between a plurality of anchor terms in body regions. Therefore, the action does not include any enabling action of a button appended to the field. When the anchor term in body appearance count is "0" although such case is not included in the example of FIGS. 11 and 15F, the action definition generation unit 406 decides the action 1703 which generates a message that informs the user that no link destination is found.

For fields of anchor term in body regions, the action definition generation unit 406 decides actions using a table shown in FIG. 17B in step S1605. When the caption appended region field identifier item of the data row in the link configuration management table read out in step S1602 has an entry, and the anchor term in body appearance count is 1, the action definition generation unit 406 decides an action 1704; when the anchor term in body appearance count is 2 or more, it decides an action 1705. When the caption appended region field identifier item has no entry, the action definition generation unit 406 decides an action 1706 independently of the anchor term in body appearance count.

In this example, the fields 1120, 1126, 1130, and 1134 in FIG. 11 are selected as objects to be processed in step S1605. For example, for the field 1120, the caption appended region field identifier item in the link information 1501 in the link configuration management table shown in FIG. 15F has an entry. In this item, since the anchor term in body appearance count is "3", the action definition generation unit 406 decides the action 1705. A link destination of the action is a field having the field identifier "image_figure1-1" of the caption appended region according to the entry of the aforementioned item. Since there are a plurality of anchor term in body regions having the same anchor term, the application may enable buttons appended to the self field. These buttons have to be disabled upon switching a display to the link destination. The action 1705 includes an action for that purpose.

In this case, the action is described to disable "text_figure1-1-Prev", "text_figure1-1-Next", and "text_figure1-1-Back". Since the processing for the fields 1126 and 1130 is the same as that for the field 1120, a description will not be repeated. For the field 1134, since the caption appended region field identifier item in the corresponding data row has an entry, and the anchor term in body appearance count is "1", the action definition generation unit 406 decides the action 1704. When the caption appended region field identifier item has no entry although such case is not included in the example of FIGS. 11 and 15F, the action definition generation unit 406 decides the action 1706 which generates a message that informs the user that no link destination is found.

For button fields, in step S1606, the action definition generation unit 406 decides on the actions using a table shown in FIG. 17C, which is defined in advance. When the caption appended region field identifier item in the link information of the link configuration management table read out in step S1602 has an entry, and the value of the anchor term in body appearance count is 2 or more, the action definition generation unit 406 decides actions 1707 to 1709 according to button types of fields to be processed. That is, when an end character string (type) of the field identifier is "Prev", the action definition generation unit 406 decides the action 1707; when the type is "Next", it decides the action 1708; or when the type is "Back", it decides the action 1709. In a case other than the above conditions, the action definition generation unit 406 decides the action 1710.

In this example, the fields 1121 to 1123, 1127 to 1129, 1131 to 1133, and 1135 to 1137 in FIG. 11 are selected as objects to be processed in step S1606. For example, for the field 1121, the caption appended region field identifier item in the corresponding link information 1501 in the link configuration management table shown in FIG. 15F has an entry, and the value of the anchor term in body appearance count is "3". Therefore, the action definition generation unit 406 decides the action 1707 according to the button type "Prev" of the field 1121 itself. A link destination of the action is described in the anchor term in the body field identifier item in the link information 1501, and is a field which is located before the field to be processed and has the field identifier "text_figure1-3". In this case, when the field to be processed has the field identifier described at the first position of the item, the field identifier described at the last position of the item can be selected as a previous field identifier. The action 1707 describes an action which enables button fields appended to the field of the link destination. In addition, the action 1707 describes an action which disables all buttons appended to the field to be processed.

For the field 1122, the action definition generation unit 406 similarly decides the action 1708 according to the self button type "Next". A link destination of the action is a field having the field identifier "text_figure1-2" which is the next field identifier in the field to be processed in the anchor term in body region field identifier item. Note that when the field to be processed has the field identifier described at the last position of the item, a field identifier described at the first position of the item can be selected as the next field identifier. The action 1708 also describes an action which enables button fields appended to the link destination field. In addition, the action 1708 also describes an action which disables all buttons appended to the field to be processed.

For the field 1123, the action definition generation unit 406 decides the action 1700 according to the self button type "Back". A link destination of the action is a field of the caption appended region having the field identifier "image_figure1-1".

Since the processing for the fields 1127 to 1129 and 1131 to 1133 is equivalent to that for the fields 1121 to 1123, a description thereof will not be repeated. For the fields 1135 to 1137, based on the corresponding link information 1502 in FIG. 15F, since the caption appended region field identifier item has an entry but the anchor term in body appearance count is "1", all buttons do not meet the conditions, and the action definition generation unit 406 decides the action 1710. The contents of the action 1710 are to do nothing, that is, "empty". Originally, these buttons are not objects to be enabled by the actions 1702, 1707, and 1708, and they are never enabled from the application. Therefore, since this action is never used, its contents are empty in term of a data description volume.

In step S1607, the action definition generation unit 406 additionally records the action decided in one of steps S1604 to S1606 as action definitions of the field to be processed in the field definitions 408 in the storage unit 211. After that, the process returns to step S1601 to repeat the above processes until no field to be processed remains. When no field to be processed remains, the processing of the action definition generation unit 406 ends. An item of the action definitions 1103 in FIG. 11 shows the state after action definitions for all the fields are additionally recorded.

In the above description, only behaviors when the user clicks on a field of interest using, for example, a mouse upon browsing the digital document created according to the present invention using the application are defined as actions. However, actions for other cases may be defined. For example, actions when a mouse pointer enters or exits a field region or when a focus is set on a field or it is canceled may be defined. All these actions may be defined or they may be selectively defined.

After completion of the processing of the action definition generation unit 406, the format conversion unit 305 converts action information defined in the field definitions 408 in the storage unit 211 into the format of the digital document data 310, and sends the converted information while attaching it to the digital document data. FIG. 18E shows a description example of action information added to the digital document data 310. In the description of FIG. 18E, actions, which are referred using respective ids from pieces of link information described in respective pages for the already output digital document data shown in FIGS. 18A to 18D are enumerated.

For example, a description 1851 is an action description example which is referred to from the field 1020 in FIG. 11, that is, from within the description 1804 in FIG. 18A. A description 1852 is an id description that allows reference, and a description 1853 is a description of action contents. Likewise, a description 1854 is an action description example which is referred to from the field 1021 in FIG. 11, that is, from within the description 1808 in FIG. 18B. A description 1855 is an id description, and a description 1856 is a description of action contents.

Likewise, a description 1857 is an action description example which is referred to from the field 1024 in FIG. 11, that is, from within the description 1824 in FIG. 18B, and a description 1860 is an action description example which is referred to from the field 1025 in FIG. 11, that is, from within the description 1828 in FIG. 18B. Also, a description 1863 is a description example of an initial action to be executed when the application opens the digital document data 310 for the first time. In this case, the initial action is described to disable all button fields in an initial state. The description of FIG. 7 is complete.

[Sequence on Receiving Side]

The flowchart on the receiving side in FIG. 12 will be described below. The client PC 101 as the receiving side receives page by page the digital document data 310 sent from the MFP 100 as the sending side, and finally receives the action definition information. This processing is executed by, for example, a CPU (not shown) included in the client PC 101.

In step S1201, the CPU receives digital document data (first page) sent in step S707 in FIG. 7, which corresponds to the image data 1001 (first page). The CPU determines in step S1202 whether or not all sent pages are received. If all the pages are received, the process advances to step S1203. If pages to be received still remain, the process returns to step S1201. After that, the CPU repeats step S1201 to receive digital document data (second to fourth pages) corresponding to the image data 1002 to 1004 (second to fourth pages).

In step S1203, the CPU receives the action definition information sent in step S709 in FIG. 7. In step S1204, the CPU merges the digital document page data (first to fourth pages) received in step S1201 and data of the action information received in step S1203, and saves the merged data in a storage area (not shown) of the client PC 101. In this embodiment, the merged data are saved as a single multi-page digital document file.

[Browsing Operation]

An operation when the document user browses the digital document data in this embodiment using the application will be described below with reference to FIGS. 13A to 13H. This processing is executed by, for example, the CPU (not shown) included in the client PC 101.

FIGS. 13A to 13H show examples of display screens of virtual GUI software executed by the client PC 101 shown in FIG. 1 or another client PC as an application required to browse digital document data including link information. A practical example of such application includes the Adobe Reader™ Furthermore, an application which allows a display operation on the operation unit 203 of the MFP 100 may be used. Note that when the application is the Adobe Reader™, the aforementioned data in FIG. 6 is in PDF format.

Figure 13A:
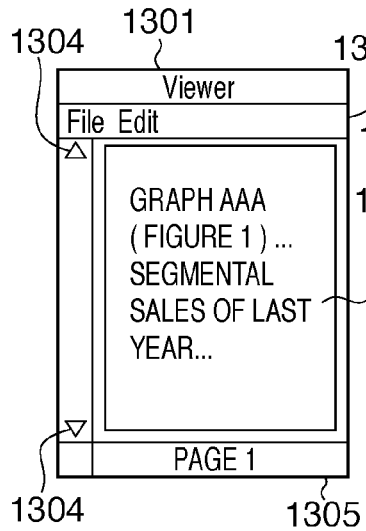
FIGS. 13A, 13B, 13C, 13D, 13E, 13F, 13G, and 13H are explanatory views of an application according to the first embodiment.

A screen 1301 in FIG. 13A is an example of an application screen required to browse the aforementioned digital document data. A menu bar 1302 is used to control the application to designate an input digital document file and to conduct a search operation. A display screen 1303 is that of an input digital document page, and shows, as an input example, a state in which the first page in FIG. 10A is displayed. Page scroll buttons 1304 allow the user to display a previous or next page by pressing (clicking) these buttons using, for example, a mouse. A status bar 1305 displays, for example, a page number of the currently displayed page. Likewise, FIG. 13B shows a state in which the second page in FIG. 10A is displayed on a display screen 1303.

Figure 13B:
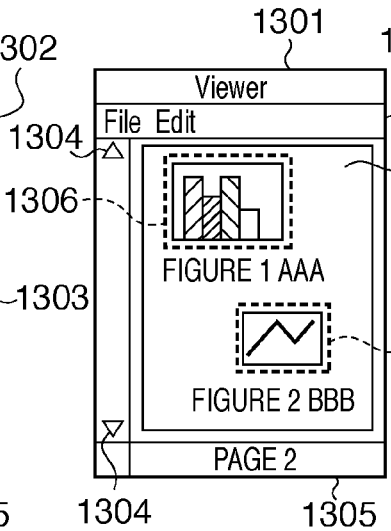

Assume that the user searches the digital document data for sentences which refer to a figure such as explanatory text and quotation of the figure appended with a caption "FIG. 1 AAA" while viewing the display screen 1303 in FIG. 13B. Upon browsing conventional digital document data, a character search function of the application is executed to have "FIG. 1" or "AAA" as a keyword, thereby displaying portions including such keyword. If no character codes are written in a text part of the digital document data, since a character-based search cannot be conducted, the user has to visually search for a description "FIG. 1" by scrolling pages using the page scroll buttons 1304. The digital document data in which no character codes are written in the text part is, for example, document data in which each page is rendered only by an image data or a path description. Then, when the user confirms the figure again after a desired explanatory text or reference sentence is found, he or she displays the second page by pressing the page scroll buttons 1304.

A case will be described below wherein the user browses the digital document data generated by this embodiment. In order to read a sentence which refers to a figure indicated by a region 1306 in FIG. 13B, the user clicks within that region (that is, a range in which the field 1124 in FIG. 11 as the field of the caption appended region is allocated) using a pointing device such as a mouse. In response to clicking, the application highlights and sets a focus on the link destination field "text_figure1-1", that is, the field 1120 according to the action definition of the field 1124. When the focus is set, the application displays a page including that focus region. At the same time, the fields 1121, 1122, and 1123 of the buttons appended to the field 1120 are enabled.

Figure 13C:
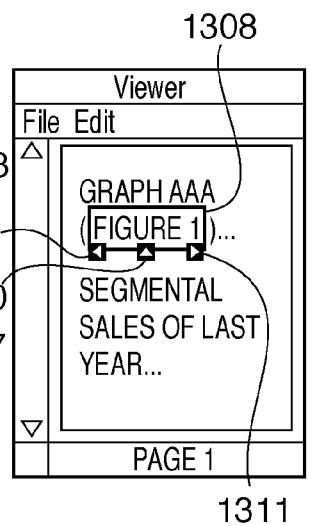

FIG. 13C shows this result. As shown in FIG. 13C, a region 1308 of a character string "FIG. 1" included in the anchor term region as the link destination is displayed using a red rectangle, and the page is moved to the first page. Buttons 1309, 1310, and 1311 are displayed while being appended to the region 1308. That is, when the user single-clicks the figure (the region 1306 in this case), he or she can easily obtain a display result of a page including a sentence which refers to the figure. In addition, the user can recognize based on the displayed button group that there are other sentences which refer to that figure.

Figure 13D:
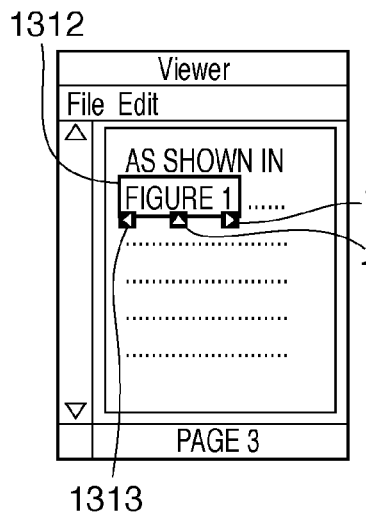

In this case, if a sentence near the region 1308 is not desired one as a sentence which refers to the figure of the region 1306, the user clicks the "Next" button 1311 to view the next sentence including the same anchor term "FIG. 1". Then, the action defined in the field 1122 in FIG. 11 corresponding to that button is executed. The application highlights and sets a focus on the field 1126 as a link destination. In addition, the application enables buttons (fields 1127 to 1129) appended to the field 1126, and disables the buttons (fields 1121 to 1123) appended to the clicked field 1122. FIG. 13D shows this result. That is, the user can easily obtain a display result of a page including the next sentence which refers to the figure by only clicking the button.

Figure 13E:
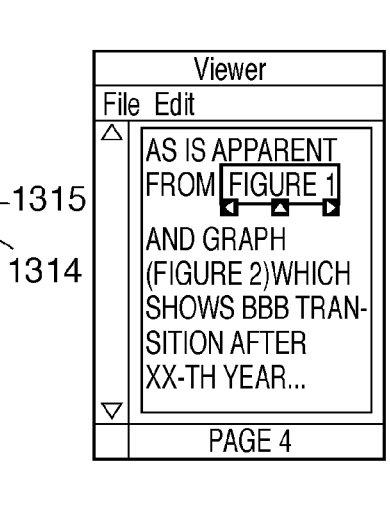

In FIG. 13D, when the user further clicks the "Next" button 1315 to view another sentence, a display result shown in FIG. 13E is obtained. On the other hand, when the user wants to view the previous sentence in FIG. 13D, he or she clicks the "Prev" button 1313 to obtain the display result shown in FIG. 13C. In this manner, when there are a plurality of sentences which refer to a single figure, the user can move between these plurality of sentences by simple operations.

When the user finds a desired sentence in FIGS. 13C to 13E, and wants to confirm the contents of the figure again, he or she clicks a "Back" button (for example, a button 1314 in FIG. 13D). Then, the application highlights and sets a focus on the field 1124 according to the action defined in the field 1129, thereby obtaining a display result in FIG. 13F. The same applies to FIGS. 13C and 13E. In this manner, the original figure can be displayed by single-clicking even during movement between sentences which refer to the figure.

Next, an example for another figure in the second page will be described below. In order to read a sentence which refers to a figure in a region 1307 in turn on the screen in FIG. 13B, the user clicks a range of the field 1125 allocated in the region 1307. Then, the action according to the definition in the field 1125 is executed, and the application highlights and sets a focus on the field 1134 as a link destination. As a result, the fourth page is displayed, as shown in FIG. 13G.

Figure 13F:
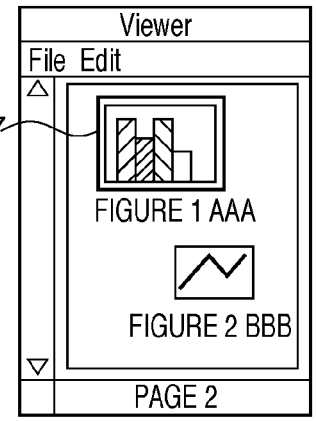
Figure 13G:
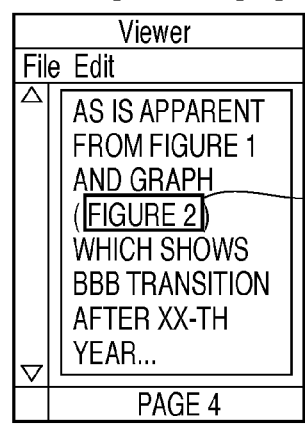
Figure 13H:
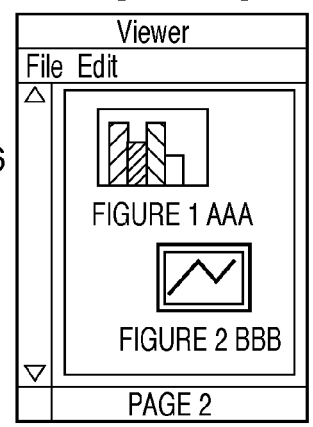

Unlike in the prior example, since no action that enables buttons is defined, no buttons appended to a region 1316 in FIG. 13G are displayed. Hence, the user can recognize that the digital document includes only one sentence which refers to the figure in the region 1307. When the user confirms the figure again, he or she clicks the region 1316 to return to a display of the second page, as shown in FIG. 13H.

In this way, the digital document generated by the first embodiment has a function of highlighting a sentence part which refers to a figure when the user clicks the figure part on the application display. In this case, when there are a plurality of sentences which refer to the figure, since buttons used to display other sentence parts which refer to the figure are presented, the user can confirm object sentences in turn using the buttons. Since a button used to return to the display of the figure is also presented, the user can immediately return to the display of the figure. On the other hand, when there is only one sentence which refers to a figure, since no buttons are presented, the user can recognize that he or she need not search for other sentences.

As described above, according to the first embodiment, a regions of an "object" such as a figure is extracted from an input document, and a region of an anchor term related to the "object" is extracted from, for example, a body. In this manner, a mutual link relationship between the "object" and "object reference sentence" is extracted. Upon generation of a digital document, fields that can be used by the application are generated in the object region and anchor term in body region.

Also, an action for highlighting a link destination field upon clicking a link source field using the application is defined according to the link relationship. In addition, when the link relationship includes a plurality of link destinations for one link source, an action which generates buttons used to sequentially display the plurality of link destination fields and a button used to return to the link source to be appended to the link source field is added.

The digital document created in this way has a function of highlighting part of an "object reference sentence" when the user clicks an "object" part such as a figure on the application display. In this case, when there are a plurality of "object reference sentences", since buttons used to display other "object reference sentence" parts are presented, the user can confirm object parts in turn using the button.

Also, since a button used to return to the display of the "object" is presented, the user can immediately return to the display of the "object". On the other hand, when there is only one "object reference sentence", since no buttons are presented, the user can recognize that he or she need not search for other parts. With the aforementioned functions, the user can more efficiently read the document more.

Second Embodiment

The first embodiment has exemplified the case in which the action definitions in the conversion processing into digital document data are individually defined in respective fields like the item of the action definitions 1103 in FIG. 11. As a result, the action contents of the respective fields are described one by one in the digital document data 310 to be output, as shown in FIG. 18E. The second embodiment will exemplify a case in which action definitions are converted into functions, and input arguments of the action functions are individually added to respective fields as parameters.

Figure 19:
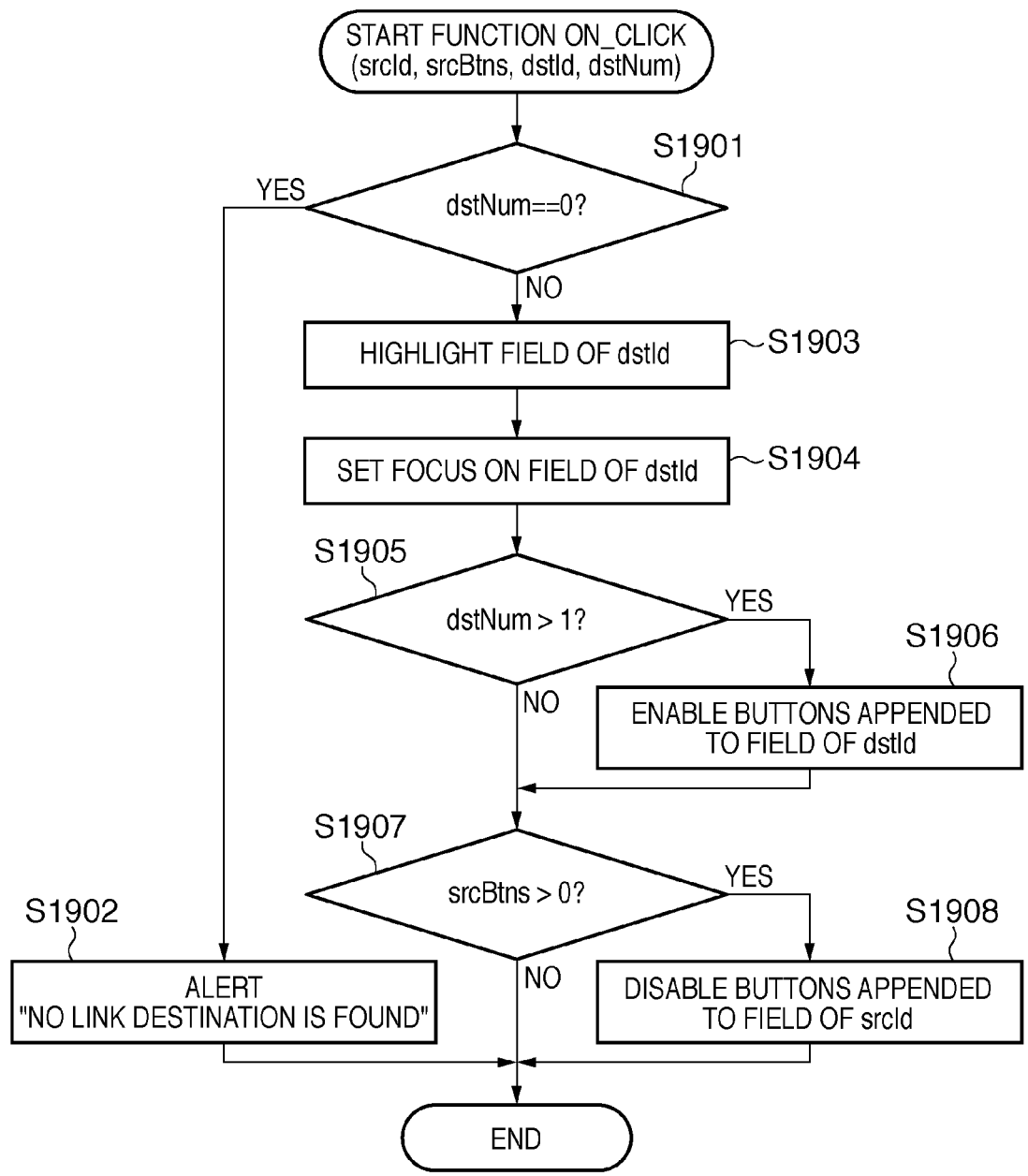
FIG. 19 is a flowchart of an ON_CLICK function according to the second embodiment.

FIG. 19 is a flowchart that explains the processing contents of an example "ON_CLICK" of the action function in the second embodiment. The function "ON_CLICK" starts processing by receiving four arguments "srcId", "srcBtns", "dstId", and "dstNum". In this case, the argument "srcId" is a character string which designates a field identifier of a field clicked by the user via an application, that is, an action definition object.

However, when the user clicks a button field, the argument "srcId" designates a field identifier of an anchor term in body region to which the button is appended in place of the field identifier of that button field. The argument "srcBtns" designates the number of buttons appended to a field having a field identifier of the argument "srcId". However, the number of buttons which need not be enabled is not included in terms of the operation of the application.

The argument "dstId" designates a field identifier of a link destination, that is, a field which is to be highlighted and focused as a result of clicking of the action definition object field by the user via the application. The argument "dstNum" designates the number of link destination fields. The argument "dstNum" designates the number of link destinations when there are a plurality of link destinations which are anchor term in body regions. Otherwise, the argument "dstNum" designates 1 if there is a link destination or 0 if there is no link destination.

[Processing Sequence in Action Function]

The flowchart processing contents in FIG. 19 will be described below. Note that the action function is actually executed by the application which inputs and displays the digital document data 310 according to a user's instruction on the client PC 101.

The function "ON_CLICK" which received the input arguments checks in step S1901 whether or not the argument "dstNum" is "0". If dstNum="0", then the process advances to step S1902 to display an alert message which informs the user that "no link destination is found", thus ending the function. Otherwise, the process advances to step S1903. In step S1903, the function "ON_CLICK" highlights a field having a field identifier of the argument "dstId". An example of highlighting is the same as that in the first embodiment.

In step S1904, the function "ON_CLICK" sets a focus on the field having the field identifier of the argument "dstId". As a result, the application displays a page including that field. The function "ON_CLICK" checks in step S1905 whether or not the argument "dstNum" is larger than "1". If the argument "dstNum" is larger than "1", the process advances to step S1906; otherwise, the process advances to step S1907. In step S1906, the function "ON_CLICK" enables buttons appended to the field having the field identifier of the argument "dstId".

The function "ON_CLICK" checks in step S1905 whether or not the argument "srcBtns" is larger than "0". If the argument "srcBtns" is larger than "0", the process advances to step S1908; otherwise, the function ends. In step S1908, the function "ON_CLICK" disables buttons appended to the field having the field identifier of the argument "srcId". After that, the processing in this function ends.

[Operation of Image Processing Apparatus]

The operation of the image processing apparatus according to the second embodiment will be described below. Note that the apparatus arrangement is the same as that described using FIGS. 1 to 4 in the first embodiment.

Figure 22:
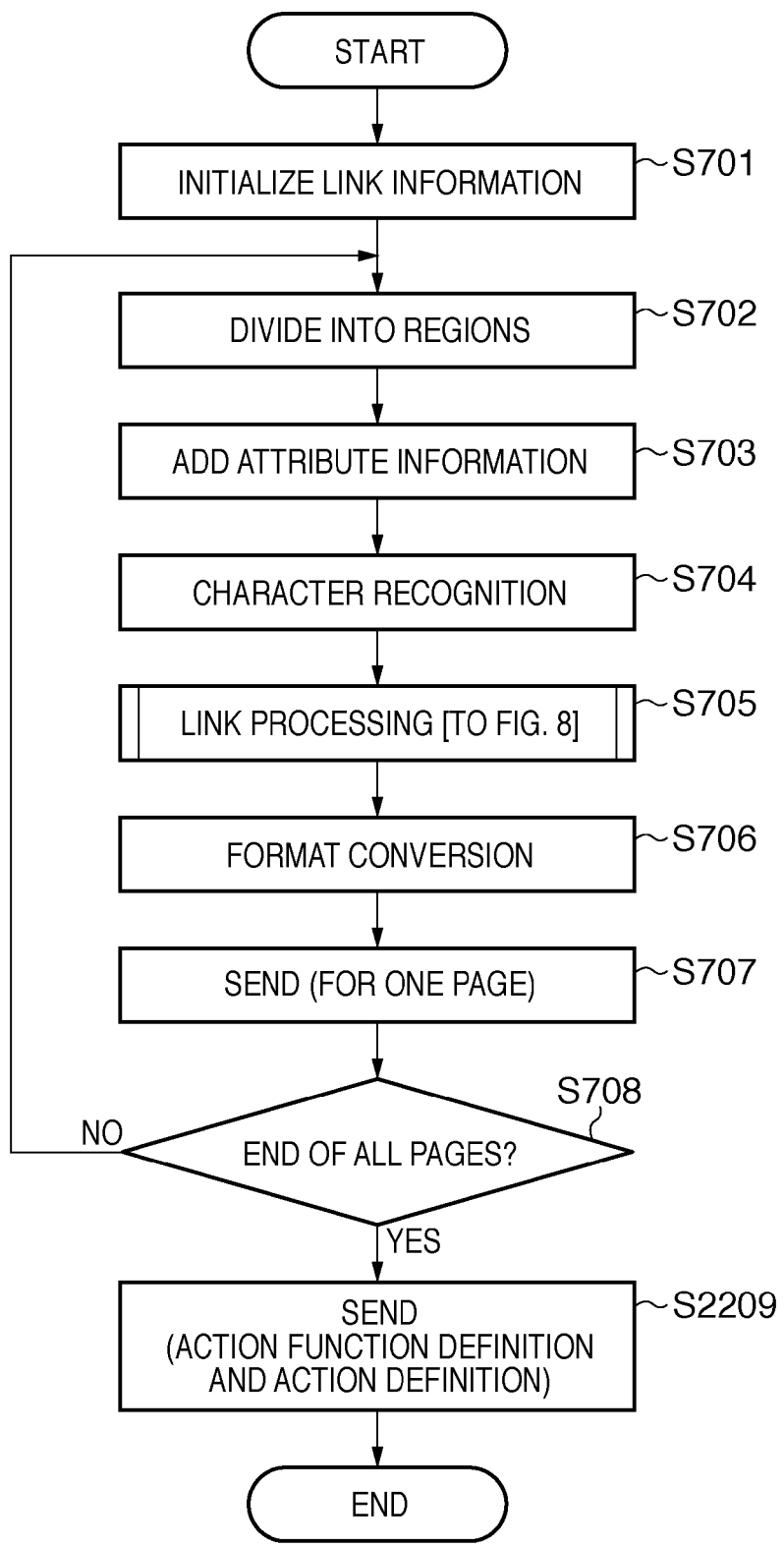
FIG. 22 is a flowchart of overall processing according to the second embodiment.

FIG. 22 shows the processing sequence of the second embodiment. Steps S701 to S708 in FIG. 22 have the same contents as those in corresponding steps in FIG. 7 described in the first embodiment, and a description thereof will not be repeated. Therefore, when steps S701 to S708 in FIG. 22 are processed to have four pages in FIG. 10A as inputs, pages shown in FIGS. 18A to 18D which are the same as in the first embodiment are generated as descriptions corresponding to the respective pages of the digital document data 310. With these processes, field definitions 408 in FIG. 11 and a link configuration management table 409 in FIG. 15F are created as link information 308. When processing for all pages are complete in step S708 and the process advances to step S2209, all action definitions 1103 in respective field definitions in FIG. 11 are not defined.

In step S2209, an action definition generation unit 406 in FIG. 4 defines the action function "ON_CLICK" described using FIG. 19. Using this action function, the action definition generation unit 406 generates information of action definitions for respective fields of the field definitions 408. More specifically, the action definition generation unit 406 sets input arguments of the action function to be called by action definitions of respective fields using the link configuration management table 409. A format conversion unit 305 adds pieces of information of these action function definitions and action definitions to the digital document data 310. However, since respective pages of the digital document data 310 have already been sent in step S707 in FIG. 22, these pieces of information are sent while being attached to the digital document data 310.

[Action Definition Generation Processing]

Details of the action definition generation processing in step S2209 will be described below. The action definition generation unit 406 extracts a field for which action definitions are not processed from the field definitions 408 in a storage unit 211, and selects that field as an object to be processed. If no field to be processed remains, the processing ends. The action definition generation unit 406 reads out link information corresponding to the field to be processed from the link configuration management table 409. Then, the action definition generation unit 406 sets the contents of respective columns of a data row and respective arguments of the action function from a table shown in FIG. 23, thus generating action definitions.

Argument settings of the action function will be practically described below using the table shown in FIG. 23. In case of a field 1120 in FIG. 11, a type of the self field, that is, the field to be processed is an anchor term in body region. According to FIG. 23, a field identifier "text_figure1-1" of the self field is set in the argument "srcId". The argument "srcBtns" and subsequent arguments are decided based on the contents of the link information corresponding to the field to be processed in the link configuration management table. In the link configuration management table in FIG. 15F, link information 1501 corresponds to the field 1120. According to FIG. 23, since an anchor term in body region appearance count in the link information 1501 is 2 or more, "3" is set in the argument "srcBtns". In the argument "dstId", a field identifier "image_figure1-1" of a caption appended region in the link information 1501 is set. "1" is set in the argument "dstNum".

In case of a field 1121 in FIG. 11, a field type is a button. According to FIG. 23, the field identifier "text_figure1-1" of the field to which this button is appended is set in the argument "srcId". This field identifier can also be obtained by excluding a button type character string "-Prev" from a character string "text_figure1-1-Prev" in a field identifier of the button field. The link information 1501 corresponds to the field 1121 as in the field 1120. In the argument "srcBtns", "3" is set as in the aforementioned field 1120. The argument "dstId" and subsequent items change depending on the button type. Since the button type of the field 1121 is "Prev", a field identifier immediately before that set in the argument "srcId" in an anchor term in body region field identifier item is set in the argument "dstId". In this example, since "text_figure1-1" is located at the first position in the item, "text_figure1-3" located at the last position in the item is set. In the argument "dstNum", "3" as the anchor term in body appearance count is set.

In case of a field 1122 in FIG. 11, a field type is a button, and the arguments "srcId", "srcBtns", and "dstNum" are set in the same manner as in the field 1121. Since a button type is "Next", a field identifier "text_figure1-2" immediately after the field identifier set in the argument "srcId" in the anchor term in body region field identifier item is set in the argument "dstId".

In case of a field 1123 in FIG. 11, a field type is a button, and the arguments "srcId" and "srcBtns" are set in the same manner as in the fields 1121 and 1122. Since a button type is "Back", the field identifier "image_figure1-1" of the caption appended region is set in the argument "dstId". "1" is set in the argument "dstNum".

In case of a field 1124 in FIG. 11, a field type is a caption appended region. According to FIG. 23, a field identifier "image_figure1-1" of the self field is set in the argument "srcId". "0" is set in the argument "srcBtns". The arguments after "srcBtns" are decided based on the contents of a data row corresponding to the field to be processed in the link configuration management table. In the link configuration management table shown in FIG. 15F, the link information 1501 corresponds to the field 1124. According to FIG. 23, a field identifier "text_figure1-1" which is located at the first position in the anchor term in body field identifier item in the link information 1501 is set in the argument "dstId". "3" as the anchor term in body appearance count in the link information 1501 is set in the argument "dstNum".

Then, the arguments of the action function are similarly set in fields 1125 to 1137 in FIG. 11 according to the table in FIG. 23. When no field to be processed remains, the action definition processing ends. Note that when the link information in the link configuration management table does not have any entry of a field identifier corresponding to the argument "dstId" although such case is not included in FIG. 15F as the example of the link configuration management table used in this example, a null character string is set in the argument "dstId", and "0" is set in the argument "dstNum". An item 2003 in FIG. 20 shows an example of action definitions defined in respective fields after the processing in step S2209 of the second embodiment.

[Action Function Processing]

FIG. 21 shows digital document format conversion examples of the action function definitions corresponding to the processing contents in FIGS. 19 and the action definition information 2003 in FIG. 20. Action information in FIG. 21 is described to complete the digital document data 310 in correspondence with the already sent digital document page description examples shown in FIGS. 18A to 18D.

A description 2101 in FIG. 21 is an example of a description which defines the action function "ON_CLICK" corresponding to the processing contents in FIG. 19. Descriptions 2102 to 2105 are some of enumerated action definitions which are referred to using respective ids from pieces of link information described in respective pages in the already output digital document data in FIGS. 18A to 18D. Respective actions are described to call the action function defined in the description 2101 using field-dependent arguments. A description 2106 is a description example of an initial action to be executed when the application opens the digital document data 310 for the first time. As in the first embodiment, the initial action is described to disable all button fields in an initial state.

Receiving side processing of the second embodiment is also the same as that of the first embodiment. That is, the digital document data and action definition information including the action function definitions are received according to the flowchart in FIG. 12.

[Digital Document Data Browsing Operation]

An operation where the document user browses the digital document data generated by the second embodiment using the application will be described below with reference to FIGS. 13A to 13H as in the first embodiment.

In order to read a sentence which refers to a figure indicated by a region 1306 in FIG. 13B displayed as the second page, the user clicks that region. That is, the user clicks within a range where the field 1124 in FIG. 20 is allocated using a pointing device such as a mouse. Then, the application executes "ON_CLICK ("image_figure1-1", 0, "text_figure1-1", 3)" according to the action definitions in the field 1124 in FIG. 20. The application executes an action according to the flowchart of FIG. 19. That is, the application highlights and sets a focus on the field of "text_figure1-1" set in the argument "dstId", and enables buttons appended to the field of "text_figure1-1". As a result, a screen shown in FIG. 13C is displayed.

When the user further clicks a button 1311 in FIG. 13C, the application executes an action "ON_CLICK ("text_figure1-1", 3, "text_figure1-2", 3)" corresponding to the field 1122 in FIG. 20. As a result, a screen shown in FIG. 13D is displayed. Furthermore, when the user clicks a button 1315, a screen shown in FIG. 13E is displayed, and when he or she clicks a button 1314, a screen shown in FIG. 13F is displayed.

When the user clicks a region 1307 in FIG. 13B, the application executes "ON_CLICK ("image_figure2-1", 0, "text_figure2-1", 1)" according to action definitions in the field 1125 in FIG. 20. That is, the application highlights and sets a focus on a field of "text_figure2-1" set in the argument "dstId". However, since the argument "dstNum" is "1", buttons appended to the field of "text_figure2-1" are not enabled. As a result, a screen shown in FIG. 13G is displayed. When the user clicks a region 1316 in FIG. 13G, a screen shown in FIG. 13H is displayed.

As described above, the digital document data generated by the first embodiment and that generated by the second embodiment provide the same operations in response to user's browsing operations on the application. That is, the second embodiment can provide the same effects as in the first embodiment.

That is, the digital document data generated by the second embodiment has a function of highlighting an "object reference sentence" part when the user clicks an "object" part such as a figure on the application display. In this case, when there are a plurality of "object reference sentences", since buttons used to display other "object reference sentence" parts are presented, the user can confirm object parts in turn using the buttons.

Since a button used to return to the display of the "object" is also presented, the user can immediately return to the display of the "object". On the other hand, when there is only one "object reference sentence", since no buttons are presented, the user can recognize that he or she need not search for other parts. With the aforementioned functions, the user can more efficiently read the document more.

Third Embodiment

In the descriptions of the first and second embodiments, the link configuration management table shown in FIGS. 15A to 15F manages field identifiers of a plurality of anchor terms in body included in single link information in an order of appearance. This order influences the processing result of an action definition generation unit 406. That is, this order influences the display order of an anchor term in body region which is highlighted first upon clicking a caption appended region, and anchor term in body regions which are sequentially highlighted by button fields "Prev" and "Next". In the third embodiment, immediately before action definition processing of the action definition generation unit 406 in step S709 shown in FIG. 7 or step S2209 shown in FIG. 22, field identifiers in an anchor term in body field identifier item in the link configuration management table are sorted. Sorting criteria will be described later.

FIGS. 24A to 24C show a processing example of the third embodiment. FIG. 24A shows an example of input images, which include image data 2401 to 2405 for five pages. During processing of the third embodiment, an anchor term "FIG. 4" is extracted from a region 2407 appended to a region 2406 included in the image data 2402 of the second page, and regions 2408, 2409, and 2410 as anchor terms in body are respectively extracted from bodies of the third to fifth pages. As a result, field definitions for the region 2406 as a caption appended region and the regions 2408, 2409, and 2410 as anchor term in body regions are generated. These fields have field identifiers "image_figure4-1", "text_figure4-1", "text_figure4-2", and "text_figure4-3" in turn. Furthermore, a link configuration management table which records relationships between fields is generated, as shown in FIG. 24B.

In the third embodiment, before generation of action definitions, pieces of information in the anchor term in body region field identifier item in the link configuration management table are sorted. As sorting criteria, of sentences including anchor terms, a sentence which is more likely to explain an anchor term object is set at an earlier position since it has a higher importance. Conversely, a sentence which quotes the anchor term object is set at a later position since it has a lower importance. More specifically, known morphological analysis is executed to give the highest importance to a sentence which includes an anchor term in a subject, and lower importance to a sentence which includes an anchor term in an object and other sentences. When a single sentence includes an anchor term (for example, "FIG. 1") other than an anchor term of interest ("FIG. 4"), an importance is reduced. Using these criteria, a sentence near the region 2410 as the anchor term in body has a highest importance, and the regions 2409 and 2408 have lower importance. As a result, actions are defined based on the link configuration management table, which is sorted, as shown in FIG. 24C, thus completing the digital document data 310.

Note that the above sorting criteria are presented only for exemplary purpose, and other criteria may be used. For example, field identifiers may be sorted in ascending order of distance from an object (caption appended region). Alternatively, sentence lengths and types (plain sentence, heading, itemization, etc.) may be used. Furthermore, anchor term appearance counts, and appearance counts of a related caption character string in the vicinity of a field may be used as criteria.

FIGS. 25A to 25D show screen examples when the user browses the digital document data generated by the third embodiment using the application. FIG. 25A shows an example of an application screen which displays the second page of the digital document data. When the user clicks a region 2501 corresponding to "FIG. 4", the fifth page is displayed, and a region 2502 of an anchor term "FIG. 4" is highlighted, as shown in FIG. 25B. When the user wants to refer to another anchor term in body region part, and clicks a "Next" button 2503, the fourth page is displayed, and an anchor term in body region 2504 is highlighted, as shown in FIG. 25C. When the user further clicks a "Next" button 2505, the third page is displayed, and an anchor term in body region 2506 is highlighted, as shown in FIG. 25D. In this manner, the user can confirm sentences in turn from a sentence which is more likely to explain an object by a simple operation, thus improving the user's browsing efficiency.

As described above, the digital document data generated by the third embodiment has a function of sequentially highlighting a plurality of link destinations in descending order of browsing value for the user when a field clicked by the user has the plurality of link destinations. Therefore, in addition to the effects described in the first and second embodiments, the user can reach the desired information within a shorter period of time at an increased possibility, thus further improving the user's browsing efficiency.

Fourth Embodiment

In the first to third embodiments, the arranging order of a plurality of anchor term in body regions in the link configuration management table is settled at the time of sending. Therefore, the order of an anchor term in body region which is highlighted first upon clicking a caption appended region and anchor term in body regions which are highlighted in turn by button fields "Prev" and "Next" is always constant. This order may be changed according to a user's operation during an operation of an application. More specifically, the arranging order is converted into a list, and the contents of the list are sorted as needed in an action executed by the application, so that anchor term in body regions can be displayed in a different order.

FIGS. 26A to 26D are flowcharts showing an example of processing contents of four action functions "init", "on_click2", "make_list", and "jump_to" used in action definitions in the fourth embodiment. The processing contents of the respective functions will be described below. Note that the following processing is actually executed by an application which inputs and displays digital document data 310 according to a user's instruction. The application is processed by, for example, a CPU (not shown) included in a client PC 101.

Figure 26A:
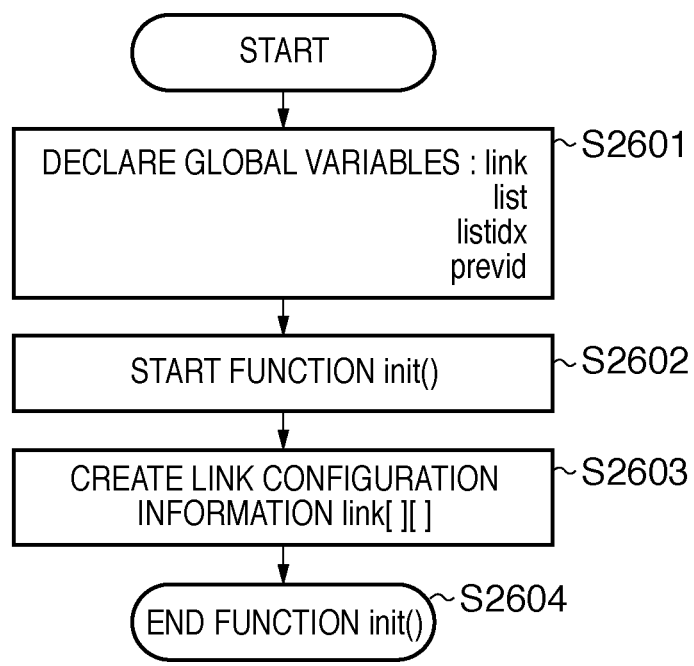
FIGS. 26A, 26B, 26C, and 26D are flowcharts of functions in action definitions according to the fourth embodiment.

Steps S2601 to S2604 in FIG. 26A correspond to a flowchart of an initialization function "init" executed when the application loads the digital document data. In step S2601, global variables are declared. The global variables are those which are commonly accessible from the four functions shown in FIGS. 26A to 26D. In this step, four variables "link", "list", "listIdx", and "prevId" are declared. The contents and purposes of the respective variables will be explained later in descriptions given when the variables are actually used.

Note that in this description, the global variable declaration is appended to the initial function for the sake of convenience, but these variables may be declared in other steps. Step S2602 is a start step of the function "init", and does not require any arguments. In step S2603, link configuration information is generated, and is stored in the above global variable "link". The link configuration information mutually arrays relationships between the contents of a caption appended region field identifier item and those of an anchor term in body region field identifier item as relationships between link sources and link destinations in the contents of respective pieces of link information in a link configuration management table 409.

This configuration is as follows.
link[link ID of link source]=field identifier or array of link destination Note that the link ID is a character string obtained by excluding a part that represents an appearance order and subsequent parts from a field identifier. For example, the link configuration information created based on a link configuration management table shown in FIG. 15F includes the following arrays made up of four elements.

[Link Configuration Information]
link["text_*figure*1"]="image_figure1-1"
link["image_figure1"]={"text_figure1-1",
"text_figure1-2",
"text_figure1-3"}
link["text_*figure*2"]="image_figure2-1"
link["image_figure2"]={"text_figure2-1"}

When a link source is an anchor term in body region, since the number of link destinations is one or less, the link configuration information directly designates a field identifier. When there is no link destination although such case is not included in the example of FIG. 15F, a null character string is designated. When a link source is a caption appended region, an array of one or a plurality of link destination field identifiers is designated. When there is no link destination, an array having the number of elements=0 is designated. Note that these are merely examples, and other data structures may be used. After the link configuration information is generated, this processing ends.

Figure 26B:
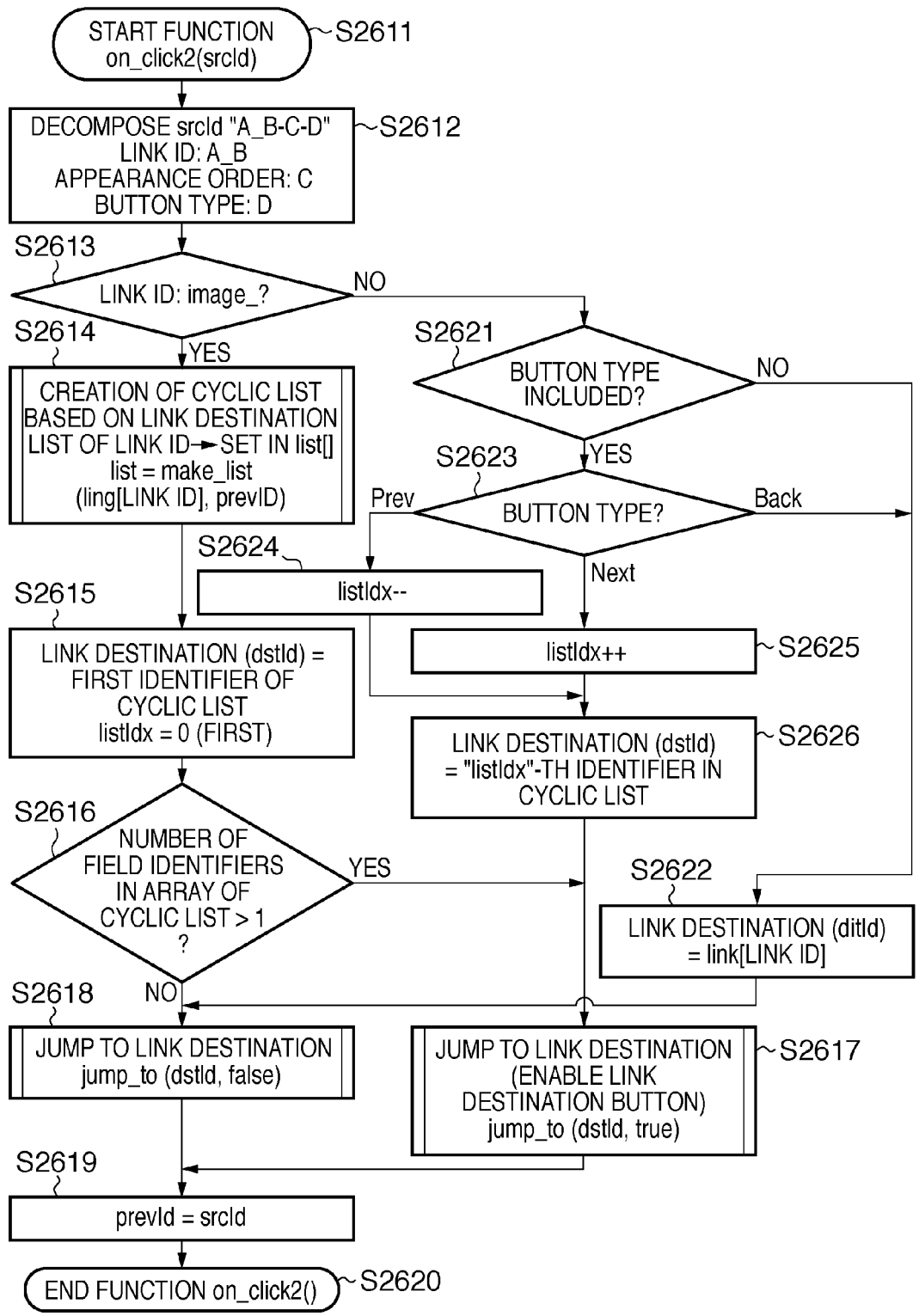

Steps S2611 to S2620 in FIG. 26B correspond to the processing contents of the function "on_click2" executed when the user clicks a field region of the digital document data via the application. In step S2611, the function "on_click2" is started by setting a field identifier of a link source in an argument "srcId". In practice, the action definitions of respective fields are defined to call this function to have the self field identifier as an argument.

Note that a character string of a field identifier including a button field is designated intact in the argument "srcId" unlike in the second embodiment. In step S2612, the character string of the field identifier given by the argument "srcId" is decomposed into a link ID, appearance order, and button type by a character string operation. It is checked in step S2613 whether or not the link source is a caption appended region. More specifically, it is checked whether or not a character string of the link ID starts with "image_". If the character string of the link ID starts with "image_", it is determined that the link source is a caption appended region, and the process advances to step S2614. Otherwise, the process advances to step S2621.

In this case, the process advances to step S2614 under the assumption that the link source is a caption appended region. In step S2614, the function "make_list" is called to create a cyclic list, and a result is set in the global variable "list". In this case, the cyclic list expresses an order required for the user to display a plurality of sentences having the same anchor term in turn. More specifically, in link configuration information "link", a list of field identifiers indicating a plurality of link destinations is ranked to be more suitable for the user, and field identifiers are sorted.

Figure 26C:
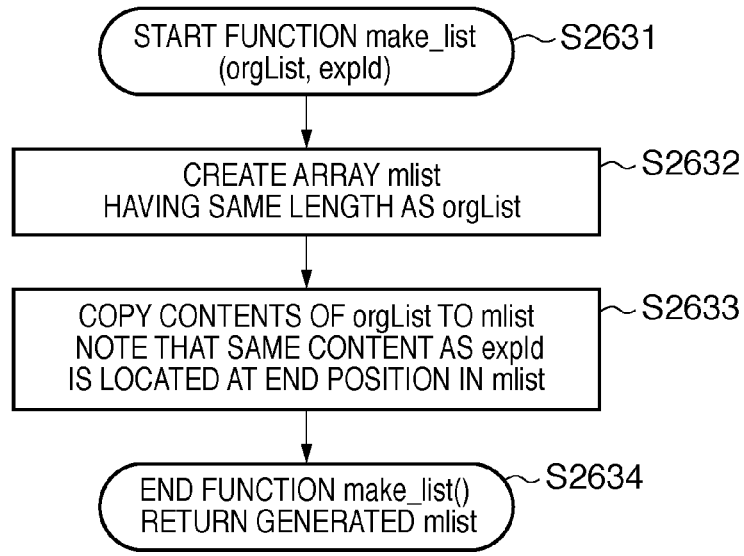

Steps S2631 to S2634 shown in FIG. 26C as the processing contents of the function "make_list" will be described below. In step S2631, the function is started by setting a field identifier array in an argument "orgList" and a field identifier in an argument "expId". In step S2632, an array mlist having the same number of elements as the argument "orgList" is assured. In step S2633, the contents of the argument "orgList" are copied to the array mlist. However, when the argument "orgList" includes the same field identifier as that in the argument "expId", the next element of the argument "orgList" is coped to that order of the array mlist.

The last element of the array mlist is set to have the same contents as in the argument "expId". That is, when the argument "orgList" does not include the same field identifier as in the argument "expId", a copy array is generated intact in the array mlist; when the same field identifier is included, an array in which only that field identifier is moved to the end is generated. In step S2634, the function "make_list" ends, and the generated array mlist is returned as a return value.

Referring back to a description of step S2614 in FIG. 26B, "link[link ID]" as a link destination corresponding to the current link ID is set in the argument "orgList" upon calling the function "make_list". Note that since a caption appended region is the link source, link destinations indicated by the variable correspond to an array of field identifiers, as described above. Also, the global variable "prevId" which expresses a click history of the field is set in the argument "expId".

This argument "prevId" is a value of a field identifier set in processing in step S2619 to be described later every time the function "on_click2" is executed. For the currently executed function "on_click2", a field identifier as a link source upon immediately preceding calling of the function "on_click2" is stored. When the currently executed function "on_click2" is called for the first time, the argument "prevId" is not defined. Therefore, the return value of the function "make_list" is an array in which a field identifier which matches the argument "prevId" is moved to the end with respect to a link destination array of the current link ID. This array is set in the global variable "list" as the cyclic list.

In step S2615, a field identifier of a link destination, that is, a field, which is highlighted and focused as a result of clicking of the user, is set in a local variable "dstId". In this case, the first field identifier in the cyclic list, that is, that of the global variable "list[0]" is set. In addition, "0" is set in the global variable "listIdx". This processing is executed to indicate that the current reference position of the cyclic list is the first position. Note that when the number of arrays of the cyclic list is zero, that is, when there is no link destination, a null character string is set in the variable "dstId".

It is checked in step S2616 whether or not the number of field identifiers included in the array of the current cyclic list is larger than 1. If the number of field identifiers is larger than 1, the process advances to step S2617. Otherwise, the process advances to step S2618. In step S2617, the action function "jump_to" required to jump to a link destination, that is, the function required to highlight and set a focus on a link destination field is called.

Figure 26D:
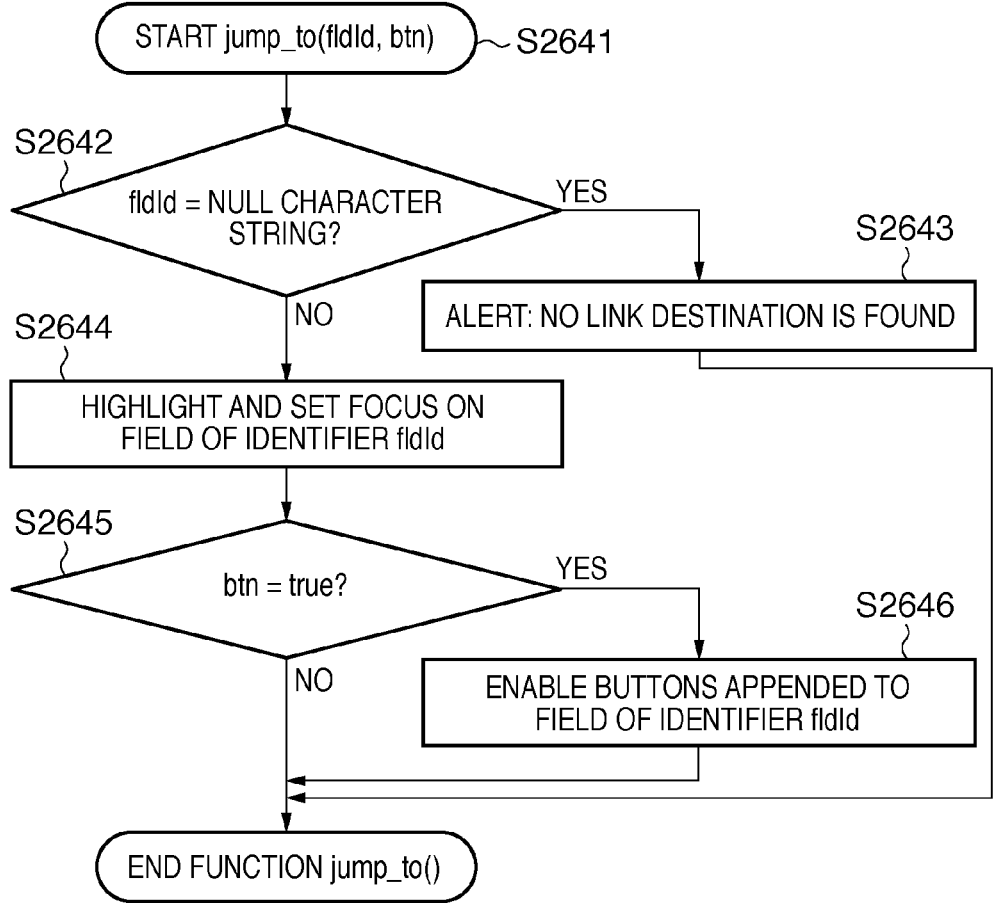

Steps S2641 to S2647 shown in FIG. 26D as the processing contents of the function "jump_to" will be described below. In step S2641, the function is started by setting a field identifier of a jump destination in an argument "fldId" and a Boolean value indicating whether or not to enable buttons appended to the field identifier of the jump destination in an argument "btn". It is determined in step S2642 whether or not a null character string is set in the argument "fldId". If a null character string is set, the process advances to step S2643 to display an alert message indicating that no link destination is found for the user. Then, the process jumps to step S2647.

If no null character string is set, the process advances to step S2644. In step S2644, a field having the field identifier of the argument "fldId" is highlighted to set a focus on the field. Since an example of the highlighting and focus setting is the same as that in the first embodiment, a description thereof will not be repeated. It is determined in step S2645 whether the argument "btn" is "true" or "false". If the argument "btn" is "true", the process advances to step S2646; otherwise, the process advances to step S2647. In step S2646, buttons appended to the link destination, that is, the field of the argument "fldId" are enabled. In this example, fields having field identifiers obtained by adding "-Prev", "-Next", and "-Back" to a character string of the field identifier of the link destination are enabled. In step S2647, the function "jump_to" ends.

Referring back to a description of step S2617, the value of the local variable "dstId" set in step S2615 is set in the argument "fldId", and "true" is set in the argument "btn" upon calling of the function "jump_to". That is, an action which jumps to the link destination field at the first position of the current cyclic list and enables buttons appended to the link destination is executed, and the process advances to step S2619.

On the other hand, in step S2618 which is reached when it is determined in step S2616 that the number of field identifiers in the cyclic list is 1 or 0, the function "jump_to" is called by setting the value of the local variable "dstId" in the argument "fldId" and "false" in the argument "btn". That is, the following action is executed. When the cyclic list includes a link destination, the field position jumps to that link destination, but since it does not include another link destination as a cyclic object, buttons appended to the link destination are not enabled. Or when the cyclic list is empty, that is, when there is no link destination, an action which gives that alert message is executed. After that, the process advances to step S2619.

In step S2619, the contents of the argument "srcId" of the function are set in the global variable "prevId". These contents are set for the purpose of allowing the execution of processing according to a user's operation history by informing the field identifier of the immediately preceding link source upon next calling of the function "on_click2".

In step S2620, the function "on_click2" ends. Since the action function upon clicking of the field ends, the application transits to a state in which a user's operation is accepted again.

Next, a case will be exemplified below wherein it is determined in step S2613 that the ring ID does not start with "image_", and the process advances to step S2621.

It is determined in step S2621 whether or not a click object field is a button. More specifically, this determination step can be attained by seeing whether or not a part indicating a button type is obtained upon decomposing the character string of the argument "srcId" in step S2612. If the click object field is a button (YES in step S2621), the process advances to step S2623. If the click object field is not a button (NO in step S2621), the process advances to step S2622.

A case will be described first wherein the click object field is not a button (NO in step S2621), and the process advances to step S2622. That is, this is the case when the click object is a field of an anchor term in body region.

In step S2622, a link destination corresponding to a link source is decided based on the global variable "link" of the link configuration information, and is set in the local variable "dstId". More specifically, a link destination is acquired based on "link[link ID]" from the variable "link" of the link configuration information configured in step S2603. As described above, a character string of a field identifier of a caption appended region or a null character string in case of no link is acquired.

The process advances to step S2618 to call the function "jump_to" by setting the value of the variable "dstId" set in step S2622 in the argument "fldId" and "false" in the argument "btn". That is, an action which jumps to a field of the caption appended region as the link destination is executed.

Since no button field is appended to the caption appended region, enabling of buttons is not designated in reason.

After that, the process advances to steps S2619 and S2620, thus ending the function "on_click2" as in the above description. Since the action function at the time of field clicking ends, the application transits to a state in which it accepts a user's operation again.

Subsequently, a case will be described below wherein a click object field is a button (YES in step S2621), and the process advances to step S2623.

In step S2623, a button type of the click object field is checked. If the button type is "Prev", the process advances to step S2624; if it is "Next", the process advances to step S2625; or if it is "Back", the process jumps to step S2622. A case will be explained first wherein the process advances to step S2624 or S2625. In step S2624, the value of the global variable "listIdx" is decremented by "1". However, when the value of the variable "listIdx" is "0", the value of the variable "listIdx" is set to be the number of array elements −1 of the global variable "list". On the other hand, in step S2625, the value of the global variable "listIdx" is incremented by "1". However, when the value of the variable "listIdx" is the number of array elements −1 of the global variable "list", the value of the variable "listIdx" is set to be "0".

After step S2624 or S2625, the contents of the "listIdx"-th element in the cyclic list are set in the local variable "dstId" as a link destination in step S2626. That is, the value of the global variable "link[listIdx]" is set. Then, the process advances to step S2617.

The processes in step S2617 and subsequent steps are the same as those described above. That is, the field position jumps to the link destination in step S2617 to enable buttons appended to the link destination. Then, steps S2619 and S2620 are executed, and the function "on_click2" ends. After that, the application transits to a state in which it accepts a user's operation again. If the button type is "Back" in step S2623, the process jumps to step S2622. Since the subsequent processing contents are the same as those for a field of an anchor term in body region, a description thereof will not be repeated.

FIGS. 26A to 26D have been described. FIGS. 27A and 27B show description examples of action information including the action function group shown in FIGS. 26A to 26D in the digital document format to be generated according to the fourth embodiment. Note that FIGS. 27A and 27B also describe an action function which disables buttons appended to a field, and is not described in FIGS. 26A to 26D. Assume that this function is defined in an action when a focus is removed from a field of an anchor term in body region to which buttons are appended in the digital document.

Also, this function is used to disable all buttons at the time of initialization. This method is merely an example. For example, as in the second embodiment, a required button disabling process may be executed in the action function at the time of clicking as needed. Also, a code for avoiding an unintended operation by resetting the global variables such as a click history and the cyclic list as needed may be added to cope with user's various operations.

[Digital Document Data Browsing Operation]

An operation when the user browses the digital document data generated by the fourth embodiment using the application will be described below. This description also uses the application screen examples shown in FIGS. 13A to 13H. Assume that the user browses a screen of FIG. 13B as the second page of the digital document data, and clicks a region 1306. Then, the action function "on_click2" described as in the examples shown in FIGS. 27A and 27B is called to have a field "image_figure1-1" as a link source, thus executing an action. The contents of this action function are as follows. As described above using FIGS. 26A to 26D, since the link source as a click object is a caption appended region, the cyclic list is generated, and a jump operation is executed to have the first field identifier in the list as a link destination.

In this case, since there is no click history, the cyclic list remains as the list {"text_figure1-1", "text_figure1-2", "text_figure1-3"} determined in the "init" function shown in FIGS. 27A and 27B. Therefore, the field position jumps to a field of the first field identifier "text_figure1-1", thus obtaining the display result shown in FIG. 13C. Next, when the user clicks a "Back" button 1310 in FIG. 13C, a link destination "image_figure1-1" is determined based on the link ID "text_figure1" of the link source, and the field position jumps to that field, thus obtaining a display result shown in FIG. 13F.

The operations executed so far are equivalent to those of the first embodiment. In this case, when the user further clicks a region 1317 in FIG. 13F, the function "on_click2" is executed to have the field identifier "image_figure1-1" as the link source. However, in immediately preceding calling of the function "on_click2", the immediately preceding click object field identifier "text_figure1-1" is set in the global variable "prevId". Hence, the function "on_click2" creates a cyclic list {"text_figure1-2", "text_figure1-3", "text_figure1-1"} in which that field identifier is relocated at the end position, and jumps to the first field identifier of the list. As a result, a display result shown in FIG. 13D is obtained. Therefore, in the fourth embodiment, when the user makes the above operation to view an explanation different from FIG. 13C, FIG. 13D is displayed without displaying FIG. 13C again, thus allowing a simple and efficient browsing operation.

Note that the action function "make_list" described using FIGS. 26A to 26D creates a cyclic list by sorting field identifiers so as to locate the immediately preceding click object at the end position of the list. However, this is merely an example, and other sorting methods may be adopted. For example, the field identifiers may be sorted so as to locate the immediately preceding click object at the first position of the list. Furthermore, more previous click objects may be taken into consideration, and the field identifiers may be sorted so as to locate immediately preceding click object at the first position when a start point is an anchor term in body or at the end position when it is a caption appended region.

As described above, the digital document data generated by the fourth embodiment has a function of creating a cyclic list of link destinations when the user clicks a field having a plurality of link destinations, and then displaying and focusing the plurality of link destinations in an order according to the cyclic list. Therefore, the cyclic list can be sorted to have a more appropriate order based on, for example, an operation history when the user clicks an object field. As a result, in addition to the effects described in the first and second embodiments, appropriate information can be preferentially presented according to, for example, a user's operation state, thus further improving the user's browsing efficiency.

Also, sorting based on importance calculated from sentences near anchor terms described in the third embodiment may be made in the aforementioned function "make_list". In this case, an importance score list corresponding to each link destination list may be attached to the link configuration information, and may be recalculated in the function "make_list" if necessary, so as to be used in sorting. In addition to the effects described in the third embodiment, the digital document data generated in this way can preferentially present appropriate information according to, for example, a user's operation state, thus further improving the user's browsing efficiency.

Fifth Embodiment

In digital document data to be generated, as an action when the user clicks a field for a region having a plurality of link destinations, for example, thumbnails and abstracts related to the link destinations are enumerated. Then, the field position may transit to a region of the link destination selected by the user. For example, as an action when the user clicks a caption appended region as a link source, a list of excerpts/abstracts of a plurality of sentences including anchor term in body regions as link destinations is displayed. Then, the field position may jump to an anchor term region included in the sentence selected from the list by the user.

Furthermore, buttons used to display other link destinations in turn may be displayed to be appended to this jump destination field as in the first to fourth embodiments. Alternatively, a button that allows the user to select whether to make such list display or to jump to one of link destinations as in the first to fourth embodiments may be provided. As a result, after the user takes a guess at a plurality of "object reference sentences" for an "object" on a list display of abstracts for example, he or she can display a part including an actual sentence so as to obtain detailed contents. Thus, the user's browsing efficiency can be further improved.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-154361, filed on Jul. 6, 2010, which is hereby incorporated by reference herein in its entirety.

What is claimed is:

1. An image processing apparatus comprising:
    region division unit configured to divide input document data into a body region, a caption region, and an object region to which the caption region is appended;
    text information acquisition unit configured to acquire text information included in each of the body region and the caption region divided by said region division unit;
    link processing unit configured to search the text information in the body region for an anchor term configured by a predetermined character string, to extract an anchor term configured by a predetermined character string from the text information in the caption region, and to generate a bi-directional link between a portion corresponding to the anchor term in the body region and a portion of the object region to which the caption region is appended; and
    conversion unit configured to convert the input document data into digital document data in which the portion corresponding to the anchor term in the body region and the portion corresponding to the object region to which the caption region is appended are bi-directionally linked based on the link generated by said link processing unit,
    wherein, if a plurality of identical anchor terms are found in the body region by said link processing unit, said link processing unit generates the link including control information which controls to, when the portion corresponding to the object region is operated by a user, highlight one of portions corresponding to the plurality of identical anchor terms in the body region, and to display a button used to display a portion corresponding to another anchor term of the plurality of identical anchor terms in the body region.

2. The apparatus according to claim 1, wherein the button is configured by a first button used to display a portion corresponding to a next anchor term of the plurality of identical anchor terms in the body region, and a second button used to display a portion corresponding to a previous anchor term.

3. The apparatus according to claim 2, wherein the button further includes a third button used to display the portion corresponding to the object region to which the caption region is appended.

4. The apparatus according to claim 1, wherein said link processing unit comprises:
    anchor term in body search unit configured to search the text information in the body region for an anchor term configured by a predetermined character string;
    first field generation unit configured to generate a first field required to specify a portion corresponding to the anchor term found by said anchor term in body search unit;
    second field generation unit configured, when said anchor term in body search unit finds a plurality of identical anchor terms, to generate a second field corresponding to a button used to display a portion corresponding to another anchor term of the plurality of identical anchor terms;
    anchor term in caption extraction unit configured to extract an anchor term configured by a predetermined character string from the text information in the caption region;
    third field generation unit configured to generate a third field required to specify a portion corresponding to an object region to which the caption region is appended;
    link configuration information generation unit configured to generate link configuration information required to link the first field and the third field based on the anchor term found by said anchor term in body search unit and the anchor term extracted from the caption region; and
    action definition generation unit configured to defined, based on the link configuration information, an action to be executed when a user designates the first field, an action to be executed when the user designates the second field, and an action to be executed when the user designates the third field, and
    said conversion unit converts the input document data into the digital document data based on the first field, the second field, and the third field generated by said link processing unit, and the defined actions.

5. The apparatus according to claim 4, wherein when said anchor term in body search unit finds a plurality of identical anchor terms, said action definition generation unit defines, as the action to be executed when the user designates the third field, an action which highlights the first field corresponding to the third field, and displays a button used to display a portion corresponding to another anchor term corresponding to the second field of the plurality of identical anchor terms in the body region, and when said anchor term in body search unit finds one anchor term, said action definition generation unit defines, as the action to be executed when the user designates the third field, an action which highlights the first field corresponding to the third field, and controls not to display the button.

6. The apparatus according to claim 4, wherein when said anchor term in body search unit finds a plurality of identical anchor terms, said action definition generation unit defines, as the action to be executed when the user designates the first field, an action which highlights the third field corresponding to the first field, and disables a button corresponding to the second field appended to the designated first field, and when said anchor term in body search unit finds one anchor term, said action definition generation unit defines, as the action to be executed when the user designates the first field, an action which highlights the third field corresponding to the first field.

7. The apparatus according to claim 4, wherein when said anchor term in body search unit finds a plurality of identical anchor terms, said action definition generation unit defines, as the action to be executed when the user designates a button corresponding to the second field, an action which highlights the first field corresponding to another anchor term of the plurality of identical anchor terms in the body region.

8. The apparatus according to claim 1, wherein when said anchor term in body search unit finds a plurality of identical anchor terms, said link processing unit generates a cyclic list which ranks portions corresponding to the found plurality of identical anchor terms in a predetermined order, and generates the link based on the cyclic list.

9. The apparatus according to claim 8, wherein the cyclic list defines the ranking based on the importance of sentences included in the portions corresponding to the found plurality of identical anchor terms.

10. The apparatus according to claim 8, wherein said conversion unit converts the document data into digital document data including a description required to sort the order in the cyclic list based on an operation history on software required to display the document data.

11. The apparatus according to claim 1, wherein the object region is a region of at least one of a figure, a drawing, a photo, and an illustration.

12. The apparatus according to claim 1, wherein the anchor term includes one of character strings "figure number", "figure", and "Fig.".

13. The apparatus according to claim 1, wherein a page description language of the digital document data converted by said conversion unit includes SVG, XPS, PDF, and Office Open XML formats.

14. An image processing method to perform:

a region division step of dividing input document data into a body region, a caption region, and an object region to which the caption region is appended;

a text information acquisition step of acquiring text information included in each of the body region and the caption region divided in the region division step;

a link processing step of searching the text information in the body region for an anchor term configured by a predetermined character string, extracting an anchor term configured by a predetermined character string from the text information in the caption region, and generating a bi-directional link between a portion corresponding to the anchor term in the body region and a portion of the object region to which the caption region is appended; and a conversion step of converting the input document data into digital document data in which the portion corresponding to the anchor term in the body region and the portion corresponding to the object region to which the caption region is appended are bi-directionally linked based on the link generated in the link processing step, wherein, if a plurality of identical anchor terms are found in the body region in the link processing step, the link generated in the link processing step includes control information which controls to, when the portion corresponding to the object region is operated by a user, highlight one of portions corresponding to the plurality of identical anchor terms in the body region, and to display a button used to display a portion corresponding to another anchor term of the plurality of identical anchor terms in the body region.

15. A computer-readable medium storing a program for controlling a computer to execute:

a region division step of dividing input document data into a body region, a caption region, and an object region to which the caption region is appended;

a text information acquisition step of acquiring text information included in each of the body region and the caption region divided in the region division step;

a link processing step of searching the text information in the body region for an anchor term configured by a predetermined character string, extracting an anchor term configured by a predetermined character string from the text information in the caption region, and generating a bi-directional link between a portion corresponding to the anchor term in the body region and a portion of the object region to which the caption region is appended; and a conversion step of converting the input document data into digital document data in which the portion corresponding to the anchor term in the body region and the portion corresponding to the object region to which the caption region is appended are bi-directionally linked based on the link generated in the link processing step, wherein, if a plurality of identical anchor terms are found in the body region in the link processing step, the link generated in the link processing step includes control information which controls to, when the portion corresponding to the object region is operated by a user, highlight one of portions corresponding to the plurality of identical anchor terms in the body region, and to display a button used to display a portion corresponding to another anchor term of the plurality of identical anchor terms in the body region.

\* \* \* \* \*